(12) United States Patent
Rowell et al.

(10) Patent No.: US 10,645,366 B2
(45) Date of Patent: May 5, 2020

(54) REAL TIME RE-CALIBRATION OF STEREO CAMERAS

(71) Applicant: Lucid VR, Inc., Santa Clara, CA (US)

(72) Inventors: Adam Rowell, Mountain View, CA (US); Sheldon Fernandes, San Jose, CA (US); Han Jin, Milpitas, CA (US)

(*) Notice: Subject to any disclaimer, the term of this patent is extended or adjusted under 35 U.S.C. 154(b) by 0 days.

(21) Appl. No.: 16/254,542

(22) Filed: Jan. 22, 2019

(65) Prior Publication Data

US 2019/0158813 A1   May 23, 2019

Related U.S. Application Data

(60) Continuation-in-part of application No. 16/166,018, filed on Oct. 19, 2018, which is a continuation-in-part (Continued)

(51) Int. Cl.
| | |
|---|---|
| G06T 7/80 | (2017.01) |
| H04N 13/246 | (2018.01) |
| H04N 5/232 | (2006.01) |
| H04N 9/82 | (2006.01) |
| H04N 5/77 | (2006.01) |
| H04N 13/117 | (2018.01) |
| H04N 9/87 | (2006.01) |

(Continued)

(52) U.S. Cl.
CPC ............ *H04N 13/246* (2018.05); *G06T 7/85* (2017.01); *H04N 5/23238* (2013.01); *H04N 5/23267* (2013.01); *H04N 5/772* (2013.01); *H04N 5/907* (2013.01); *H04N 9/8205* (2013.01); *H04N 9/8227* (2013.01); *H04N 9/8715* (2013.01); *H04N 13/111* (2018.05); *H04N 13/117* (2018.05); *H04N 13/122* (2018.05); *H04N 13/178* (2018.05); *H04N 13/189* (2018.05); *H04N 13/239* (2018.05); *H04N 13/296* (2018.05); *H04N 2013/0081* (2013.01)

(58) Field of Classification Search
CPC .......... G06T 7/80; H04N 13/122; H04N 9/82
See application file for complete search history.

(56) References Cited

U.S. PATENT DOCUMENTS

| | | | |
|---|---|---|---|
| 7,102,637 B2 * | 9/2006 | Chen ..................... | H04N 13/133 345/426 |
| 8,731,247 B2 * | 5/2014 | Pollock .................. | G01C 11/02 382/108 |
| 9,532,036 B2 * | 12/2016 | Kim ...................... | H04N 13/349 |

OTHER PUBLICATIONS

A topological stereo matcher; Fleck; et al. 1991. (Year: 1991).*

(Continued)

*Primary Examiner* — Luis Perez-Fuentes

(57) ABSTRACT

Described are image and video processing systems and methods for auto re-calibration of stereo camera devices. The auto re-calibration processes described herein transform image data into re-calibration data used to correct calibration errors in real time. The auto re-calibration processes leverage position data shifting, image data filtering, and disparity analysis to generate one or more calibration profiles that track the position of the camera modules included in stereo camera devices. Calibration profiles are then used to generate pixel shift parameters describing how to modify the position of image pixels and or camera modules to improve rectification and projection of 3D images and video frames. Additionally multi-camera systems implementing the auto re-calibration processes are disclosed.

20 Claims, 22 Drawing Sheets

Related U.S. Application Data of application No. 15/920,160, filed on Mar. 13, 2018, which is a division of application No. 15/179,056, filed on Jun. 10, 2016, now Pat. No. 9,948,919.

(51) Int. Cl.
| | |
|---|---|
| *H04N 13/239* | (2018.01) |
| *H04N 13/296* | (2018.01) |
| *H04N 13/178* | (2018.01) |
| *H04N 13/189* | (2018.01) |
| *H04N 5/907* | (2006.01) |
| *H04N 13/122* | (2018.01) |
| *H04N 13/111* | (2018.01) |
| *H04N 13/00* | (2018.01) |

(56) References Cited

OTHER PUBLICATIONS

Denoising 3D models with attributes using Soft thresholding; Roy; et al. 2004. (Year: 2004).*
Color calibration for multi-camera image system; Sabri; et al. 2010. (Year: 2010).*
An effective calibration procedure for correction of parallax unmatched image pairs; Wang; 2009 (Year: 2009).*

* cited by examiner

REAL TIME RE-CALIBRATION OF STEREO CAMERAS

CROSS REFERENCE TO RELATED APPLICATIONS

This application is a continuation in part of U.S. patent application Ser. No. 16/166,018 entitled "3D CAMERA CALIBRATION FOR ADJUSTABLE CAMERA SETTINGS" filed Oct. 19, 2018, which is a continuation in part of U.S. patent application Ser. No. 15/920,160 entitled "STEREOSCOPIC 3D CAMERA FOR VIRTUAL REALITY EXPERIENCE," filed Mar. 13, 2018, which is a divisional application of U.S. patent application Ser. No. 15/179,056 entitled "STEREOSCOPIC 3D CAMERA FOR VIRTUAL REALITY EXPERIENCE," filed Jun. 10, 2016; all of which are incorporated by reference herein in their entirety.

BACKGROUND

Computer vision (CV) is a technical discipline that allows computers, electronic machines, and connected devices to gain high-level understanding from digital images or videos. Typical CV tasks include scene reconstruction, event detection, video tracking, object recognition, 3D pose estimation, learning, indexing, motion estimation, and image restoration. Scene reconstruction or 3D reconstruction is the process of capturing the shape and appearance of real objects. 3D cameras are devices that can perform 3D reconstruction using, for example, monocular cues or binocular stereo vision. 3D cameras process image information from one or more camera modules to generate realistic scenes that provide the appearance of depth when rendered in a 3D displays.

Scenes captured by 3D cameras can be used to produce virtual reality (VR) content (i.e. content that replicates a different sensory experience, e.g., sight, touch, hearing or smell in a way that allows a user to interact with the simulated environment). In particular, some virtual reality technologies focus on visual experience. The visual experience is displayed on a computer screen or with a virtual reality headset (also referred to as head mounted display or HMD). The virtual reality technology simulates the immersive environment in a way close to the real world experience in order to replicate a lifelike experience.

Successful application of CV techniques requires precise and accurate calibration of camera modules capturing image data processed using CV methods. 3D cameras, stereo camera systems, and other 3D reconstruction devices, especially devices including multiple camera modules, are especially difficult to calibrate because even small manufacturing variations or slight shifts in the position of one or more camera components (e.g., lenses or image sensors) can significantly impact calibration parameters required for accurate calibration. 3D camera calibration of devices including multiple cameras involves computing intrinsic parameters for each camera independently and then computing the relative extrinsic parameters between the two intrinsically calibrated cameras. Rectification matrices derived from the intrinsic and extrinsic parameters are used to rectify the right and left images. Subsequent processing steps may then be performed on rectified images to accurately sense depth, track objects, enhance images, reconstruct scenes, and perform other CV tasks.

DETAILED DESCRIPTION

Other than the different perspectives, human eyes are very sensitive to any differences between the left and right eye visions. When there is a noticeable difference in distortions, pixel alignment, or warping between the left and right channels of the 3D video, the stereoscopic 3D effect experienced by the user is significantly suppressed. During the manufacturing processes of lenses, digital image sensors, and the stereoscopic devices, various types of manufacturing variances can be introduced.

Example System Architecture

Figure 1:
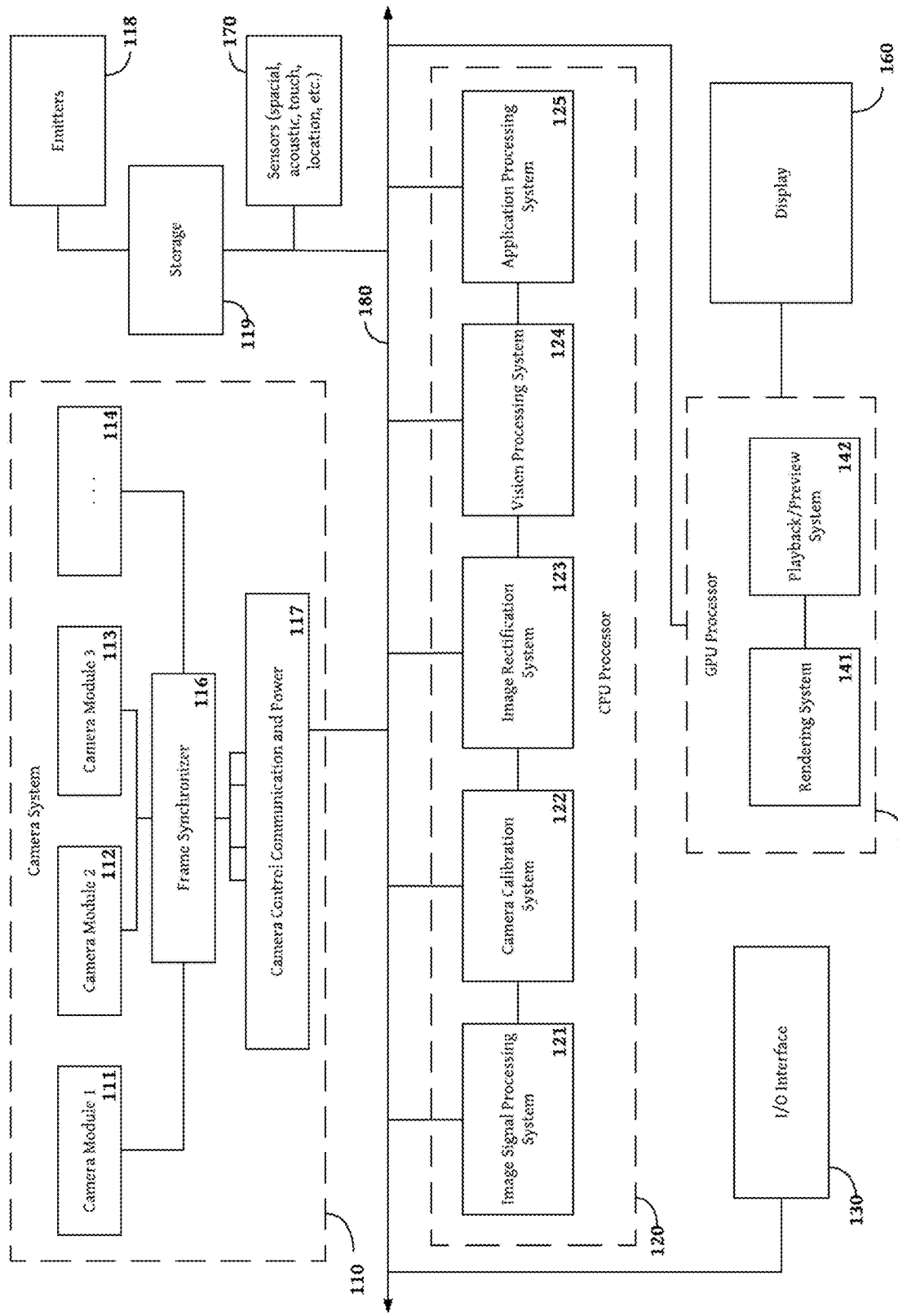
FIG. 1 is a block diagram showing components of a 3D stereo camera system that can record stereoscopic videos and embed stereoscopic calibration metadata.

FIG. 1 is a high level block diagram showing an example system architecture for a 3D camera device that records three-dimensional (3D) videos, embeds 3D stereoscopic calibration metadata, renders 3D content for playback, and performs all other CV tasks and processes described below. The stereo camera system 100 includes a sensor subsystem 101 and a central processor 120. The sensor subsystem 101 collects sensor data using the camera subsystem 110, emitters 118, and other sensors 170. The central processor 120 processes sensor data and other information by executing some or all of the processor executable process steps described in detail below. In one example, the stereo camera system 100 is implemented as a 3D stereo camera system device (also referred to as stereoscopic device) having a camera subsystem 110 comprising two or more camera modules 111-115 for capturing 3D images and/or videos with a normal or wide field of view (FOV). With additional processing by the central processor 120, the 3D images, video sequences, and other data captured by the stereoscopic 3D camera device can be used to accurately sense depth, track objects, enhance images, reconstruct scenes, and create virtual reality (VR) experiences.

In one non-limiting example, the image data captured by the 3D camera can be rendered as 3D content on a display 160 fitted with a 3D or holographic display screen. One possible display 160 capable of rendering 3D content from image data captured by the 3D camera includes a light field display (e.g., a nano-textured diffractive light field backlighting holographic display or other two or four view display having multiple LCD layers with a directional backlight). The light field display systems may produce a 3D effect by rendering many different views (e.g., 64 or more) of the same object. Each view is perceptible at a particular viewing angle and may result from combining two unique stereo image or stereo video frame pairs. In some examples, the light field display system may be included in the 3D camera. Alternatively, the light field display system may be a component of another device.

In some embodiments, each camera module 111-115 included in the camera system 110 of the 3D camera device may have a lens and an image sensor. The lenses may be telephoto, standard angle, wide angle, ultra wide-angle (e.g., fish-eye lenses that capture 3d images and videos with a wide field of view), or some combination. In embodiments with ultra wide-angle lenses, the field of view can be, e.g., 180 degrees. The distance between each camera module 111-115 can be fixed (e.g., spaced apart at a distance similar to a typical distance between the human eyes). Alternatively, the distance between the lenses can be varied to provide an adjustable camera baseline.

Digital image sensors included each camera module 111-115 capture images based on light transmitted through the lenses. Each image sensor is mounted behind one of the lenses and the digital image sensors can be, e.g., charge-coupled devices (CCDs) or complementary metal-oxide-semiconductor (CMOS) devices that convert the light signals into digital data. The camera modules 111-115 can simultaneously capture images or video streams from multiple different perspectives, each with a normal, wide, or ultra wide field of view (e.g., 180 degrees for ultra wide field of view).

Each of the image sensors and lenses included in the camera modules 111-115 have associated parameters, such as the sensor size, resolution, and interocular distance, the lens focal lengths, lens distortion centers, lens skew coefficient, and lens distortion coefficients. The parameters of each image sensor and lens may be unique for each image sensor or lens, and are often determined through a stereo camera system calibration process.

As shown in FIG. 1, one non-limiting example 3D video camera device includes a camera system having two or more camera modules 111-115, a frame synchronizer 116, and a camera control communication and power system 116. In stereoscopic 3D camera embodiments, camera module one 111 can capture images or videos for a left eye channel; while camera module two 112 can capture images or videos for a right eye channel. During a playback stage, the images or videos for the left eye channel will be played back to be perceived by a left eye of a user; while the images or videos for the right eye channel will be played back to be perceived by a right eye of a user. Because of the left and right channels are captured from two different perspectives, the user is able to experience the 3D effect using his eyes.

3D camera embodiments having more than two camera modules may capture many perspectives of a scene. Depending on the perspective rendered during a playback stage, camera modules included in these multi camera systems may form stereo camera pairs with more than one camera. For example, when camera module one 111 and camera module two 112 are configured as a stereo camera pair, camera module one 111 may capture images for a left eye channel; while camera module two 112 may capture images for a right eye channel. When camera module one 111 and camera module three 113 are configured as a stereo camera pair, camera module one 111 may capture images for a right eye channel; while camera module three 113 may capture images for a left eye channel. During a playback stage, images or videos captured by one or more camera modules 111-115 configured as a left eye channel camera module will be played back to be perceived by a left eye of a user; while images or videos captured by one or more camera modules 111-115 configured as a right eye channel camera module will be played back to be perceived by a right eye of a user.

Camera modules 111-115 may be dynamically configured as left eye and/or right eye channel camera modules to provide a 3D effect at many different viewing angles. In one example, adjustments to the configuration of one or more camera modules 111-115 may occur in real time during image capture. The configuration of one or more camera modules 111-115 may also be adjusted in real time as part of rendering, previewing, or another operation performed during a playback stage. Alternatively, a 3D effect may be generated at many different viewing angles by processing images or video frames captured by one or more camera modules 111-115 post capture (e.g., by further processing captured images and/or video frames) without changing the configuration of any camera modules 111-115.

During the video capturing process, the image sensors record video frames, and the 3D camera combines the frames from the individual image sensors into a composite video file. In some embodiments, the composite video file includes two channels of video streams, for left and right eyes respectively. In other embodiments, the composite video file includes more than two channels of video streams, for left and right eye perspectives at multiple viewing angles. The video frames may be processed prior to being encoded into the video file, with additional image processing parameters describing the processing.

The camera system 110 may also include a frame synchronizer 116 for synchronizing the timing and switching of the camera modules 111-115. In one example, the frame synchronizer 116 implements a generator locking (genlock) synchronization technique wherein the video output from one source is used to synchronize the other picture sources together. A camera control communication and power module 117 may control performance of the camera synchronizer 115 and camera modules 111-115. In one example, to operate (e.g., move, start, record, shut down, etc.) or configure the camera modules 111-115 signals are passed to the camera control communication and power module 117 from the processor subsystem 120 via an interconnect 180.

The 3D camera may include additional sensors 170 and emitters 118. Sensors 170 may include special sensors (e.g., inertial measurement units, gyroscopes, accelerometers, other motion sensors, altimeters, and magnetometers); acoustic sensors (e.g., microphones and transducers); optical sensors (e.g., infrared cameras, ambient light sensors, time of flight (TOF) sensors, and optical emitters); touch sensors (e.g., force sensors, capacitive touch sensors, resistive touch sensors, and thermal touch sensors); and location sensors (e.g., GPS systems, beacons, trilateration systems, and triangulation systems). Emitters 118 may include lidar systems, dot field projectors, and other laser or emissions based sensors (e.g., vertical cavity surface-emitting laser sensors and CMOS laser sensors).

An interconnect 180, for example, a high-bandwidth system bus, such as an Advanced High-performance Bus (AHB) matrix interconnects the electrical components of the 3D camera. Other possible interconnect 180 implementations include, for example, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (I9E) standard 1394 bus (sometimes referred to as "Firewire") or any other data communication system.

The sensor subsystem 101 may further include a storage device 119 for storing the digital data of the captured images and videos (also referred to as image data and video data), sensor data collected by the emitters 118 and other sensors 170, and other information. The storage device can cooperate with the operating system 151 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage device 119 can include multiple ports having input/output (I/O) interface circuitry that couples to the disks over an I/O interconnect arrangement, e.g., a conventional high-performance, Fibre Channel (FC) link topology. In various embodiments, the I/O interface 130 and the and the storage device 119 can be integrated into one device configured to connect to a switching fabric, e.g., a storage network switch, in order to communicate with other devices and the mass storage devices.

The central processor 120 can be embodied as a single- or multi-processor system executing an operating system 151 that can implement a high-level module, e.g., a manager, to logically organize the information as a hierarchical structure of named directories, files and special types of files called virtual disks at the storage devices. The memory 150 can comprise storage locations that are addressable by the processor(s) and i/o interfaces 131-133 for storing processor executable code and data structures. The processor(s) and interfaces 131-133 may, in turn, comprise processing elements and/or logic circuitry configured to execute the software code and manipulate the data structures. The operating system 151, portions of which are typically resident in memory and executed by the processor(s), functionally organizes the central processor 120 by (among other things) configuring the processor(s) to invoke. It will be apparent to those skilled in the art that other processing and memory implementations, including various computer readable storage media, may be used for storing and executing program instructions pertaining to the technology.

The central processor 120 may further include a processor subsystem that includes one or more processors. The processor subsystem 120 may include various processor implementations including one or more programmable general-purpose or special-purpose microprocessors, digital signal processors (DSPs), programmable controllers, application specific integrated circuits (ASICs), programmable logic devices (PLDs), or the like, or a combination of such hardware based devices.

In some examples processors included in the processor subsystem 120 may be specialized to perform specific processing tasks. For example one or more graphical processing unit(s) (GPUs) may be used for graphical processing tasks or processing non-graphical tasks in parallel. Additionally, one or more neural processing unit(s) (NPUs) may be optimized to perform machine learning tasks involving image and/or sound processing routines for training neural networks and other machine learning models. NPUs may also process non-machine learning tasks in parallel.

One or more image processing subsystems 122-126 performing operations executed on the processor subsystem 120 may also be included in the central processor 120. The image signal processing system 121 preprocesses camera signals in preparation for further processing. Non limiting example preprocessing operations that may be performed by the image signal processing system 121 include auto white balancing, field shading correction, color enhancement, lens distortion rectification, warping, dewarping, image cropping, pixel subset selection, application of a Bayer transformation, image sharpening, image stabilization, image data normalization, color correction, object extraction, drawing of object boundaries, noise reduction, demosaicing, or otherwise processing the camera signals. The image signal processing system 121 may also rectify of depth maps or other depth representations captured by a depth sensor (e.g., TOF sensor, lidar system, dot field projector) with images captured by one or more camera modules 111-115. Synchronization of camera module output with output from a sensor 117 and/or emitter 118 may also be performed by the image signal processing system 121.

The camera calibration system 122 generates a calibration profile used to calibrate each camera module 111-115. Calibration profiles may include a plurality of calibration parameters for optimizing the quality and accuracy of image data captured by the camera modules 111-115. Calibration parameters may be static or dynamically altered in real time using one or more or more real time auto recalibration techniques. Stereoscopic calibration parameters depend on precise measurements of the relative positions between the left and right camera modules. The position of one or more camera modules can change over time due to normal wear and tear, therefore, real time auto recalibration techniques can prolong the life of a 3D camera by modifying calibration parameters to correct for small changes in camera position.

To produce a 3D effect, images and video frames captured by calibrated camera modules 111-115 must be oriented and aligned using a rectification process. The image rectification system 123 may implement one or more image rectification techniques. One example rectification technique aligns a left and right stereo image pair in three dimensions (e.g., rotationally, vertically, and horizontally) using a set for rectification matrices produced by the image rectification system 123. A set of projection matrices is then used to generate two stereo views perceptible as a 3D image or video frame when viewed on a display 160.

The vision processing system (VPS) 124 determines depth from image data captured by the camera system 110. Depth from the VPS 124 corresponds to the distance of physical points away from the 3D camera. In one 3D camera embodiment, the VPS 124 determines depth based on the disparity between points rendered in a left rectified image/video frame and point rendered in a right rectified image/video frame. The VPS 124 may include one or more vision processors having CPU, GPU, NPU, or other microprocessor implementations.

The application processing system (APS) 125 performs additional processing on image data from the camera system 110 using depth data produced by the VPS 124. Example tasks that may be performed by the APS 125 using depth data include generating a depth map, 3D scan, and point cloud; rendering 3D pictures and 3D video sequences; producing navigational or other control instructions; and detecting, classifying, and tracking objects using optical flow, simultaneous localization and mapping (SLAM), visual odometry, and other computer vision techniques. Additionally, the APS 125 may select one or more sensor outputs generated by the camera system 110, sensors 170, or emitters 118 for processing by the VPS 124. Output signals may also be multiplexed according to parameters set by the APS 125. The APS 125 may include one or more vision processors having CPU, GPU, NPU, or other microprocessor implementations.

The 3D camera can include one or more input/output (i.e. i/o) interfaces 130 for communicating with external devices, networks, and storage system. In one non-limiting example, the i/o interface 130 includes a network interface 131, remote device interface 132, and a storage interface 133. The storage interface 133 may include multiple ports having input/output (i/o) interface circuitry that couples to the disks over an i/o interconnect arrangement, e.g., a conventional high-performance, Fibre Channel (FC) link topology.

The network interface 131 can include multiple ports to couple the stereo camera system 100 to one or more clients over point-to-point links, wide area networks, virtual private networks implemented over a public network (e.g., the Internet) or a shared local area network. The network interface 131 thus can include the mechanical, electrical and signaling circuitry needed to connect the stereo camera system 100 to the network. Illustratively, the network can be embodied as an Ethernet network or a Fibre Channel (FC) network. A client can communicate with the central processor 120 of the 3D camera 100 over the network by exchanging discrete frames or packets of data according to predefined protocols, e.g., TCP/IP.

The remote device interface 132 includes one or more ports (e.g., USB or Ethernet) adapted to couple the stereo camera system 100 to other devices (e.g., a laptop, an external hard drive, a tablet, a smart phone). In one non-limiting embodiment, Ethernet can be used as the clustering protocol and interconnect media, although other types of protocols and interconnects may be utilized within the cluster architecture described herein.

In one example, the remote device interface 132 connects the stereo camera system 100 to an external device including a graphics processor 140 and a display 160. The graphics processor 140 may have a rendering system 141 and a playback and preview system 142 for executing a playback stage displaying 3D images, 3D video sequences, and other content generated by the 3D camera device. In some embodiments, the rendering system 141, playback and preview system 142, and display 160 may be included in the 3D camera to allow the device for function as playback device.

The rendering system 141 and playback and preview system 142 may incorporate parameters from one or more calibration profiles to generate 3D images and 3D video sequences pixel by pixel. Alternatively, pixels for a few key areas of the image or video frame may first be generated by the rendering system 141 with a subsequent interpolation operation filling in the occlusion zones between the key pixels performed by the playback and preview system 142. Video sequences generated by the rendering system 141 may be encoded into a video stream by the playback and preview system 142 using one or more streaming protocols (e.g., real time streaming protocol—RTSP), digital multimedia container formats (e.g., MP4) or other encodings. 3D images provided by the rendering system 141 may also be encoded into MP4 or another digital multimedia container format. Metadata including calibration data, synchronization data, sensor data, image data, and/or rendering and playback data may be encoded along with 3D images and video sequences into a video stream or digital multimedia file.

The 3D camera may simultaneously record videos from multiple different perspectives using the camera system 110. In one possible example, combinations of two or more camera modules 111-115 are used to capture videos with wide field of views (FOVs), e.g., 180 degrees or super wide FOV, e.g., up to 360 degrees. Such a field of view is wider than the field of view of human eyes. For example, the average human has a binocular vision with a field of view of 114 degrees (horizontally). During a playback stage, based on the desired viewing perspective, the 3D camera may select a portion of 3D images or videos captured by a subset of camera modules 111-115 to render in the display 160 to provide a more realistic depth effected at the particular viewing perspective.

In embodiments having two camera modules 111-112, cropped 3D images or videos captured by the left camera module (e.g., the first camera module 111) are rendered on a left portion of the display screen and cropped 3D images or videos captured by the right camera module (e.g., the second camera module 112) are rendered on a right portions of the display screen 160. During playback the left eye of the user views cropped 3D images and video captured by the left camera module on the left portion of the display screen 160. Similarly, the right eye of the user views cropped 3D images and video captured by the right camera module on the right portion of the display screen 160. When viewed together, the cropped 3D images and videos displayed on the left and right portions of the display screen 160 provide a stereoscopic 3D effect because the images were captured by two different camera modules having different perspectives.

When the user moves (e.g., tilts head, rotates the display screen, walks to a new location, etc.) to a different position or orientation, a motion sensor included as a sensor 117 detects the movement. Based on the new viewing position or orientation, the 3D camera determines new positions and/or sizes of the 3D images and videos and generates, in real time, updated cropped 3D content for display on the left and right portions of the display 160. Therefore, the field of view experienced by the user's eyes changes correspondingly as the user moves. To change the field of view, users may move to a different location or change the orientation of the display 160.

In some embodiments, the 3D camera display 160 may render the cropped left and right view of 3D content separately in two different display screens. Alternatively, the cropped left and right views of 3D content may be shown together on the same display screen. In embodiments having one display screen, the left and right channels of the 3D image or 3D video can be combined together to form a single feed of image or video such that there is no visible seam between the left and right portions of the display screen when the device plays back the 3D image or 3D video.

In embodiments having three or more camera modules 111-115, multiple modules can be used together to capture the 3D image or 3D video in a super wide field of view (e.g., 360 degrees). For example, a 3D camera device having three or more camera modules can be mounted on a 360 rig mount with the camera modules 111-115 facing different directions. The 3D images or 3D videos captured by the camera modules 111-115 can be stitched together to generate 3D images and videos having multiple viewing perspectives. Users may access the different viewing angles by moving or changing the orientation of the display 160. The greater the number of camera modules 111-115 the more unique viewing angles the 3D camera can capture. By processing image data captured from multiple cameras having overlapping FOVs, systems having six or eight cameras spaced 60 or 45 radial degrees apart will provide better 3D depth at more viewing angles than 3D cameras having three cameras spaced 120 radial degrees apart.

3D Camera Calibration

Calibration in stereo camera systems is critically important to delivering a perceivable 3D effect. Rectification and projection matrices generated based on camera calibration metadata ensure stereo image frames are rectified to the same image plane with every pixel in the right image frame projected in alignment with the corresponding pixel in the left image frame. Poor calibration interferes with the stereo camera system's ability render a 3D view because the right and left stereo views generated from inaccurate calibration parameters do not accurately reflect the relative position of the stereo camera modules. The artificial offset between the positions of the stereo camera modules introduced by the calibration error disturbs the perceptible disparity between right and left image channels that creates the 3D effect. Disparity measurements generated from the right and left stereo views containing the calibration error are similarly disturbed by ineffective calibration. Therefore, stereo camera systems having calibration errors are unable to accurately measure depth. Additionally, problems with rectification and projection of the left and right image channels created by ineffective calibration can produce screen glare and exacerbate eye fatigue making it difficult to view a 3D display for long time periods or damaging eyes forced to view an ineffectively calibrated 3D display for long periods.

During the manufacturing processes of lenses, digital image sensors, and stereoscopic devices, various types of manufacturing variances can be introduced. The manufacturing variances are difficult to detect and are seldom the same for any two manufactured components. Therefore, a post manufacture calibration process is needed to correct manufacturing variances and ensure the accuracy of calibration parameters used to rectify stereo images. Successful camera calibration also improves user experience by enhancing the quality of 3D images/frames captured and displayed by the stereo camera system and minimizing screen glare and eye fatigue.

As shown in FIG. 1, the stereo camera system records stereoscopic image frames from two or more different camera modules, each of which includes a lens and an image sensor. The stereo camera system can store calibration metadata related to the lenses and images sensors of each camera module for correcting distortion, alignment, warping, or any other factors effecting 3D video or image quality caused by manufacturing variances of the lenses, digital image sensors, and stereo camera system modules.

Figure 3:
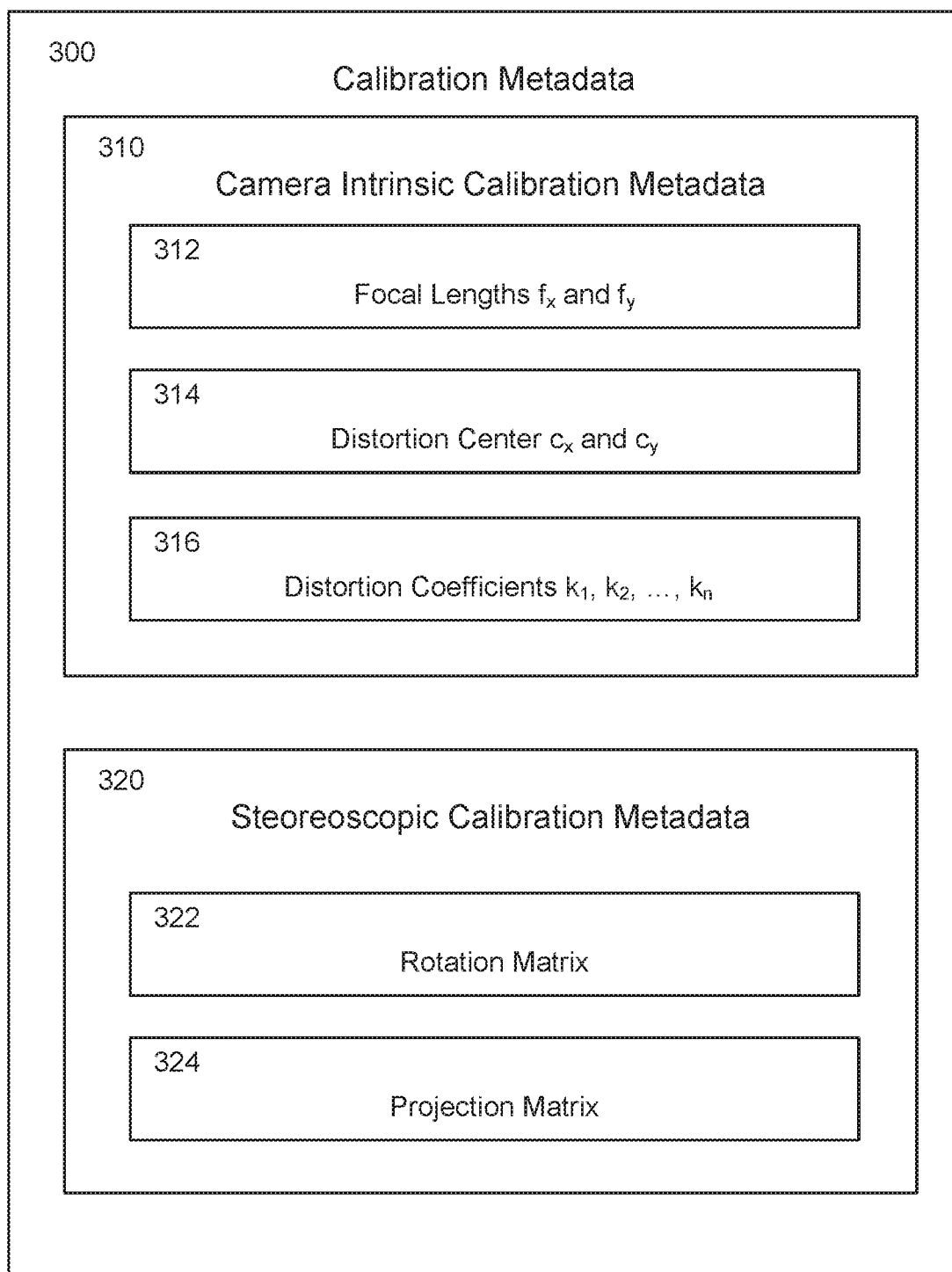
FIG. 3 shows a sample set of calibration metadata including various types of information for a sample stereoscopic device.

FIG. 3 shows a sample set of calibration metadata including various types of information for a sample stereo camera system module(s) included in the stereo camera system. At manufacture time, two types of calibration metadata 300 (also referred to as calibration information) are determined for each stereo camera system module(s), in order to properly render the final 3D images or videos perceived by the users. At manufacture time, each camera module is calibrated to determine its camera intrinsic calibration metadata 310. Furthermore, stereoscopic calibration metadata 320 (also referred to as extrinsic calibration metadata), which relates to the relevant relationship between the two camera modules, is also determined.

In some embodiments, the camera intrinsic calibration metadata 310 for a camera module (which includes a lens and an image sensor) can include intrinsic calibration parameters including focal length ($f_x$, $f_y$), distortion center ($c_x$, $c_y$), and distortion coefficients ($k_1$, $k_2$, . . . , $k_n$). Due to routine manufacturing variations, each of the camera modules has a unique set of camera intrinsic calibration metadata.

The $f_x$ and $f_y$ parameters 312 describe the focal lengths of the lens in the x and y directions that are perpendicular to each other. The focal lengths are the distances over which initially collimated light rays are brought to a focus, and measures how strongly the lens converges or diverges lights. A lens with a shorter focal length can bend the light rays more sharply. Lenses that are not perfectly circular, for example, some fisheye lenses, may distort or bend the light in slightly different ways in the x direction versus the y direction. Thus, the focal length at the x direction $f_x$ can be different from the focal length at the y direction $f_y$ for asymmetrically curved lenses.

The $c_x$ and $c_y$ parameters 314 describe the distortion center of the projection in the image frame captured by the lens. Since lenses including some fisheye lenses may not have prefect circular symmetry, the distortion center denoted by $c_x$ and $c_y$ may not be positioned at the geometric center of the image frame.

The $k_1$, $k_2$, . . . , $k_n$ parameters 316 are distortion coefficients that describe the levels of lens distortion, as a function of the radius from the center of the captured image frame to the edge of the frame. In some embodiments, n can be, for example, between 1 and 16, depending on how precise the calibration needs to be and the characteristics of the particular lens. The $k_1$, $k_2$, . . . , $k_n$ parameters essentially describe how much distortion an image pixel has as a location of the pixel moves from the center of the image to the edge of the image. In some embodiments, the $k_1$, $k_2$, . . . , $k_n$ parameters are defined radially and do not depend on the circular angle of the pixel location. The distortion coefficients are variable depending on the type of lenses used in the camera module. For example, different polynomial lens distortion models having different numbers of distortion coefficients with different values and orders of magnitude are used to describe distortion levels for fisheye and non-fisheye lenses.

There are various reasons why each camera module has its own set of camera intrinsic calibration metadata. In some embodiments, the distance between the left lens and the left image sensor may be slightly shorter than the distance between the right lens and the right image sensor. Alternatively, due to the manufacturing variance of the lenses, the left lens may have an optical distortion profile and/or focal length that are different from the optical distortion profile and/or focal length of the right lens.

In addition to the camera intrinsic calibration metadata, the camera device is also calibrated to determine stereoscopic calibration metadata 320 for each stereoscopic pair of camera modules. The stereoscopic calibration metadata 320 describes the relative position of between two stereo camera system modules. The stereoscopic calibration metadata 320 includes a mapping of coordinates between the right and left image channels. From this set of coordinate points, projection matrices, rectification matrices, and a distortion relationship between one lens relative to another lens can be determined. The distortion relationship is used to correct lens distortion and the projection and rectification matrices are used to rectify the images.

Ideally, the two lenses of the stereo camera system are perfectly aligned next to each other. However, in an actual 3D camera product, any of the lenses may be slightly off-center from the perfectly aligned location or its direction may be slightly off the perfectly aligned orientation. The stereoscopic calibration metadata can be used to correct the captured images and offset the distortion caused by imperfect alignment between those two lenses. After applying the distortion model, it appears as if two lenses with perfect alignment took the images. This correction improves the 3D effect since human eyes are very sensitive to the distortion differences between left and right channels.

In some embodiments, the set of stereoscopic calibration metadata 320 includes a rotation matrix 322 and a translation matrix 324. The rotation matrix 322 describes a rotational correction to align an image captured by one camera module to another image captured by another camera module so that the image planes of the left and right channels are on the same plane. The translation matrix 324 describes a translation operation that ensures the image frames from the left and right channels are vertically aligned.

In some embodiments, the set of stereoscopic calibration metadata 320 can include other compensation metadata that relates to image sensors. For example, the image sensor of the left channel may have slightly different color balance than the image sensor of the right channel. Based on a color calibration test, the camera can store color-mapping metadata as portion of the stereoscopic calibration metadata to equalize the color balance between the right and left image sensors to provide a uniform color profile.

In order to enhance the stereoscopic 3D effect, it is desirable to eliminate the optical distortion difference between the left and right channels of the 3D video due to the manufacturing variances. After a 3D camera device is manufactured, the camera modules, including the lenses and the image sensors, can be tested through a calibration process to detect the distortion differences between the left and right channels, represented by the sets of camera intrinsic calibration metadata and the stereoscopic calibration metadata. During a calibration process at the manufacturing site, the stereo camera system modules can capture 3D stereoscopic images and/or videos of several pre-determined reference objects (also referred to as calibration targets) at different angles, and generate calibration metadata based on the images or videos of the reference objects.

When the stereo camera system modules capture images and videos, the calibration metadata may be stored within the 3D stereoscopic images or videos in real time. Using the embedded or encoded calibration metadata, the captured 3D stereoscopic images or videos can be played back with the correct offset derived from the calibration metadata. The calibration metadata are also referred to as a calibration vector. Each element of the calibration vector stores one entry or type of the calibration metadata.

Adjustable Camera Settings for 3D Cameras

Baseline, zoom, and focus are three widely used camera settings that greatly influence the customizability and quality of images and video frames captured by a 3D camera device. The focus setting allows the camera device to sharpen the clarity of foreground or background objects thereby allowing users to select parts of a scene to capture clearly. Out of focus areas sometimes called blur or bokeh can also be processed to extract depth and other information from captured images. Additionally bokeh regions may be interpolated or otherwise constructed around an in focus object within a scene to create a 3D effect.

A zoom setting enables remote capture of objects at a distance by magnifying small or difficult to see aspects within a scene. In stereo camera systems incorporating one or more stereo cameras, the baseline setting describes the interocular distance between the two stereo camera modules. By affecting the depth range, baseline provides a mechanism for changing the perceived distance between the foreground and background elements of a scene. Image frames and video sequences captured with high baseline have a greater perceived 3D effect because of the increased depth between near and far objects.

Aspect ratio and camera relative rotation are additional camera settings that impact captured images. Aspect ratio describes the dimensions of the image frames captured by the camera device (e.g., 1920:1080 describing an image sensor that is 1920 pixels by 1080 pixels). Adjusting the aspect ratio setting impacts the portion of the image sensor used to generate an image and also effects image resolution. In 3D stereo cameras, the camera relative rotation setting describes the angle of rotation between the two stereo camera modules. Camera modules that are perfectly parallel to each other have a camera relative rotation setting of 0. Camera modules rotated 5° inward towards each other have a camera relative rotation setting of 5 and camera modules rotated 5° degrees outward away from each other have a camera relative rotation setting of (−)5. Adjusting the relative rotation setting by rotating the camera modules influences the location of the zero disparity plane (i.e. the distance at which the image planes of the left and right camera modules converge so that location of objects seen by each camera module is the same). Increasing the relative rotation setting brings the zero disparity plane closer to the camera modules. Conversely, decreasing the relative camera rotation moves the zero disparity plane further away from the camera modules or eliminates it completely by assuring the image planes of the left and right module never converge.

Small modifications of certain camera settings (e.g., baseline, zoom, focus, aspect ration, and relative camera rotation) can change the intrinsic and stereoscopic calibration metadata of a camera device. For example, changing the zoom increases the focal length of the lens, thereby changing the camera intrinsic calibration metadata. Similarly, auto focus settings dynamically shift between many different lens focal lengths to bring different objects into focus resulting in rapid changes to intrinsic calibration metadata. Stereoscopic calibration metadata is affected by physically moving the stereo camera modules closer or farther apart to achieve different baseline settings.

Calibrating a camera device at every possible camera setting is tedious and impractical especially if there is a wide range of possible values for a camera setting (e.g., having 10 cm of adjustable baseline with 1 mm of baseline difference between each baseline value) or many different camera settings incorporated in the 3D camera device (e.g., a camera having adjustable baseline, zoom, and focus). Therefore, it is desirable to develop processes for determining calibration metadata at different camera setting values using a limited number of calibration points distributed over a few positions within the range of possible values for each camera setting. Camera settings also need to be rapidly adjustable and any changes made to the camera settings should cause real time changes in the appearance of images captured by the camera.

Some advantages of the methods of determining calibration metadata described herein include reducing the time and cost of the calibration process by minimizing the number of calibration points needed to derive calibration metadata at any camera setting value. Additionally, the methods of obtaining calibration metadata described herein are rapid enabling real time derivation of calibration metadata every time a camera setting changes. To increase the speed of calibration metadata derivations, the methods are suitable for implementation on a parallel processor such as a GPU or NPU.

Calibration of 3D Cameras Having Adjustable Camera Settings

To calibrate stereo camera systems having variable baseline and zoom, camera intrinsic calibration metadata and stereoscopic calibration metadata are calculated for a number of points within the zoom and baseline range of the camera. In one non-limiting example, at manufacture, sixteen calibration photos are taken at various positions within the range of baseline and zoom. The calibration positions may be equally spaced throughout baseline and zoom range with each photo taken at a different position and all photos taken at one of four zoom and baseline positions. For example, one photo at zoom position 0, baseline position 0; one photo at zoom position 0, baseline position 1; one photo at zoom position 1, baseline position 0; one photo at zoom position 1, baseline position 1; . . . one photo at zoom position 4, baseline position 4.

From the sixteen calibration photos, camera intrinsic calibration metadata is calculated for each camera module. The stereoscopic calibration metadata describing the relative position between the camera modules is then determined based on the intrinsic calibration metadata and the position of reference objects, for example, corners of a chessboard, within the photos captured by each stereo camera system module. Using an interpolation function, the known camera stereoscopic calibration metadata for at least one of sixteen calibration points can be used to calculate the camera intrinsic calibration metadata and the stereoscopic calibration metadata for any point within the zoom and/or baseline range of the camera.

Alternatively, using an extrapolation function, the known camera stereoscopic calibration metadata for at least one of the sixteen points having the greatest zoom and/or largest baseline value can be used to calculate the camera intrinsic calibration metadata and the stereoscopic calibration metadata for any zoom and/or baseline greater than the largest zoom and/or baseline with known calibration metadata. The interpolation and/or extrapolation functions may be linear, bicubic, quadratic, or polynomial functions. In some embodiments, a CPU may perform the interpolation and/or extrapolation function operations. Other example systems perform interpolation and/or extrapolation operations using a GPU or DSP implementation.

In one non-limiting example method of determining calibration metadata, calibration files including calibration metadata are assembled for a range of calibration points associated with different camera settings. The calibration points may be distributed evenly throughout the range of possible camera setting values to ensure at least one calibration point is in the vicinity of every possible value for a camera setting. The calibration metadata for each of the calibration points is measured during the calibration process to ensure accuracy. One or more interpolation functions are then applied to calibration metadata for calibration points having values for camera settings proximate to the real time values of the camera settings at a current camera position. Interpolated calibration metadata corresponding to the real time values of the camera settings is then used to rectify image frames for use in rendering a 3D display.

Figure 7A:
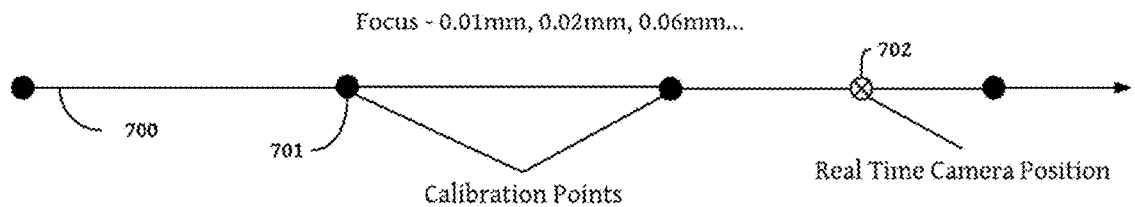
FIG. 7A is a sample calibration plot for determining stereo calibration parameters for camera systems having one camera setting.
Figure 7B:
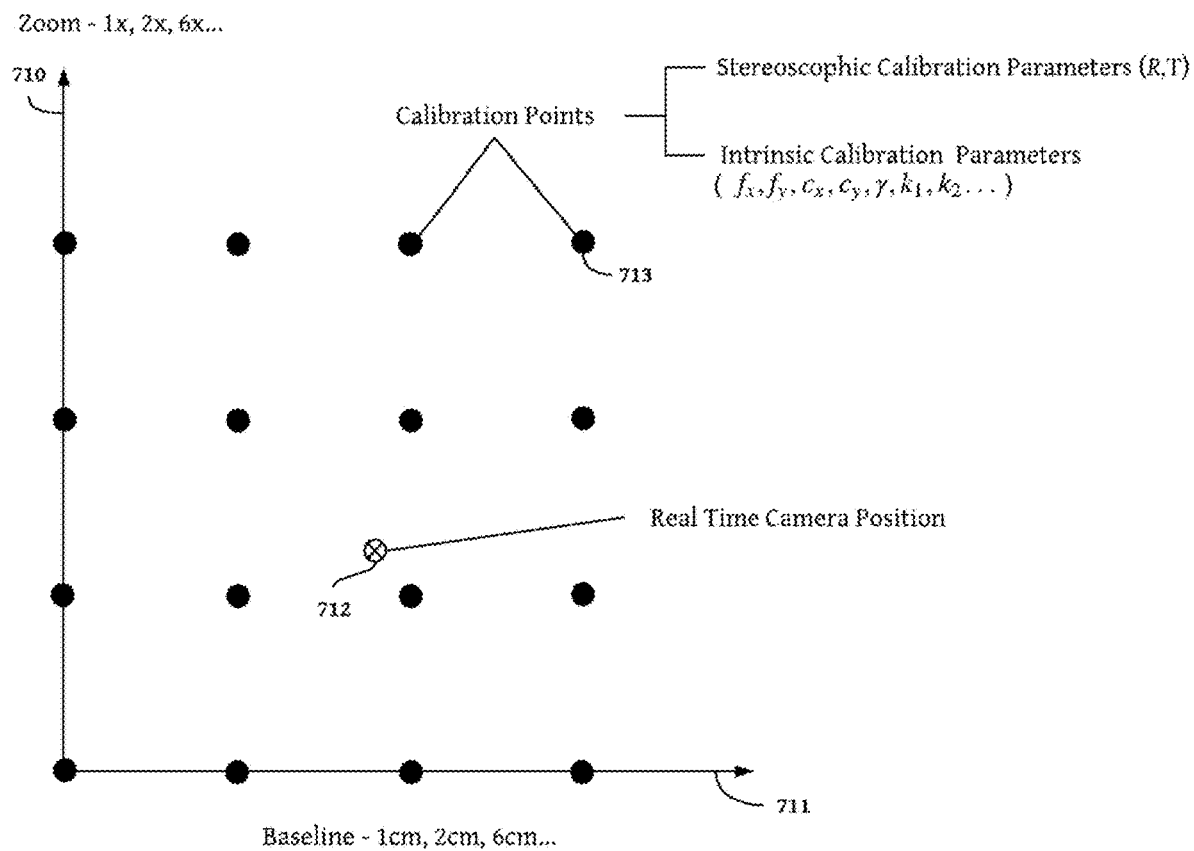
FIG. 7B is a sample calibration plot for determining stereo calibration parameters for camera systems having two camera settings.
Figure 7C:
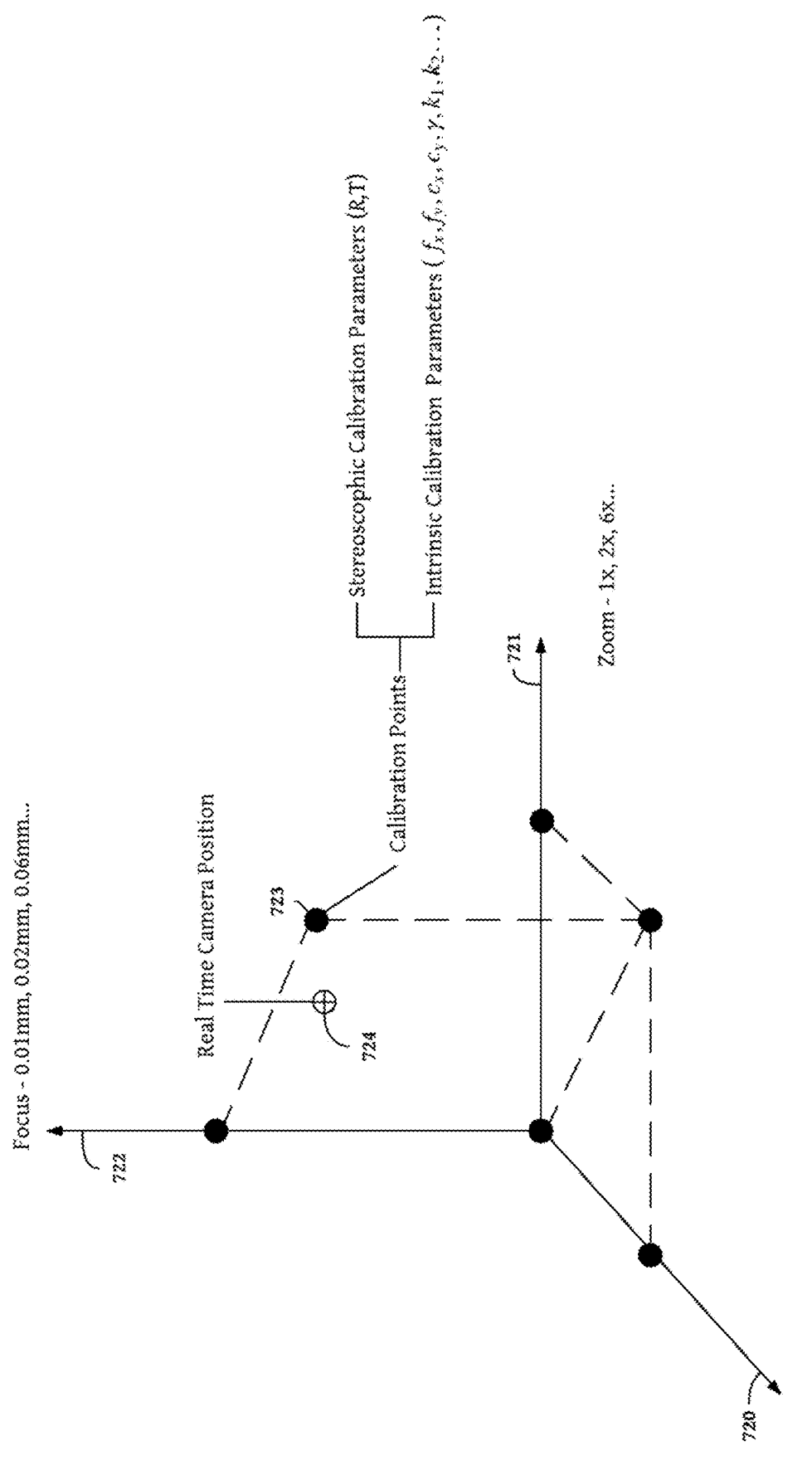
FIG. 7C is a sample calibration plot for determining stereo calibration parameters for camera systems having three camera settings.

FIGS. 7A-7C illustrate example arrays of calibration points for cameras having one, two, and three camera settings. One possible single dimension array of calibration points is shown in FIG. 7A. Focus is the only camera setting in the stereo camera system of this example and is shown on the x axis 700. Other camera systems may have baseline or zoom as the only camera setting. Each calibration point 701 shown on the x axis has a unique focus setting with the point on the far left positioned at focus setting 0 (e.g., 0.00 mm) and the focus setting on the far right positioned at focus setting 3 (e.g., 0.06 mm). The calibration points 701 may be linearly spaced so that equal increments of camera setting values separate each calibration point 701. Alternatively, the calibration points 701 may be non-linearly spaced with unequal increments of camera setting values separating each calibration point 701. In the example shown in FIG. 7A, the real time camera position has a focus setting between focus setting 2 (e.g., 0.02 mm) and focus setting 3 (e.g., 0.06 mm).

Camera devices having two camera settings may require additional calibration points because a few calibration points are needed within the range of values for each camera setting. One possible two dimensional array of calibration points is shown in FIG. 7B. In the figure, sixteen calibration points 713 are plotted in a two dimensional space with zoom 710 shown in the y dimension and baseline 711 shown in the x dimension. Other camera systems (e.g., mobile device cameras) may have zoom and focus as the two camera settings. stereo camera systems may also have focus and baseline as camera settings or, alternatively, any two of zoom, focus, baseline, aspect ratio, and camera relative rotation. Each of the sixteen calibration points 713 has unique values for baseline and zoom settings. In FIG. 7B, for example, the calibration point in the lower left has baseline setting 0 (e.g., 0 cm) and zoom setting 0 (e.g., 0×) and the calibration point in the upper right has baseline setting 3 (e.g. 10 cm) and zoom setting 3 (e.g. 10×). The real time camera position 712 is shown closest to the calibration point having baseline setting 2 (e.g., 2 cm) and zoom setting 1 (e.g., 1×).

stereo camera systems having three or more camera settings may require more calibration points (e.g., 64) relative to cameras with only one or two camera settings. One possible three dimensional array of calibration points is shown in FIG. 7C. In the figure, calibration points 723 are plotted in a three dimensional space with baseline 720 shown in the x dimension, zoom 721 shown in the y dimension, and focus 722 shown in the z dimension. The real time camera position 724 is shown closest to the calibration point having baseline setting 1 (e.g., 1 cm), zoom setting 1 (e.g., 1×), and focus setting 1 (e.g., 0.01 mm). A camera device has distinct calibration metadata at every unique value for each camera setting (e.g., the calibration metadata is distinct for every unique combination of baseline, zoom, focus, and all other camera settings). Therefore, each calibration point 723 has unique calibration metadata including distinct values for stereoscopic calibration parameters (collectively referred to as stereoscopic calibration metadata) and intrinsic calibration parameters (collectively referred to as intrinsic calibration metadata).

In one possible example, stereoscopic calibration parameters include a rotation matrix and a projection transform matrix (also referred to as a translation matrix). The rotation matrix (R) is a matrix of n dimensions (e.g., 3×3) that maps the relative rotation between the left and right camera modules in three dimensions (X, Y, and Z). The rotation matrix is the product of three elemental rotation matrices describing the rotational offset in each dimension. In one example, the elemental rotation matrices include trigonometric functions of Euler angles quantifying the rotational offset between camera modules. The projection transform matrix (T) is a matrix of n dimensions (e.g., 3×1) that describes the vertical offset between left and right camera modules in three dimensions (X, Y, and Z).

Rectification and projection matrices for rectifying and warping image frames captured by the right and left image channels are generated from the rotation and projection transform matrices. Each image channel in a stereo camera or other multi-camera system has a unique set of rectification and projection matrices because manufacturing variations between the camera modules cause the rotational and vertical translation offsets to be different for every image channel. In stereo camera systems, rectification (R1, R2) and projection matrices (P1, P2) are generated for the right and left image channels from the rotation matrix (R) and projection transform matrix (T). The right rectification and projection matrices (e.g., R1, P1) rectify and warp the right image channel and the left rectification and projection matrices (R2, P2) rectify and warp the left image channel so that both images appear as if they were taken from the same image plane with no lens distortion.

Figure 13:
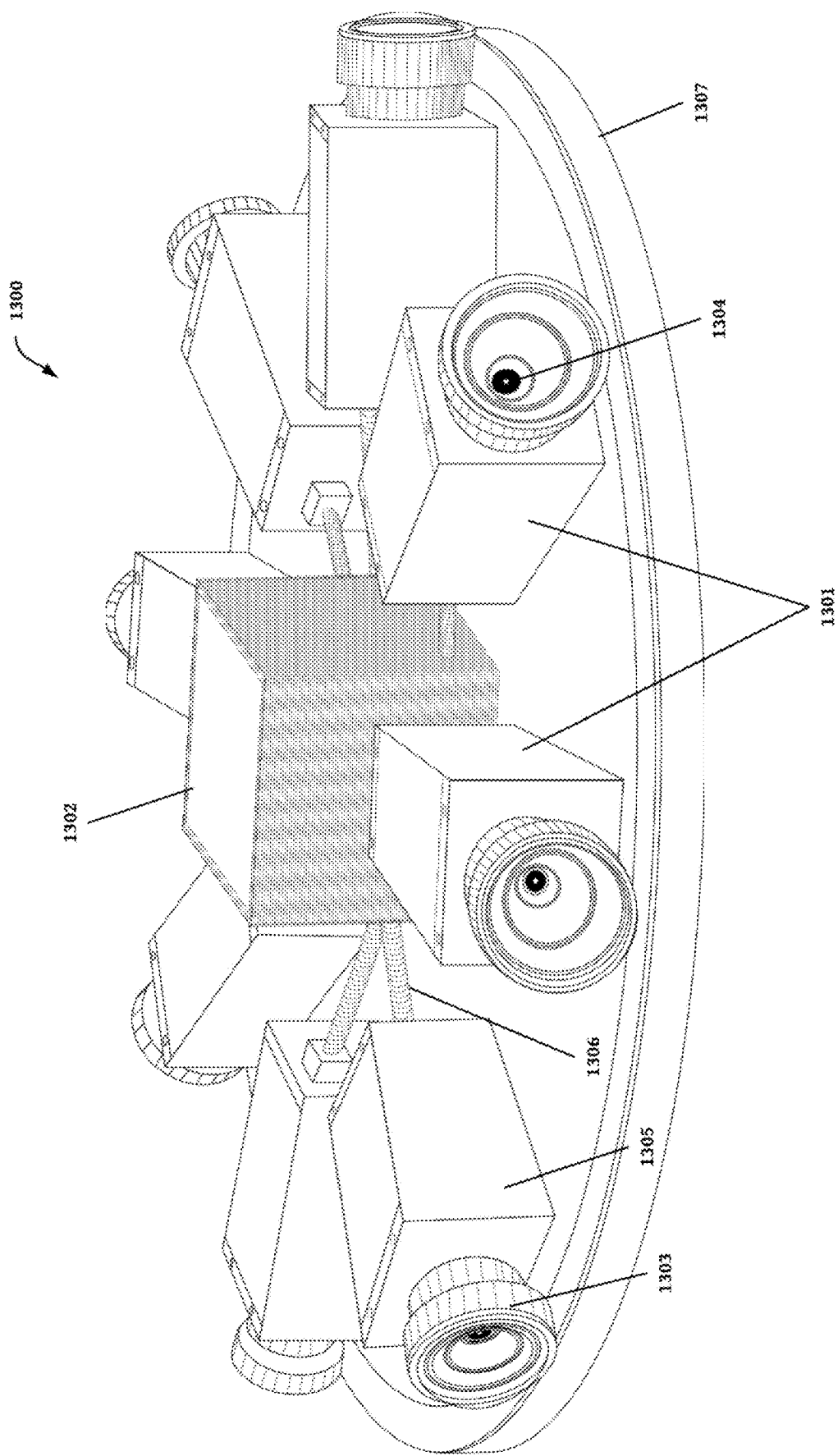
FIGS. 13 and 14 show an example multi-camera system having multiple camera settings.
Figure 14:
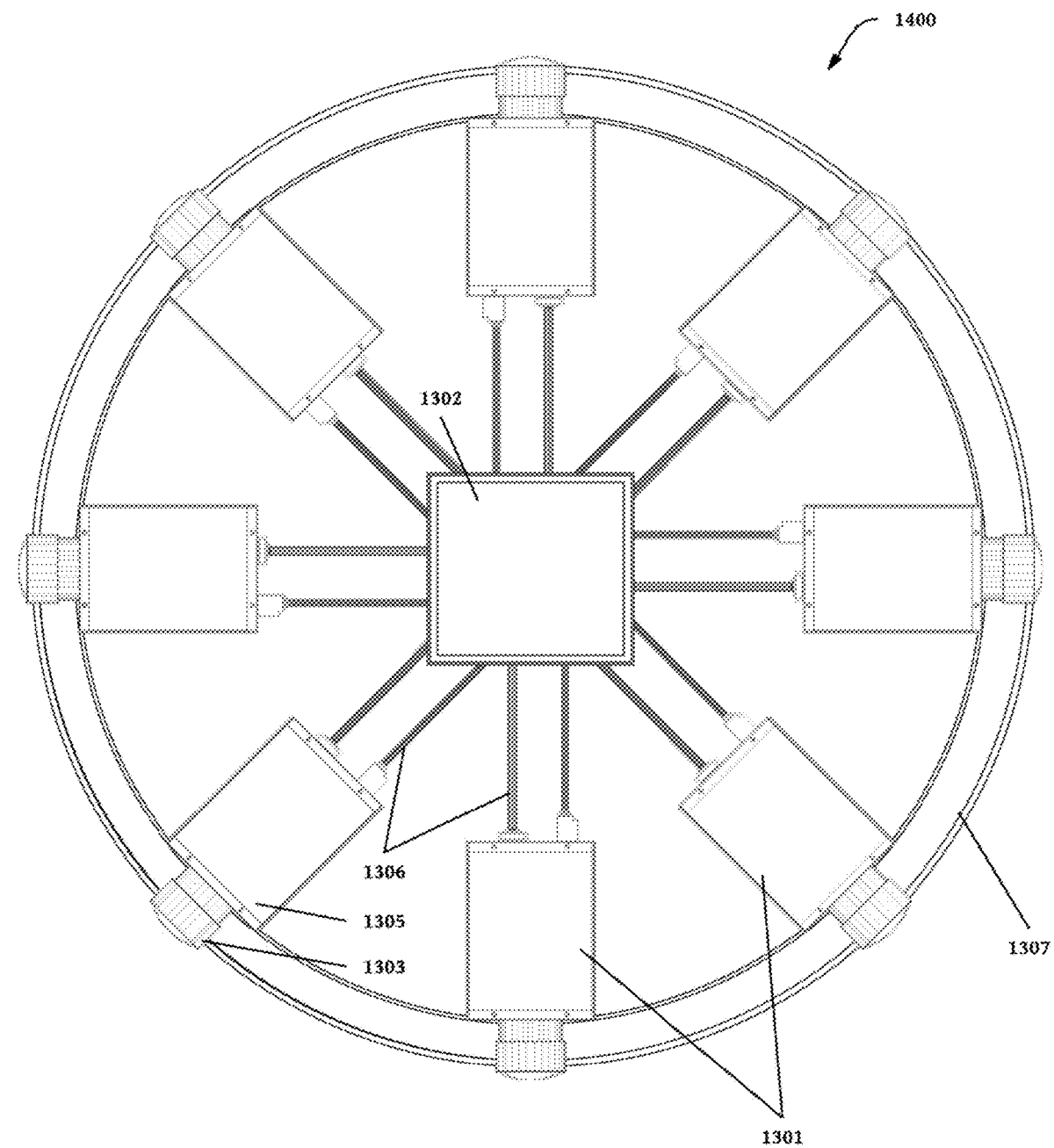

In stereo camera systems having multiple camera modules, a camera module may form a stereo pair with more than one camera module. Therefore, a single camera module may have multiple sets of rectification and projection matrices (e.g., a right rectification and projection matrix R1, P1 when paired with a left camera and a left rectification and projection matrix R2, P2 when paired with a right camera). FIGS. 13-14 illustrate one multi-camera embodiment with each camera module having multiple stereo pairs.

Intrinsic calibration parameters may include lens and image sensor properties, for example, focal lengths ($f_x$, $f_y$), distortion centers ($c_x$, $c_y$), skew coefficient between the x and y directions ($\gamma$), distortion coefficients (k1, k2, k3, ... , kn), and other measurements related to the internal aspects of a camera module. In one possible example, intrinsic calibration parameters may be separated into a 3×3 floating point intrinsic calibration parameter matrix (K) having 5 unknown values ($f_x$, $f_y$, $c_x$, $c_y$, and $\gamma$) and a distortion vector (D) comprising between 1 and 16 distortion coefficients. Manufacturing variations cause each camera module in a stereo camera or other multi-camera system to have unique intrinsic calibration parameters.

In one example intrinsic calibration parameter matrix (K), the intrinsic calibration parameters may be arranged where:

$$K = \begin{bmatrix} f_x & \gamma & c_x \\ 0 & f_y & c_y \\ 0 & 0 & 1 \end{bmatrix}$$

In stereo calibration techniques, the intrinsic calibration metadata for each camera module may impact the stereoscopic calibration metadata for the 3D camera device. Therefore, stereo calibration begins with determining the intrinsic calibration parameters for each camera module. Intrinsic calibration parameters are then used to generate a unique intrinsic calibration parameter matrix K and distortion vector D for the left and right image channels of a stereo camera. Based on the intrinsic calibration metadata (e.g., $K_R$, $K_L$, $D_R$, and $D_L$), the stereoscopic calibration metadata for the left and right camera modules (e.g., the rotation (R) and transformation (T) matrices) is determined. Using R and T, rectification and projection matrices are then generated for the right and left image channels. Image frames produced by each channel are rectified and warped using the rectification and projection matrices so that the left and right image frames appear as if they were captured from the same image plane.

Interpolation of Stereoscopic Calibration Metadata

When using a stereo camera system having one or more stereo cameras it is desirable to move between different camera settings. Transitions between camera setting values should be smooth and precise. Additionally, to minimize manufacturing complexity and cost, the calibration process should be quick and easy. In one example method of determining calibration metadata for real time camera setting values not associated with a calibration point, calibration metadata for calibration points associated with a limited number of values for each camera setting is saved in memory. Calibration metadata for calibration points may be saved as a calibration file including calibration metadata for all calibration points or as a library of calibration files with each file including calibration metadata for a distinct calibration point. Applying an interpolation function to calibration metadata mapped to calibration points having a camera setting proximate to the real time camera setting constructs a virtual calibration point having calibration metadata for the real time camera setting. For real time camera positions having multiple camera settings that do not map to a calibration point, one or more interpolation functions may be used to derive the real time calibration parameters corresponding to real time camera setting values. Single dimension and/or multi-dimension interpolation functions may be used to determine the real time calibration parameters for one or more real time camera settings based on the calibration metadata for the calibration points having camera setting values most proximate to the real time camera setting values.

For accurate rectification of stereo images captured over a range of camera settings, interpolation operations must be done every time one or more real time camera settings deviate from the camera settings at a calibration point. An interpolation operation must be done for each unknown calibration parameter. Depending on the parameters being interpolated and the difference between the real time camera setting values and the camera setting values associated with calibration points, interpolation functions may include one dimensional interpolation methods (e.g., one dimensional nearest neighbor interpolation, linear interpolation, or cubic interpolation) or multi-dimensional interpolation methods (e.g., two dimensional nearest neighbor interpolation, bilinear interpolation, bicubic interpolation, trilinear interpolation, or tricubic interpolation). Additionally, interpolation functions may include single-variate methods (i.e., methods yielding one unknown calibration parameter) or multi-variate methods (i.e., methods allowing simultaneous solving for two or more calibration parameters).

In one example interpolation method for determining calibration parameters for camera systems having two or more camera settings, a quadratic or triangular mesh grid containing values for calibration parameters mapped to calibration points associated with two or more camera settings is assembled from reading calibration file(s). The mesh grid may comprise a multi-dimensional space with one camera setting along each axis or dimension. The position of the real time camera setting values within the mesh grid is then located along with the three or four calibration points having the most proximate location within the mesh grid space (i.e. the most similar camera settings). Calibration parameters for the most proximate three or four calibration points is then input into a interpolation function to derive calibration parameters for the real time camera setting values. Each calibration parameter may be input separately into a calibration function (e.g., a three or four values for focal length x coordinate ($f_x$) input into a first interpolation function to derive the focal length x coordinate ($f_x$) for the real time camera settings, three or four values for focal length y coordinate ($f_y$) input into a second interpolation function to derive the focal length y ($f_y$) coordinate for the real time camera settings, and so on until all calibration parameters are derived). In this example, the same or different interpolation functions may be applied to the values for each calibration parameter. Alternatively, values for two or more calibration parameters corresponding to the three or four calibration points with camera setting values most proximate to the real time camera setting values may be input into an multi-variate interpolation function to simultaneously derive two or more calibration parameters for the real time camera settings.

Methods of determining calibration parameters for camera systems having one camera setting are less complex because the value for the real time camera setting 702 is collinear to the calibration points 701. A single dimension (e.g., linear) interpolation function is used to derive the calibration metadata when the camera device has a real time camera setting value distinct from the camera setting values associated with calibration points. In examples with one camera setting, the total number of interpolations is equal to the total number of calibration parameters included in calibration metadata (e.g., 5 intrinsic calibration parameters in K, 3 intrinsic calibration parameters in D, 3 extrinsic calibration parameters in R, and 3 extrinsic calibration parameters in T for a total of 14 interpolations).

For camera systems with two camera settings and a real time camera position 712 having camera setting values located between four calibration points 713 (i.e. the real time position is not collinear to any known calibration points) one or more single dimension interpolation functions or one multi dimensional interpolation function per calibration parameter may be used to derive the calibration metadata for the real time camera settings. In one example, if a series of single dimension interpolation functions are used, the total number of interpolations may be equal to the number of uncalibrated real time camera setting values (e.g., 2) times the number of unknown calibration parameters (e.g., 14 for a total of 28 interpolations). One linear interpolation function is needed per dimension (i.e., camera setting) because these methods rely on first dividing the two dimensional array of calibration points into two one dimensional arrays. Examples, using multi-dimension interpolation functions may reduce the total number of interpolations by a factor of 2 so that the number of interpolation operations equals the number of unknown calibration parameters (e.g., 14).

Figures 8A, 8B:
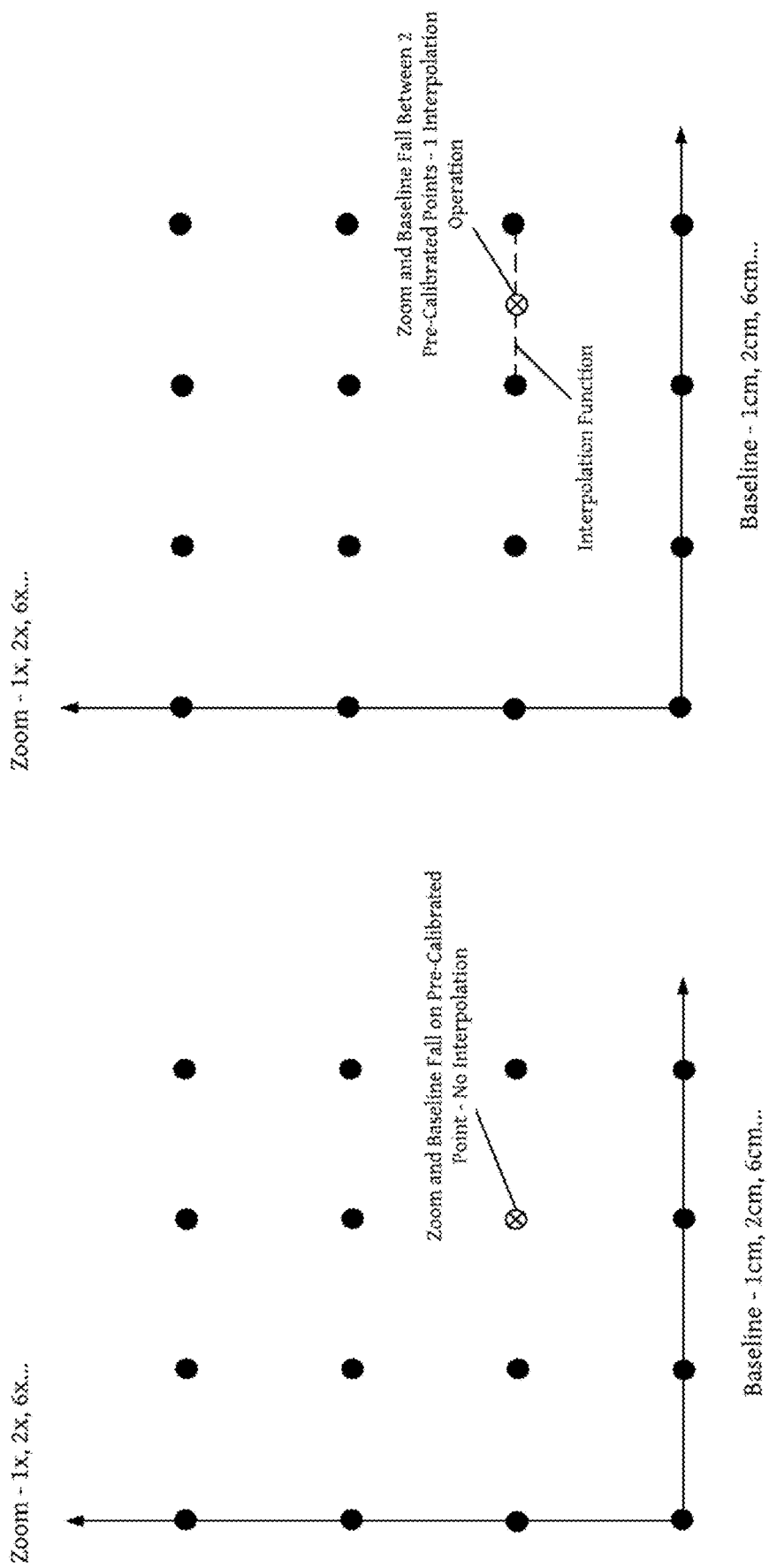
FIGS. 8A though 8C show interpolation methods for determining stereo calibration parameters for a camera system having two camera settings.
Figure 8C:
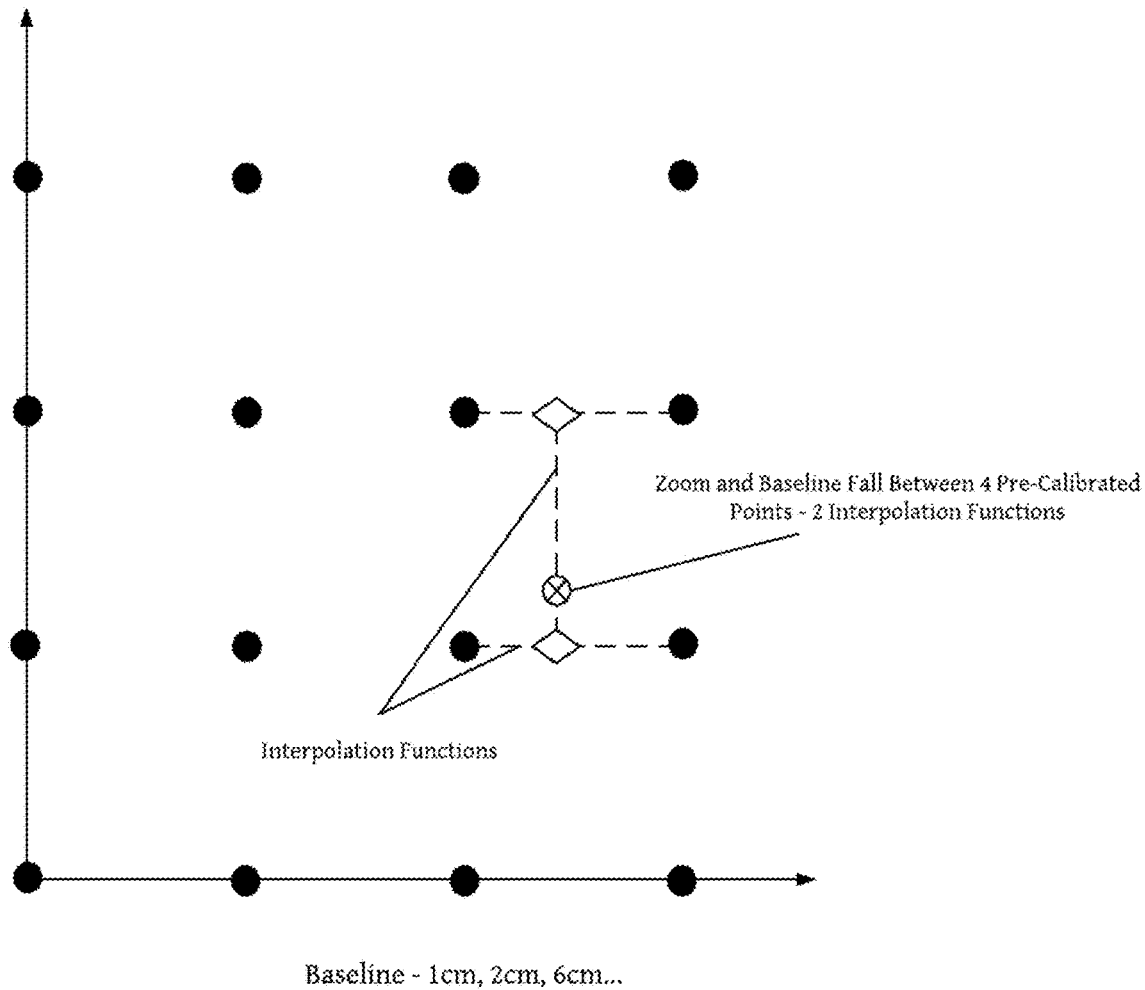
FIGS. 8D though 8E show one example interpolation method for determining stereo calibration parameters for a camera system having three camera settings.

FIGS. 8A-C describe the interpolation process for stereo camera systems having two camera settings in more detail. FIG. 8A shows a camera real time position directly on one of the calibration points having measured calibration metadata. To determine the camera intrinsic calibration parameters and stereoscopic calibration parameters for cameras in this position, no interpolation operations are needed. Instead, the calibration metadata for the calibration point mapping to the real time values for the camera settings (e.g., baseline and zoom) is used to generate the rectification (R1, R2) and projection matrices (P1, P2) needed to rectify and warp the left and right image channels.

FIG. 8B shows a camera real time position having values for real time camera settings between the camera setting values at two known calibration points. In this example, the real time position of the camera falls between a first calibration point having a baseline setting 2 (e.g., 2 cm) and zoom setting 1 (e.g., 1×) and a second calibration point having a baseline setting 3 (e.g., 6 cm) and a zoom setting 1 (e.g., 1×). To determine the calibration metadata at this position, an interpolation function may be used to generate each intrinsic and stereoscopic calibration parameter. The interpolation function takes as input a calibration parameter for the first calibration point and a corresponding calibration parameter for the second calibration point (i.e. $f_x$ for the first calibration point and $f_x$ for the second calibration point). By performing a sequence of interpolation operations on the set of calibration parameters, the real time calibration parameter (i.e. $f_x$ for the virtual calibration point mapping to the real time camera setting) is generated as output. The same interpolation process is then repeated for each intrinsic and extrinsic calibration parameter included in the calibration file(s).

In this example, the camera real time position falls between two calibration points having the same zoom and/or focus settings. Absent a change in zoom and/or focus, the intrinsic calibration parameters (e.g., focal lengths, distortion centers, and distortion coefficients) may remain constant or may only change by a negligible amount. Therefore, it may be possible to determine real time calibration parameters for the camera real time position by interpolating the between the stereoscopic calibration parameters (e.g., R and T) for the calibration points having the camera settings most proximate to the real time camera settings. In some cases changing baseline may physically shift the camera modules, therefore, changing the baseline setting absent any change in value for the zoom and/or focus setting may still require interpolating both the camera intrinsic parameters and the stereoscopic calibration parameters for the calibration points having camera setting values most proximate to the real time camera settings.

Another possible optimization may be available when only the value of an intrinsic parameter dependent camera setting (e.g., zoom or focus) changes and baseline remains constant. In some cases, keeping the same value for the baseline setting ensures the stereoscopic calibration points remain constant. Therefore, it may be possible to determine real time calibration parameters for the real time camera position by interpolating between the intrinsic calibration parameters (e.g., focal lengths, distortion centers, and distortion coefficients) for the calibration points having the camera settings most proximate to the real time camera settings. In some situations, changing the focus or zoom impacts the stereoscopic calibration parameters, therefore, changing the value of the zoom and/or focus setting absent any change in value for the baseline setting may still require interpolating both the camera intrinsic parameters and the stereoscopic calibration parameters for the calibration points having camera setting values most proximate to the real time camera settings.

FIG. 8C shows a real time camera position having values for two camera settings that fall between the camera setting values at four calibration points. In this example, the values for the real time camera settings at the real time camera position are between a first calibration point having a baseline setting 2 (e.g., 2 cm) and a zoom setting 1 (e.g., 1×); a second calibration point having a baseline setting 3 (e.g., 6 cm) and a zoom setting 1 (e.g., 1×); a third calibration point having a baseline setting 2 (e.g., 2 cm) and a zoom setting 2 (e.g., 2×); and a fourth calibration point having a baseline setting 3 (e.g., 6 cm) and a zoom setting 2 (e.g., 2×).

To determine the calibration metadata for a virtual calibration point having values for real time camera settings between the camera setting values at four calibration points, a sequence of two interpolation functions may be used. A first interpolation function generates two intermediate calibration points by interpolating calibration metadata in the x dimension between the first and second calibration points and the third and fourth calibration points. The intermediate calibration points map to intermediate calibration metadata (e.g., intermediate intrinsic calibration parameters and intermediate extrinsic calibration parameters) and are collinear to the virtual calibration point having values for real time camera settings that correspond to the real time camera position. A second interpolation function then interpolates in the y dimension between the intermediate calibration parameters at the intermediate calibration points to generate real time calibration metadata for the real time camera position having real time camera settings. The sequence of interpolation functions must be performed for each calibration parameter every time the real time camera position has at least one real time camera setting value that does not correspond a camera setting value associated with a calibration point.

Alternatively, a multi-dimensional interpolation function (e.g., bilinear interpolation) may be used to interpolate between the four calibration points. One implementation of a multi-dimensional interpolation function multiplies the product of linear interpolations in the x and y directions to generate a final output. A second multi-dimensional interpolation function generates a mesh grid space having calibration points oriented according to their associated camera setting values within a multi-dimensional space with one camera setting in each dimension. The real time camera settings are used to locate the area of the mesh grid containing the real time camera position and the most proximate calibration points. Values for a calibration parameter at the most proximate calibration points are input into an interpolation function to derive the calibration parameter at the real time camera settings. One example interpolation function determines the value of the calibration parameter at the real time camera settings by weighting the calibration parameter values of the most proximate calibration points (i.e. the calibration parameter value at the closest calibration point is weighted more heavily than the calibration parameter values at proximate calibration points that are further away from the real time camera position). The multi-dimensional interpolation function is applied to each calibration parameter to generate a complete set of real time calibration metadata. Other implementations of bilinear interpolation use barycentric coordinates to interpolate between three calibration points within a triangle. Relative to a sequence of linear or other one dimensional interpolation functions, a multi-dimensional interpolation function may be used to calculate the real time camera position with more accuracy, in less time, and/or with fewer computational resources. Regardless of the dimensionality or type of interpolation function used, the camera settings and calibration parameters must be interpolated for every unknown calibration parameter.

Figure 8D:
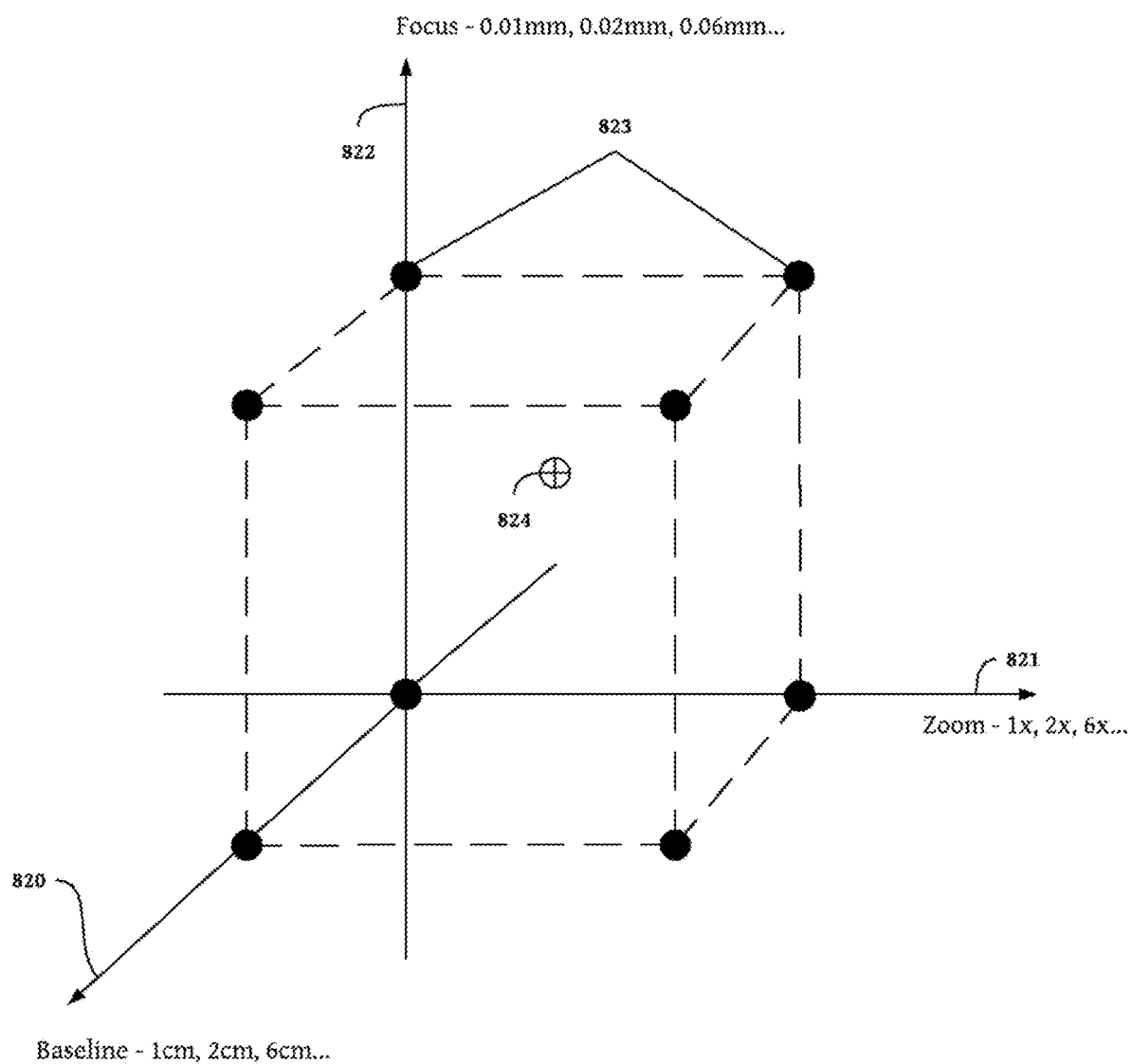

Camera systems having three camera settings (e.g., baseline, zoom, and focus) may have real time camera positions that fall between eight calibration points. In the example shown in FIG. 8D, the real time camera position 824 falls between a first calibration point 823 having a baseline setting 0 (e.g., 0 cm), a zoom setting 0 (e.g., 0×), and a focus setting 0 (e.g., 0 mm); a second calibration point having baseline setting 1 (e.g., 1 cm), zoom setting 0, and focus setting 0; a third calibration point having baseline setting 1, zoom setting 1 (e.g., 1×), and baseline setting 0; a fourth calibration point having baseline setting 0, zoom setting 1, and focus setting 0; a fifth calibration point having baseline setting 0, zoom setting 0, and focus setting 1 (e.g., 0.01 mm); a sixth calibration point having baseline setting 1, zoom setting 0, and focus setting 1; a seventh calibration point having baseline setting 1, zoom setting 1, and focus setting 1; and an eighth calibration point having baseline setting 0, zoom setting 1, and focus setting 1.

To calculate the real time calibration metadata for the real time camera position 824 it may be possible to apply a sequence of three linear interpolations. The interpolation sequence derives real time calibration parameters from the calibration parameters for calibration points having camera settings most proximate to the real time camera settings. Intermediate calibration points having intermediate calibration metadata at the correct focus setting, zoom setting, and baseline setting may be computed separately using a linear interpolation function then mathematically combined (e.g., by multiplying the product of each linear interpolation). Any combination of one dimensional interpolation functions (e.g., one dimensional nearest neighbor, linear, cubic, or polynomial interpolations) may be combined to derive real time calibration parameters for a real time camera position having three or more real time camera settings.

Figure 8E:
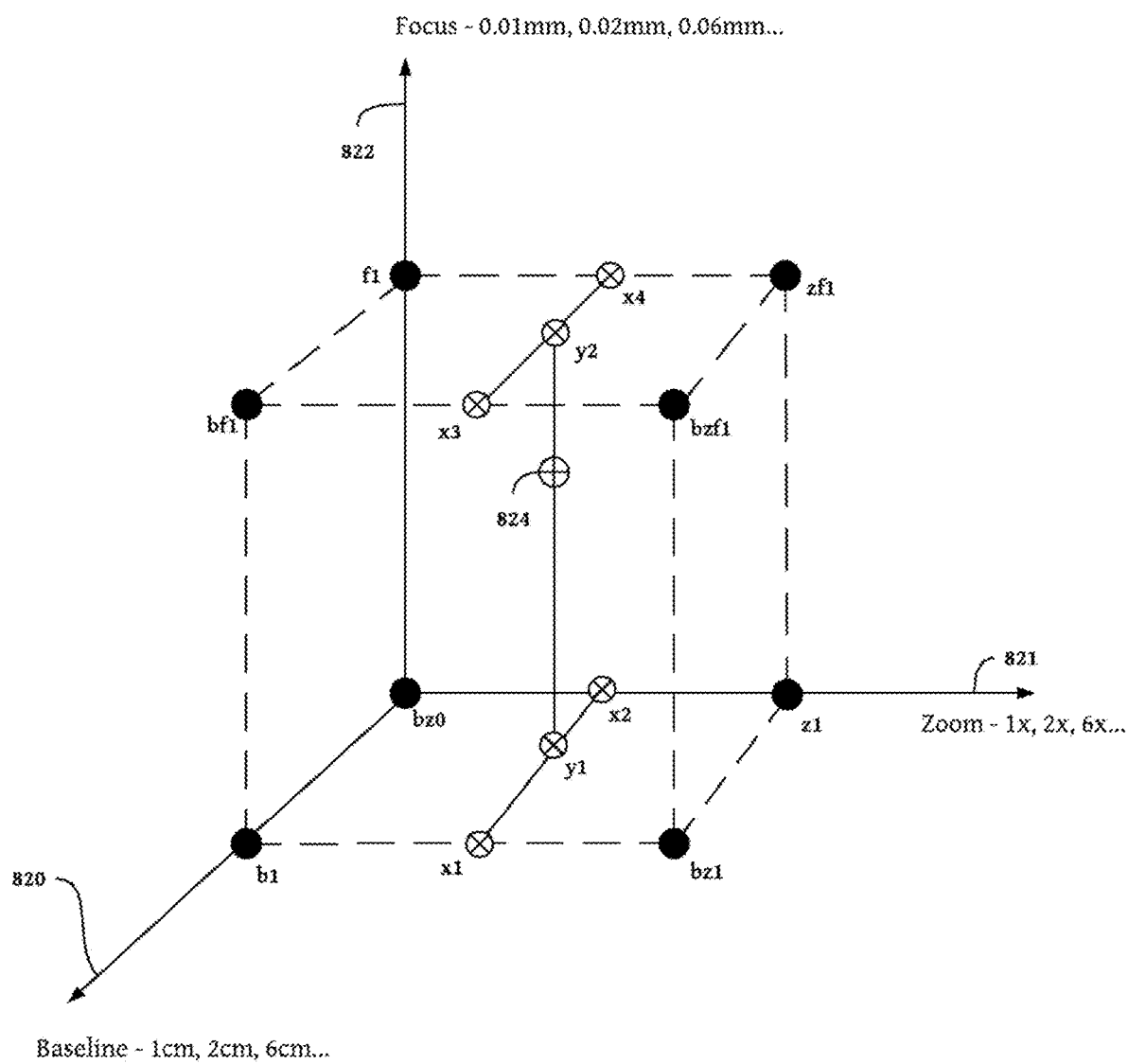

Alternatively, a multi-dimensional interpolation function may be used to interpolate between the calibration point mappings of the camera settings to the calibration parameters. In one example, a trilinear interpolation method may be used to approximate the real time calibration parameter values at a real time camera position 824 between eight calibration points by preforming multivariate interpolation on a 3 dimensional regular mesh grid. In one example, a trilinear interpolation is identical to two bilinear interpolations combined with a linear interpolation. As shown in FIG. 8E, a trilinear interpolation function for determining real time calibration parameters at a real time camera position 824 between eight calibration points involves first interpolating the calibration parameter values for the proximate calibration points along the x dimension (e.g., zoom) on b1, bz1 to get x1; on bz0, z1 to get x2; on bf1, bzf1 to get x3; and on f1, zf1 to get x4. A first bilinear interpolation is then performed along the y dimension (e.g., baseline) on the first set of intermediate calibration points generated by the first liner interpolation function (e.g., x1, x2 and x3, x4) to get a y1 and y2. Lastly, a second bilinear interpolation is performed along the z dimension (e.g., focus) on the second set of intermediate calibration points generated by the second bilinear interpolation (e.g, y1, y2) to get the real time calibration values at the real time camera position 824.

Other multi-dimensional interpolation functions (e.g., bicubic, tricubic, bipolynomial, or tripolynomial) may be used interpolate calibration parameters in systems having three or more camera settings. A multi-dimensional interpolation function may be used to calculate the real time calibration parameters with more accuracy, in less time, and/or with fewer computational resources relative to a sequence of linear or other one dimensional interpolation functions. Absent an optimization available when only one of two or camera settings changes and regardless of the dimensionality or type of the interpolation function used, each calibration parameters must be interpolated to generate a complete set of real time calibration metadata.

Single and multi-dimensional interpolation functions can be implemented for execution on CPU, mobile CPU, GPU, mobile GPU, NPU, and/or mobile NPU processors. GPU implementations may leverage a hardware acceleration functionality that performs interpolation operations significantly faster, with greater computation parallelization, with less power consumption, and/or using less explicit program instructions relative implementations on a general purpose CPU. Example GPU implementations may be written in C, C++, or a shading language (e.g., OpenGL Shading Language). These implementations may incorporate a helper-function that returns an interpolation between two inputs for a parameter in the closed unit interval. In one non-limiting example, single dimensional interpolation functions may include one dimensional nearest neighbor, linear, cubic, or polynomial interpolations. Non-limiting examples of two dimensional interpolation functions include two dimensional nearest neighbor, bilinear, bicubic, or bipolynomial interpolations. Non-limiting examples of other multi-dimensional interpolation functions include bicubic, tricubic, bipolynomial, or tripolynomial interpolations.

Figure 9:
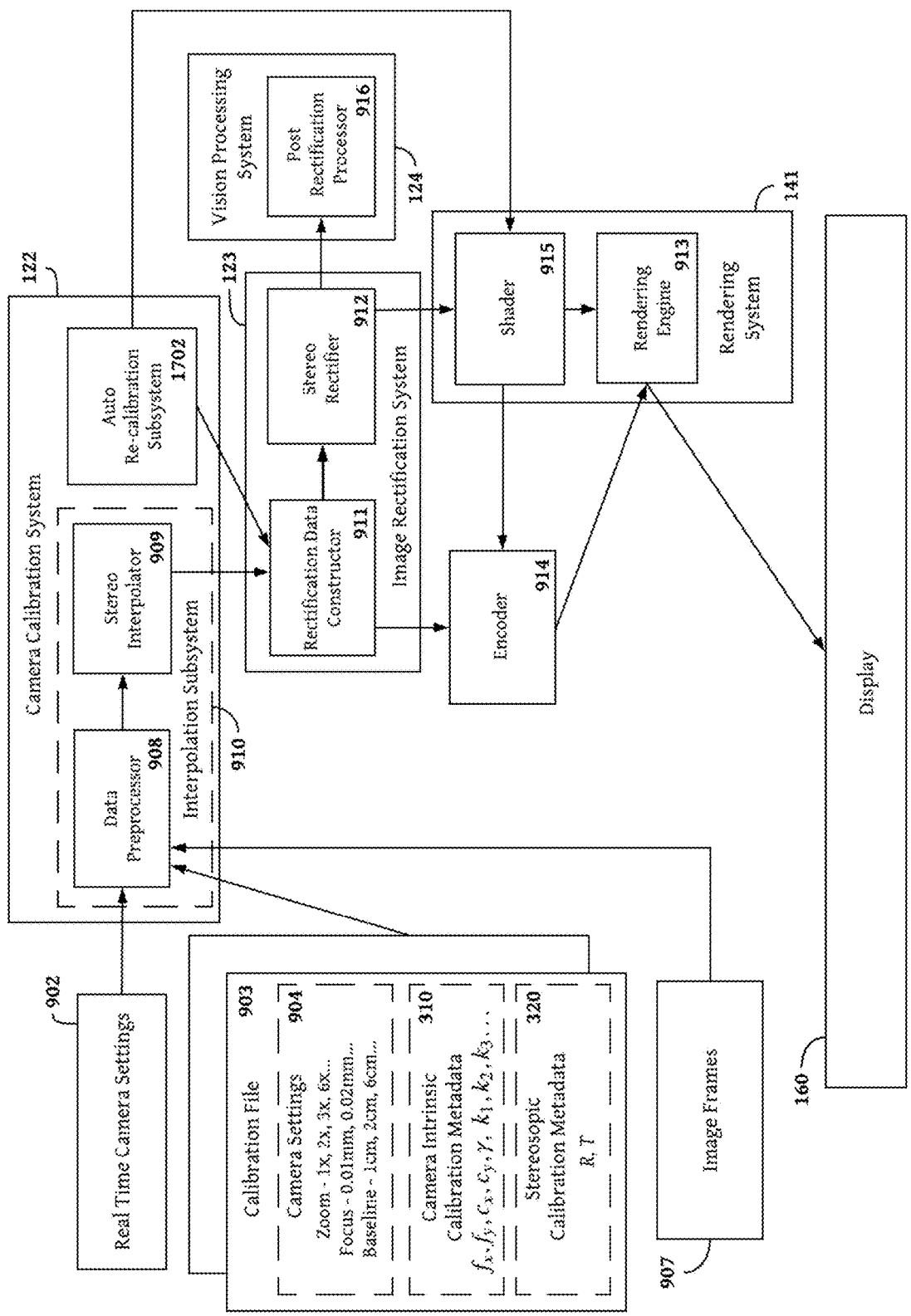
FIG. 9 is a high-level block diagram illustrating a high level system architecture for implementing methods of interpolating camera calibration parameters.

System Architecture for Implementing Methods of Interpolating Calibration Metadata FIG. 9 is a block diagram illustrating a high level system architecture for implementing the methods of interpolating calibration metadata described above. In one non-limiting example, the interpolation subsystem 910 within the camera calibration system 122 processes calibration file(s) 903, real time camera settings 902, and raw image frames 907 to generate rectified 3D image frames and video sequences for display on a display device (e.g., a high definition display, touchscreen display, computer, mobile device, or HMD). The interpolation subsystem 910 generates interpolated calibration metadata in real time based on real time camera settings 902.

Calibration metadata including intrinsic calibration metadata 310 and stereoscopic calibration metadata 320 may be arranged in one calibration file 903 having calibration metadata for all calibration points. Alternatively, calibration metadata may be organized as a library of calibration files, with each file 903 including calibration metadata for one calibration point. In either arrangement, calibration points and their corresponding calibration metadata are associated with camera settings 904 (e.g., zoom focus, baseline, aspect ratio, relative camera rotation, resolution white balance, shutter, iris, stabilizer, and gain) describing the configuration of the camera modules at each calibration point. One possible calibration file 903 implementation includes intrinsic calibration metadata 310 and stereoscopic calibration metadata 320 measured for sixteen or more calibration points. Intrinsic calibration metadata 310 may include camera calibration metadata (e.g., focal length, distortion centers, and x and y skew) and distortion coefficients (e.g., $k_1$, $k_2$, $k_3$, ... , $k_n$). Stereoscopic calibration metadata 320 may include rotation and transformation matrices (e.g., R, T).

The calibration file(s) 903 are stored in memory and read by the data preprocessor 908 as part of one or more routines for determining real time calibration metadata from a limited number of calibration points. Additional information received by the data preprocessor 908 as part of a routine for deriving real time calibration metadata may include real time camera settings 902 and raw image frames 907 or video sequences. A control circuit implemented on a camera device board controls the real time camera settings 902. In one example, the real time camera settings 902 are stored in a data buffer provided by memory resources included in the camera device control board. The data preprocessor 908 may read or otherwise receive values for the real time camera settings 902 from this data buffer. Example, real time settings 902 include the current baseline (e.g., 1 cm, 2 cm, and 6 cm), zoom (e.g., 1×, 2×, and 6×), and focus (e.g., 0.01 mm, 0.02 mm, and 0.06 mm) settings of a camera. Raw image frames 907 or video sequences captured by the left and right image sensors may be stored in and read from camera device memory by the data preprocessor.

After aggregating the calibration file(s) 903, raw image frames 907, and real time camera settings 902, one or more preprocessing operations may be performed by the data preprocessor 908. Example preprocessing operations include using one or more normalization functions to shift or rescale aggregated data (e.g., real time camera settings and calibration metadata) to a notionally common scale (e.g., 0 to 1). In one possible implementation, the data preprocessor 908 normalizes one or more calibration parameters by dividing parameter values by the pixel values for a camera video mode (e.g., for a 1080p video mode having a 1920× 1080 pixel resolution, dividing the x coordinates of the distortion centers and focal lengths by 1920 and the y coordinates of the distortion centers and focal lengths by 1080). This normalization operation makes the rendering engine 900 compatible with video modes having any selected resolution. When the desired resolution has the same aspect ratio (e.g., 16:9) normalization may be done during the calibration phase so that normalized values for calibration parameters are included in the calibration file(s) 903. Alliteratively, resolutions having different aspect ratios (e.g., 1440×1080 pixels with a 4:3 aspect ratio) require normalization in real time because of the image sensor offset of the new aspect ratio relative to original aspect ratio. Normalized aggregate data may be written in memory and read by other components of the rendering engine 900 (e.g., the stereo interpolator 907) in advance of interpolation or rectification. Alternatively, calibration metadata may be normalized post interpolation and/or rectification by a rectification data constructor 911 or other component of the rendering engine 900.

The data preprocessor 908 may also select the calibration points to use for interpolation based on the calibration point(s) associated with camera settings 904 most proximate to the real time camera settings 902 received from the camera control board. Once the closest calibration points are isolated, the data preprocessor 908 may extract the calibration parameter values for input into an interpolation process from the calibration file(s) 903. Interpolation processes leveraging a mesh grid having calibration points and a real time camera position arranged by their camera setting values may use the data preprocessor 908 to construct the mesh grid space.

In one example, calibration parameters maybe arranged in a calibration file as one or more matrices. It may not be possible to perform interpolation functions directly on these matrices, therefore, the data preprocessor 908 may need to process one or more calibration parameter matrices to extract one or more raw calibration parameters to interpolate. The intrinsic calibration parameters included in the intrinsic calibration metadata 310 may be arranged in a K matrix where:

$$K = \begin{bmatrix} f_x & \gamma & c_x \\ 0 & f_y & c_y \\ 0 & 0 & 1 \end{bmatrix}$$

Similarly, the rotation matrix included in the stereoscopic calibration metadata may be arranged in a rotation matrix (e.g., R). In one example, the rotation matrix is formed from the product of three elemental rotation matrices that describe the rotational offset of a left camera module relative to a right camera module in three dimensions (i.e. offset about the x, y, and z axes). The three elemental rotation matrices are generated using Euler angles that define the rotational offset angels between the left and right camera modules. Euler angles (e.g., $\theta_x$, $\theta_y$, $\theta_z$) may be arranged in elemental rotation matrices where:

$$R_x = \begin{bmatrix} 1 & 0 & 0 \\ 0 & \cos(\theta_x) & -\sin(\theta_x) \\ 0 & \sin(\theta_x) & (\cos\theta_x) \end{bmatrix}$$

$$R_y = \begin{bmatrix} \cos(\theta_y) & 0 & \sin(\theta_y) \\ 0 & 1 & 0 \\ -\sin(\theta_y) & 0 & (\cos\theta_y) \end{bmatrix}$$

$$R_z = \begin{bmatrix} \cos(\theta_z) & -\sin(\theta_z) & 0 \\ \sin(\theta_z) & (\cos\theta_z) & 0 \\ 0 & 0 & 1 \end{bmatrix}$$

The product of the three elemental rotation matrices forms the rotation matrix (e.g., R) where $R=R_z R_y R_x$. In one possible implementation, the data preprocessor 908 extracts focal lengths ($f_x$, $f_y$), distortion centers ($c_x$, $c_y$), and the skew coefficient between the x and y directions ($\gamma$) from the K matrix. The data preprocessor 908 may similarly extract the Euler angles (e.g., $\theta_x$, $\theta_y$, $\theta_z$) from the elemental rotation matrices and/or the rotation matrix. After extraction, the focal lengths ($f_x$, $f_y$), distortion centers ($c_x$, $c_y$), skew coefficient ($\gamma$), and Euler angels (e.g., $\theta_x$, $\theta_y$, $\theta_z$) are sent to the stereo interpolator 909 for interpolation.

Other operations performed by the data preprocessor 908 may include filtering for inaccurate or incomplete data using one or more fault tolerance thresholds or variance functions. If any deficiencies are found, the data preprocessor 908 may also replace, modify, or delete the corrupt data. Additionally, one or more formatting functions may be performed by the data preprocessor 908 to reformat image data, calibration parameters, and/or measurement data in an array, string, database file, data stream, data frame, machine readable file format (e.g., .json or .xml file), or data structure.

Image frames 907 or video sequences captured by a camera device may also be enhanced by the data preprocessor 908. For color images, the data preprocessor 908 may sharpen, correct, blend, or distort colors by modifying the white balance of one or more matrices consistent with a YUV color space or RGB color space. The YUV color space is composed of three distinct components Y, U, and V where each two dimensional matrix represents a specific component of the YUV space. The Y component is the luminance component that relates to the brightness of the image. The U and V components are chrominance components that relate to the specific color of the image. Each pixel in an image is represented by a vector in the YUV color space (i.e., some combination of the Y, U, and V components). To modify colors rendered in one or more pixels of an image, the data preprocessor 908 may alter a vector in the YUV color space or elements of the two dimensional Y, U, and V matrices.

In some embodiments, the image is represented by three two dimensional matrices consistent with a RGB color space. The RGB color space is also composed of three distinct components R, G, and B where each two dimensional matrix represents a specific component of the RGB space. All three of the distinct components (i.e., R, G, and B components) are all chrominance components that relate to the specific color of the image. To modify colors rendered in one or more pixels of an image in an RGB color space, the data preprocessor 908 may alter elements of the two dimensional R, G, B matrices. It is appreciated that the image may be represented in any color space and is not limited to the YUV or RGB color spaces. The data preprocessor 908 may also modify color in images represented by matrices compatible with other color spaces.

In addition to color, other aspects of scene capture may also be improved by the data preprocessor 908. Occlusion zones, blurred edges between captured objects, out of focus areas, low resolution zones, and other image defects may be corrected by processing raw image frames 907 or video sequences using one or more image correction models executed on the data preprocessor 908. In one possible implementation, image correction models include machine learning models trained on image data (e.g., an occlusion zone blending model implemented as a convolutional neural network or a geometry and context convolutional neural network).

The stereo interpolator 909 derives real time calibration metadata for real time camera positions having real time camera settings 902 that are not associated with calibration points included in a calibration file(s) 903. By performing interpolation processes on data received from the data preprocessor 908, the stereo interpolator generates calibration metadata for any camera configuration having uncalibrated camera setting values in real time. In one example, the stereo interpolator 909 performs a sequence of linear and/or multi-dimensional interpolations to determine real time calibration metadata. Post generation, the real time calibration metadata is used to rectify image frames 907 and video sequences captured using camera configurations comprising one or more camera settings (e.g., baseline, zoom, focus aperture, aspect ratio, relative camera rotation, white balance, shutter, iris, stabilizer, and gain). In one implementation, calibration parameters for two or more calibration points having camera settings proximate to real time camera settings are interpolated using linear interpolation functions to generate real time calibration parameters. Alternatively, the stereo interpolator 909 may apply one or more multi-dimensional interpolation functions to calibration parameters corresponding to boundary points defining an area of mesh grid containing a real time camera position having real time camera settings. The boundary points may include calibration points contained in a calibration file, wherein the calibration points are associated with camera setting values most proximate to the real time camera setting values.

The stereo interpolator 909 may be configured to perform one interpolation computation for each calibration parameter. In instances where three camera settings (e.g., baseline, focus, and zoom) have values that do not map to a calibration point, values for each calibration parameter (e.g., $f_x$, $f_y$, $c_x$, $c_y$, $k_1$, $k_2$, $k_3$, $\theta_x$, $\theta_y$, $\theta_z$, $T_x$, $T_y$, and $T_z$) must be interpolated to derive real time calibration parameters including. Other camera configurations include only a change in the baseline setting. In some cases, to generate real time calibration metadata at this camera setting, just the values for each extrinsic parameters (e.g., $\theta_x$, $\theta_y$, $\theta_z$, $T_x$, $T_y$, and $T_z$) need to be interpolated because intrinsic parameters may not significantly change when baseline changes and zoom and focus stay constant. Alternatively, camera intrinsic calibration parameters for the left and right channels may impact the stereoscopic calibration parameters, therefore, the stereo interpolator 909 may first interpolate the right and left channel intrinsic calibration parameters (e.g., focal length, distortion centers, x and y skew, and distortion coefficients) then interpolate the stereoscopic calibration parameters (e.g., Euler angles and translation distances).

In one non-limiting example interpolation sequence, the stereo interpolator 909 performs twenty-four interpolation computations for determining real time calibration metadata for a stereo camera device having at least one uncalibrated baseline, zoom, or focus setting. Eight interpolation operations (four for each channel) are first performed to determine the real time intrinsic calibration parameters (focal length x, focal length y, distortion center x, and distortion center y) for the left and right channels. Ten interpolation computations (five for each channel) are then performed to determine the real time distortion coefficients ($k_1$, $k_2$, $k_3$, $k_4$, and $k_5$). Lastly, six interpolation computations for determining the real time Euler angels ($\theta_x$, $\theta_y$, $\theta_z$) and translation distances ($T_x$, $T_y$, $T_z$) between the right and left image channels are performed to complete the interpolation process. Other interpolation processes may involve more interpolation computations because they include steps for creating intermediate calibration points having intermediate calibration metadata between two or more calibration points. Subsequently, the values for the intermediate calibration metadata at two or more intermediate calibration points may be interpolated to generate the real time calibration parameters.

Once the interpolation computations are completed, the rectification data constructor 911 may create a virtual calibration point having real time calibration metadata for the real time camera settings. The rectification data constructor 911 generates the rectification ($R_1$, $R_2$) and projection matrices ($P_1$, $P_2$) using the real time calibration metadata. The rectification and projection matrices for the left image channel (e.g., $R_1$ and $P_1$) may be generated using real time calibration metadata for the left channel (e.g., $K_L$, $D_L$, R, and T) and the rectification and projection matrices for the right channel (e.g., $R_2$ and $P_2$) may be generated using real time calibration metadata for the right channel (e.g., $K_R$, $D_R$, R, and T).

The rectification data constructor 911 stores the real time calibration parameters corresponding to the virtual calibration point in a real time calibration file and the rectification and projection matrices for the left and right image channels as left and right rectification files. Both files are written to memory and are readable by other components of the stereo image rectification and 3D rendering system including the raw image embedder and the stereo rectifier 912. In one possible implementation, the raw image embedder may read a real time calibration file and/or rectification file and embed some or all of the real time calibration and/or rectification metadata in the header, subtitle channel or other component of a raw image file.

During playback, the stereo rectifier 912 may read a left channel rectification file and a left image frame to generate a left rectified image. Similarly, the stereo rectifier 912 may read a right channel rectification file and a right image frame to produce a rectified right image. To rectify images for a range of camera setting values, the interpolation process and subsequent generation of rectification and projection matrices is performed every time the value for a camera setting (e.g., zoom, baseline, or focus) changes to a camera setting value that does not map to a calibration point. For camera positions having two or more unknown camera settings, nonlinear interpolation functions including two dimensional nearest neighbor, bilinear, bicubic, or bipolynomial interpolations can be used to interpolate in two or more dimensions.

Components of the rendering engine 900 may use one or more DSP, CPU, NPU, and/or GPU implementations to rectify stereo images. In one possible configuration, the data preprocessor 908 includes a CPU implementation for performing operations on real time settings 902 and calibration file(s) 903 and a GPU implementation for processing image frames 907 and video sequences. CPU implementations of the stereo interpolator 909 and rectification data constructor 911 may derive real time calibration metadata for uncalibrated real time camera settings, generate rectification matrices, and write real time calibration and rectification files. Image rectification instructions included in the stereo rectifier 912 may be implemented on a GPU to convert raw image frames into rectified images and video sequences. CPU implementations may leverage one or more computer vision libraries and/or frameworks (e.g., OpenCV). GPU implementations may use one or more cross language, cross platform application programming interfaces or frameworks (e.g., OpenGL or OpenCL) to achieve hardware acceleration for image processing operations.

Raw, unrectified image frames including embedded calibration and/or rectification metadata may be encoded into an image (e.g., .jpeg) or video file (e.g., .mp4) by an encoder 914. Embedded metadata may be used to playback rectified images and video sequences on a display device 160 or over a content delivery network. In other implementations, the encoder 914 may encode the full raw image frame into an image file, video sequence, or real time steaming protocol (RTSP) video stream.

Alternatively, rectified image frames from the stereo rectifier 912 may undergo further processing by a post rectification processor 916 within the vision processing system 124. In one example, the post rectification processor 916 may generate one or more depth representations from a pair of images projected in rectified form. Non-limiting example depth representations include disparity maps, depth maps, point clouds, 3D scans, and surface scans. Depth information may be encoded into one or more rectified images (e.g., .jpeg or .png file) or video sequences (e.g., .mp4 file) by an encoder 914 to allow a media player to read the encoded depth information and generate a 3D image or video sequence on a display 160.

To render stereo images and video frames post rectification image data including position data and color data for rectified image frames (i.e., image position data) is passed to the rendering system 141. A shader 915 generates display position data describing the location on the display screen to project content included in image data captured by the image sensor by transforming image position data (i.e., longitude and latitude or x and y coordinates for pixels on the image sensor) to display position data (i.e., longitude and latitude or x and y coordinates for pixels on the display screen) for all image data included in the image frame. The rendering engine 913 then renders color data for each image pixel on a display pixel within the display screen by projecting the color data included in each image pixel at the display screen pixel location specified by the display position data. To make display position data available on playback, display position data generated by the shader may be encoded or embedded into image files and or video streams by the encoder 914.

Figure 10:
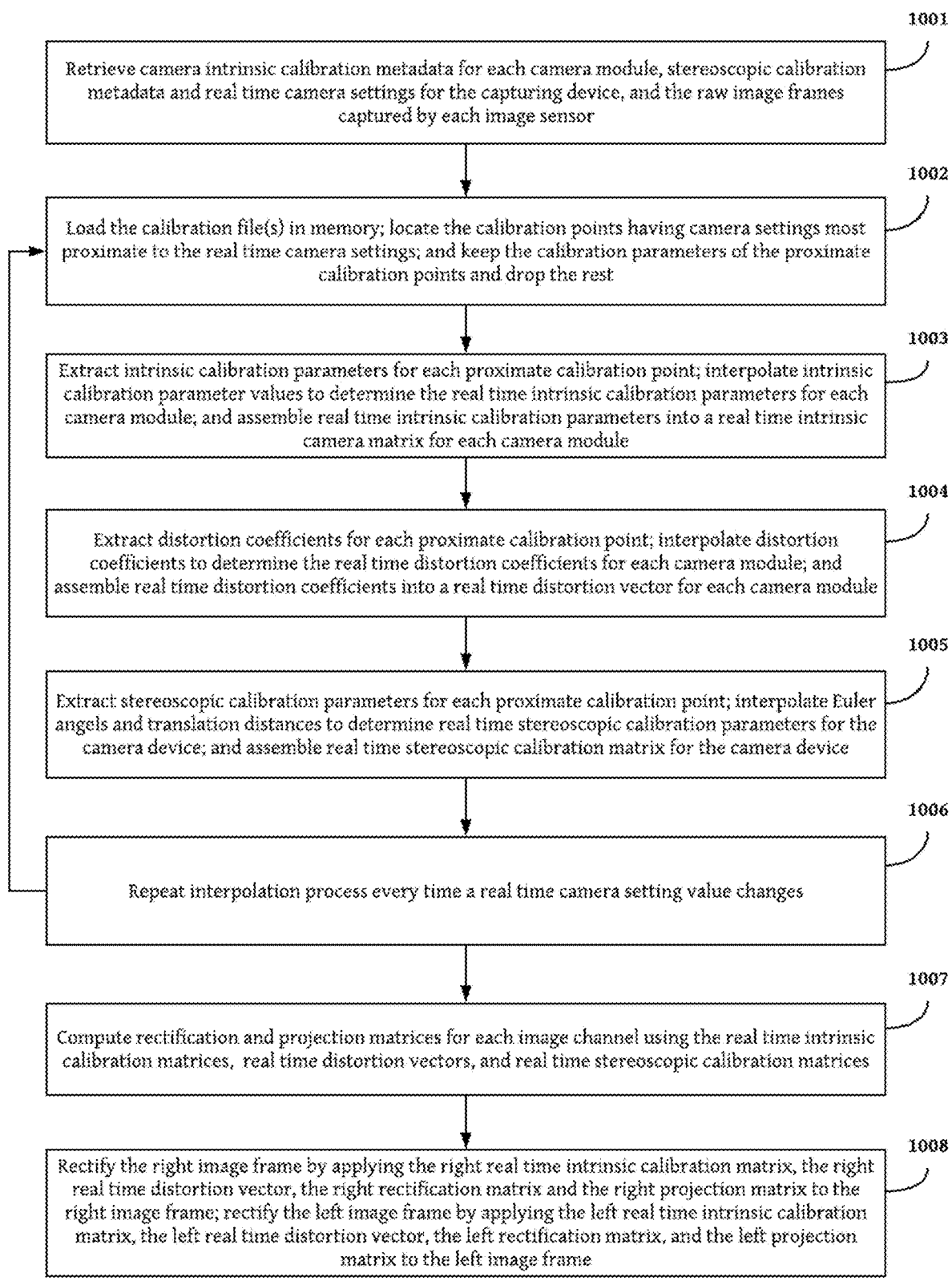
FIG. 10 shows a sample process for rectifying stereo images using interpolated calibration parameters.

FIG. 10 displays an example process for rectifying right and left image frames using real time calibration metadata generated by an interpolation process. Block 1001 describes a data retrieval process for aggregating information required to interpolate real time calibration parameters for real time camera settings that do not correspond to camera settings at a calibration point. In one implementation, camera intrinsic calibration metadata for each camera module, stereoscopic calibration metadata and real time camera settings (e.g., baseline, zoom, focus, etc.) for the capturing stereo cameras, and the raw image frames captured by the 3D camera device are collected by the data preprocessor.

A process for preparing calibration metadata for interpolation is described in block 1002. In one example, a calibration file(s) containing calibration metadata for calibration points associated with unique camera setting values is loaded into memory as a matrix of intrinsic and extrinsic calibration parameters. The data preprocessor 908 may search the calibration file(s) to locate the calibration points associated with camera setting values most proximate to the real time camera settings. Calibration parameters corresponding to the proximate calibration points are extracted from the matrix of intrinsic and extrinsic calibration parameters and stored in memory. All other calibration metadata may be excluded. In other examples, a mesh grid may be assembled using every calibration point included in a calibration file(s). The calibration points to use in the interpolation process may be selected according to the location of the real time camera position within the mesh grid having one dimension per camera setting.

Blocks 1003-1005 describe a process for interpolating intrinsic calibration parameters, distortion coefficients, and stereoscopic calibration parameters to derive rectification and projection matrices for real time camera settings that do not map to a calibration point. As shown in block 1003, intrinsic calibration parameters (e.g., $f_x$, $f_y$, $c_x$, $c_y$, and $\gamma$) are extracted from the intrinsic calibration parameter matrix for the left image channel (e.g., $K_1$) and the right image channel (e.g., $K_2$) included in the calibration file stored in memory. An interpolation function is then applied to the intrinsic calibration parameters corresponding to the calibration points having camera setting values most proximate to the real time camera settings to derive the real time calibration parameters that map to the real time camera settings. Real time calibration parameters are then assembled into a real time intrinsic camera matrix for each image channel (e.g., $K_L'$, $K_R'$).

To interpolate distortion coefficients at the real time camera settings, distortion coefficients for each image channel (e.g., $k_1$, $k_2$, $k_3$) associated with calibration points having camera setting values most proximate to the real time camera setting values are extracted from memory. As shown in block 1004, an interpolation function is then applied to the extracted distortion coefficients to derive real time distortion coefficients that map to the real time camera settings (e.g., $k_1'$, $k_2'$, $k_3'$). The real time distortion coefficients are then assembled into a real time distortion vector for each image channel ($D_L'$, $D_R'$).

Block 1005 shows a process for generating real time stereoscopic calibration parameters for real time camera settings that do not correspond to camera settings at a calibration point. To derive real time stereoscopic metadata from stereoscopic metadata associated with a calibration point stored in a calibration file, stereoscopic calibration parameters (e.g., $\theta_x$, $\theta_y$, $\theta_z$, $T_x$, $T_y$, $T_z$) are extracted from the rotation (e.g., $R_1$, $R_2$) and transformation matrices (e.g., $T_1$, $T_2$) associated with the calibration points having the camera setting values most proximate to the real time camera setting values. An interpolation function is applied to the extracted stereoscopic calibration parameters to derive real time stereoscopic calibration parameters that map to the real time camera settings (e.g., $\theta_x'$, $\theta_y'$, $\theta_z'$, $T_x'$, $T_y'$, $T_z'$). The interpolated Euler angles (e.g., $\theta_x'$, $\theta_y'$, $\theta_z'$) are then used to generate the real time elemental (e.g., Rx', Ry', Rz') and combined (e.g., R') rotation matrices for the camera device. The interpolated transformation distances (e.g., $T_x'$, $T_y'$, $T_z'$) are also assembled into a real time transformation vector (e.g., T). The real time transformation vector and rotation matrix are then combined with the real time distortion vectors and real time intrinsic calibration matrices for each image channel to generate real time calibration metadata that maps to a virtual calibration point having real time camera settings.

As shown in block 1007, the real time intrinsic calibration metadata and the real time distortion vectors are used to compute the rectification and projection matrices for each image channel. Rectification and projection matrices are then used in the rectification process described in block 1008. In this example, image rectification occurs by applying the right real time intrinsic calibration matrix ($K_R'$), the right real time distortion vector ($D_R'$), the right rectification matrix ($R_2'$) and the right projection matrix ($P_2'$) to a right image frame. Similarly, the left real time intrinsic calibration matrix ($K_L'$), the left real time distortion vector ($D_R'$), the left rectification matrix ($R_2'$), and the left projection matrix ($P_2'$) are applied to the left image frame to generate a rectified left image. As shown in block 1006, the interpolation process must be completed for every change in baseline, focus, or zoom that displaces the camera settings from a calibration point. Once the interpolated calibration metadata is derived, rectification steps shown in 1007 and 1008 are used to rectify images captured at non-calibrated camera settings.

Auto Recalibration of Stereoscopic 3D Calibration Metadata

Post manufacture and initial calibration, the calibration metadata of most stereo camera devices remains static throughout the life of the devices. Re-calibration (i.e., updating the calibration metadata), however, is desirable in some situations. For example, after the stereoscopic device is dropped, when one or more mechanical components within the device age or wear down, or when internal or external conditions cause one or more camera module components to move. Slight changes to the position of one or more lenses, light sensors, or other camera module components can significantly impact the stereoscopic and intrinsic calibration parameters used to rectify and project images captured by the 3D camera. Therefore, it is desirable to have an auto re-calibration process that modifies 3D calibration metadata in real time to correct for changes in the position of one or more camera module components. By automatically correcting stereoscopic calibration parameters and other 3D calibration metadata over time, the re-calibration processes described herein prolong the usable life of stereo camera devices and improve rectification accuracy and the quality of image and video frame projection.

It is also desirable to have auto re-calibration processes generating one or more calibration parameters automatically without manual operation or specialized calibration equipment (e.g., a calibration station or fabricated calibration target). In some embodiments, the stereo camera device can use an auto re-calibration process to generate calibration metadata out of the box using pre-determined baseline values for camera intrinsic calibration parameters and captured images or video frames. Using image data (e.g., color data, pixel positional information, captured object locations, and/or the disparity between one or more of these aspects in stereoscopic image or video pairs) included in captured 3D images and video frames, auto re-calibration processes can establish new and/or optimize baseline 3D calibration parameters in real time. Using the auto re-calibration processes described herein to automatically generate new stereoscopic calibration parameters without manual calibration removes the need for factory calibration of stereoscopic calibration parameters post manufacture, thereby reducing the cost and time of manufacturing stereo camera devices. Additionally, the auto re-calibration processes optimize stereoscopic calibration parameters for actual conditions encountered by users rather than generic factory conditions used in traditional manual calibration methods. By determining and or adjusting calibration metadata during actual device use, the auto re-calibration processes personalize stereo camera device functionality and enhance the accuracy of image rectification and the quality of image and video frame projection.

Stereoscopic calibration parameters depend on precise measurements of relative positions between the left and right camera modules in a stereo camera system. The x, y, and z translation parameters and pitch, yaw, and roll rotational angle parameters define the position of each camera module. For accurate calibration, every parameter of the position must be known for each camera module. Over time, the position of one or more camera modules may shift. Position changes that are not accounted for in the calibration process poison rectification by offsetting the alignment of images generated by the left and right camera modules. Poor rectification as a result of inaccurate calibration destroys the quality of projected stereo images and video frames rendered during playback. Depth sensing and other processing tasks performed using depth data are also inaccurate when performed on poorly rectified images. Additionally, poor rectification may depress user experience by causing screen glare or eye fatigue when users attempt to view images and video frames projected on a display screen using poorly rectified images or video frames.

Small shifts in the position of camera modules embedded in electronic devices, particularly mobile electronics (e.g., smart phones and portable digital cameras), are common. Camera modules incorporated in stationary devices can also move even when used in controlled environments as a result of frequent vibration and temperature changes by internal device components. Despite the tendency of camera modules to shift over time and the interdependence between camera position and rectification, no real time method of tracking position changes of stereo camera modules currently exists. Even if there was a way to detect shifts in the position of camera modules, rectification cannot be improved without a mechanism of adjusting calibration parameters according to the movement of camera modules. The auto re-calibration processes described herein improve rectification by automatically detecting calibration errors and, if necessary, adjusting calibration parameters in real time to account for changes in the position of one or more camera modules or camera module components.

Conventional calibration techniques determine stereoscopic calibration parameters post manufacture using a calibration station. In most instances, stereo camera calibration happens at the factory using a calibration station having a mechanical mechanism that moves the camera to a variety of positions. Each position offers a different perspective of a calibration target allowing devices placed on the calibration station to capture the target from many different perspectives. Stereoscopic calibration parameters derived from these calibration methods are typically stored in a static calibration file that remains unchanged throughout the life of a camera device. Absent methods of detecting when and how to modify calibration parameters within calibration files to improve rectification, the lifespan of stereo camera devices is limited. Without a mechanism for automatically adjusting camera calibration parameters to account for shifts in the position of one or more camera modules or camera module components, stereo camera devices must be replaced or recalibrated when the position of one or more camera modules changes.

The auto re-calibration processes described herein provides a solution for detecting movement in the position of camera modules within a stereo camera device. The real time auto re-calibration mechanism processes also adjusts the stereoscopic calibration parameters in real time according to detected position shifts. The auto re-calibration processes functions independently of gyroscopes, accelerometers, or other sensors and hardware for detecting camera motion. Instead, a three stage process is performed on captured image data (e.g., color data, pixel position information, captured object location, contrast, and image texture) to generate a calibration profile that tracks device rectification accuracy over time. Stage 1 collects and manipulates a subset of captured image data to prepare image data for further analysis and manage the amount of power, memory, and computational resources consumed during re-calibration. Stage 2 filters image data to exclude inaccurate and/or noisy image data from the re-calibration process thereby avoiding unnecessary or erroneous changes to calibration parameters. Stage 3 identifies calibration errors and determines how to adjust calibration metadata to correct the error.

The auto re-calibration processes described herein are fast and occur instantly in real time without expensive hardware (e.g., motion sensors and calibration machines) or time consuming mechanical re-calibration techniques. The re-calibration processes automatically adjust the calibration parameters of one or more camera modules to achieve perfect rectification independent of any user action. The auto re-calibration processes work throughout the life of the camera and do not wear out quickly like sensors or other delicate hardware. By providing methods for updating the calibration parameters to compensate for changes in the position of each camera module, the auto re-calibration processes described herein greatly increase the lifespan of stereo camera devices. Filters for removing noisy or inaccurate image data ensure calibration profiles for adjusting the stereoscopic calibration parameters are robust and reliable. Aggregating accurate data into calibration profiles over time gradually improves the accuracy of image rectification without abrupt shifts in a camera position or significant changes in camera performance.

Conventional calibration is performed as part of a calibration process that occurs in a factory or other controlled environment using specialized calibration equipment (e.g., a calibration station). By providing an improved calibration process that occurs in real time and leverages calibration data derived from images and video frames captured during normal 3D camera use, the auto re-calibration processes described herein replace and/or improve factory calibration of calibration parameters. Instead of relying on a calibration metadata generated in a controlled factory environment, the auto re-calibration methods develop a personalized calibration profile for every device that changes over time based on the particular way the device is used. The calibration profile can be used to optimize camera calibration and rectification for scenes frequently captured by the device. By determining and/or optimizing calibration parameters using a downsampled stream of all photos captured by the camera device rather than a small subset of photos captured during a factory calibration process, the auto re-calibration processes optimize calibration parameters for common scene characteristics (e.g., amount of light, color settings, and number of objects) and frequently used camera settings (e.g., focus, baseline, and zoom).

The auto re-calibration processes are flexible and can be configured to track and adjust any parameter defining camera position including x, y, and z translation and pitch, yaw, and roll rotational angles. To increase compatibility of the auto re-calibration subsystem described herein, the auto re-calibration process leverages the same computational resources used to render stereo images. Therefore no additional processing power is needed and the auto re-calibration subsystem can work with any system capturing and rendering stereo images. Processing optimizations (e.g., compression functions, downsampling functions, and hardware acceleration) are also incorporated to ensure the auto re-calibration processes can run on a stereo camera device in parallel with image capture, rectification, and playback operations. The auto re-calibration process is extensible to any stereoscopic device including 3D cameras, stereo cameras, and multi-camera systems including two or more stereo camera pairs. Calibration metadata and/or calibration metadata modification generated by the auto re-calibration processes may be embedded in captured and/or projected images and/or video frames generated by the stereo camera device.

Real Time Auto Re-Calibration Implementations

The auto re-calibration processes described herein, determine re-calibration data by comparing image data included in right and left image frames. The disparity between image data included in stereo pairs of right and left image frames is measured to generate calibration profiles including re-calibration data describing how to correct one or more calibration errors observed in images and video frames generated by a stereo camera device. Re-calibration data can include one or more calibration parameters and revised position data for one or more stereo image sections and/or stereo image frames. The calibration profiles are used to re-calibrate the camera modules in real time to improve rectification and projection of images and video frames. The calibration profile may also include disparity maps for identifying calibration errors and classifying the type of calibration error occurring in a stereo camera device. Additional auto re-calibration processes may incorporate other comparisons between image data included in right and left stereo image frames into a calibration profile, for example, disparity between object size, pixel position, color contrast, and/or image texture.

Other non-limiting example auto recalibration processes determine re-calibration data by comparing portions of objects captured in stereoscopic images and video frames. In one example, an object having sharply contrasted portions acts as contrast-level calibration reference object for the stereoscopic device to conduct the automatic re-calibration. Alternatively, an object known to have a rectangular shape but appearing curved due to distortion is used to correct one or more distortion parameters using an auto re-calibration process described herein. In this example, distortion parameters for warping an object to it's actual shape are incorporated into a calibration profile. When projecting images and video frames during playback, the stereo camera device then modifies the distortion parameters according to the updated distortion parameters in the calibration profile. The camera intrinsic calibration metadata and/or stereoscopic calibration metadata may also be adjusted in real time based on the relative positions of objects in image frames captured by the left and right camera modules. In this example, vertical, horizontal, and/or rotational location disparity of captured objects may be incorporated in the calibration profile and updated in real time. Stereoscopic calibration parameters may then be adjusted according to the location disparity data recorded in the calibration profile.

Figure 17:
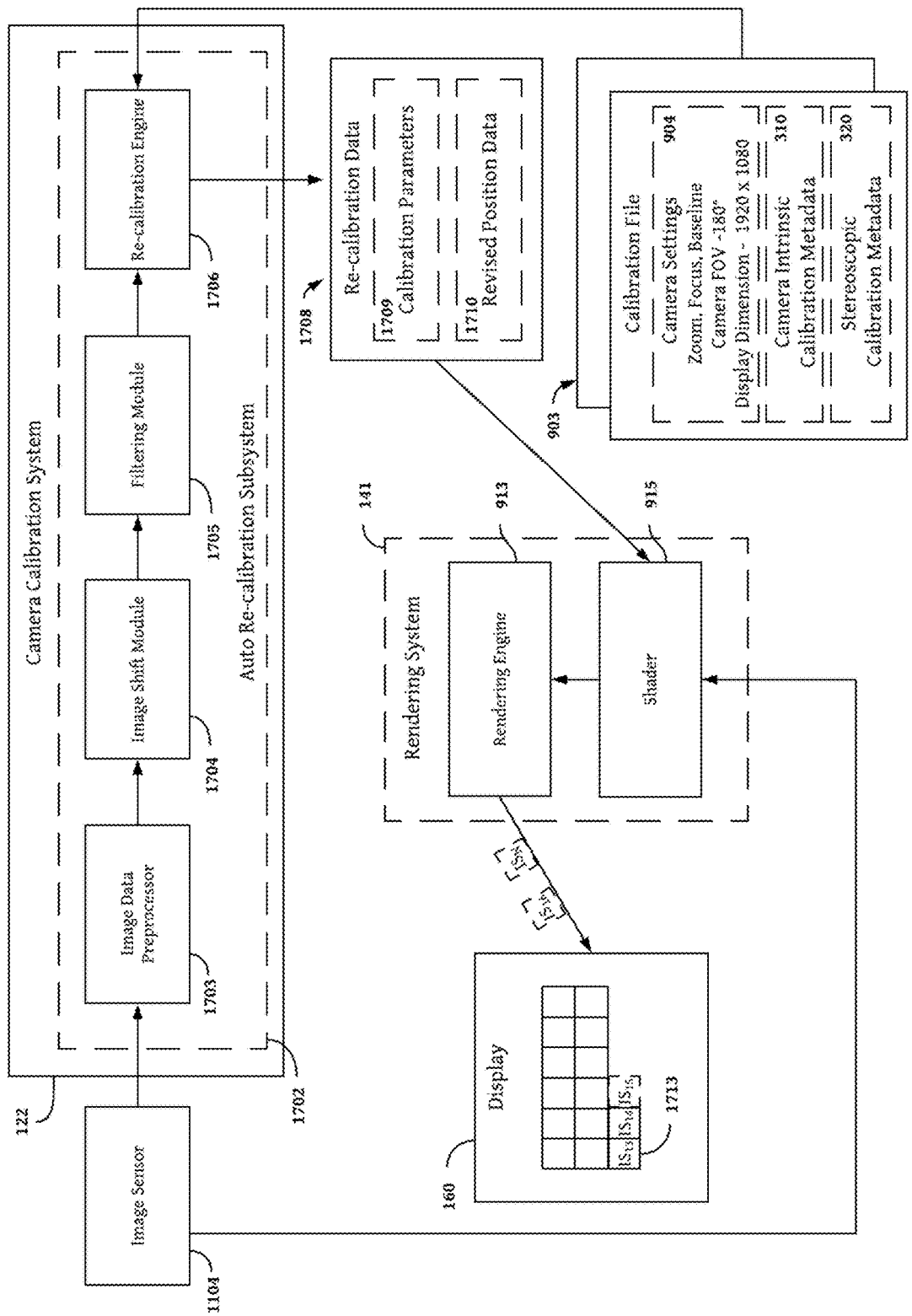
FIG. 17 provides a high level block diagram illustrating a system architecture implementing the re-calibration processes.

FIG. 17 provides a high level block diagram illustrating a system architecture implementing the re-calibration processes described herein. The auto re-calibration subsystem 1702 executes one or more auto re-calibration processes described above to transform image data included in captured stereo image frames to re-calibration data. Using re-calibration data 1708 describing calibration parameters for one or more camera modules, the rendering system 141 corrects calibration errors by projecting right and left stereo image frames on a rectified image frame having image planes of the left and right stereo image frames on a common image plane oriented in an alignment that satisfies an epipolar geometry. Post rectification, the rendering engine 913 renders the re-calibrated image frames as display pixels on a display screen according to re-calibration data 1708 describing the location image pixels included in rectified right and left stereo image frames.

Figure 15:
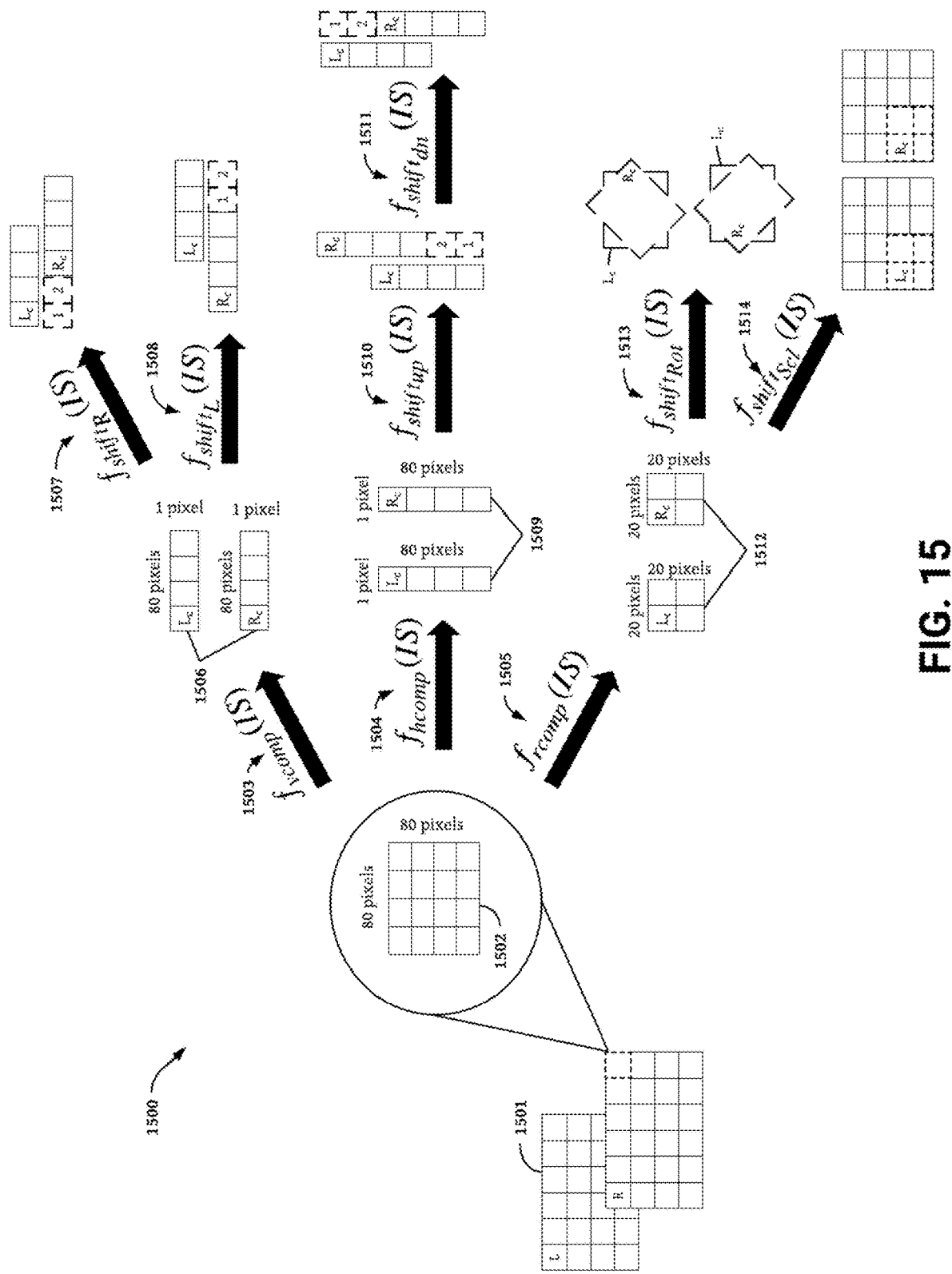
FIG. 15 illustrates a high level overview of example compression and shifting processes performed during auto re-calibration.
Figure 16:
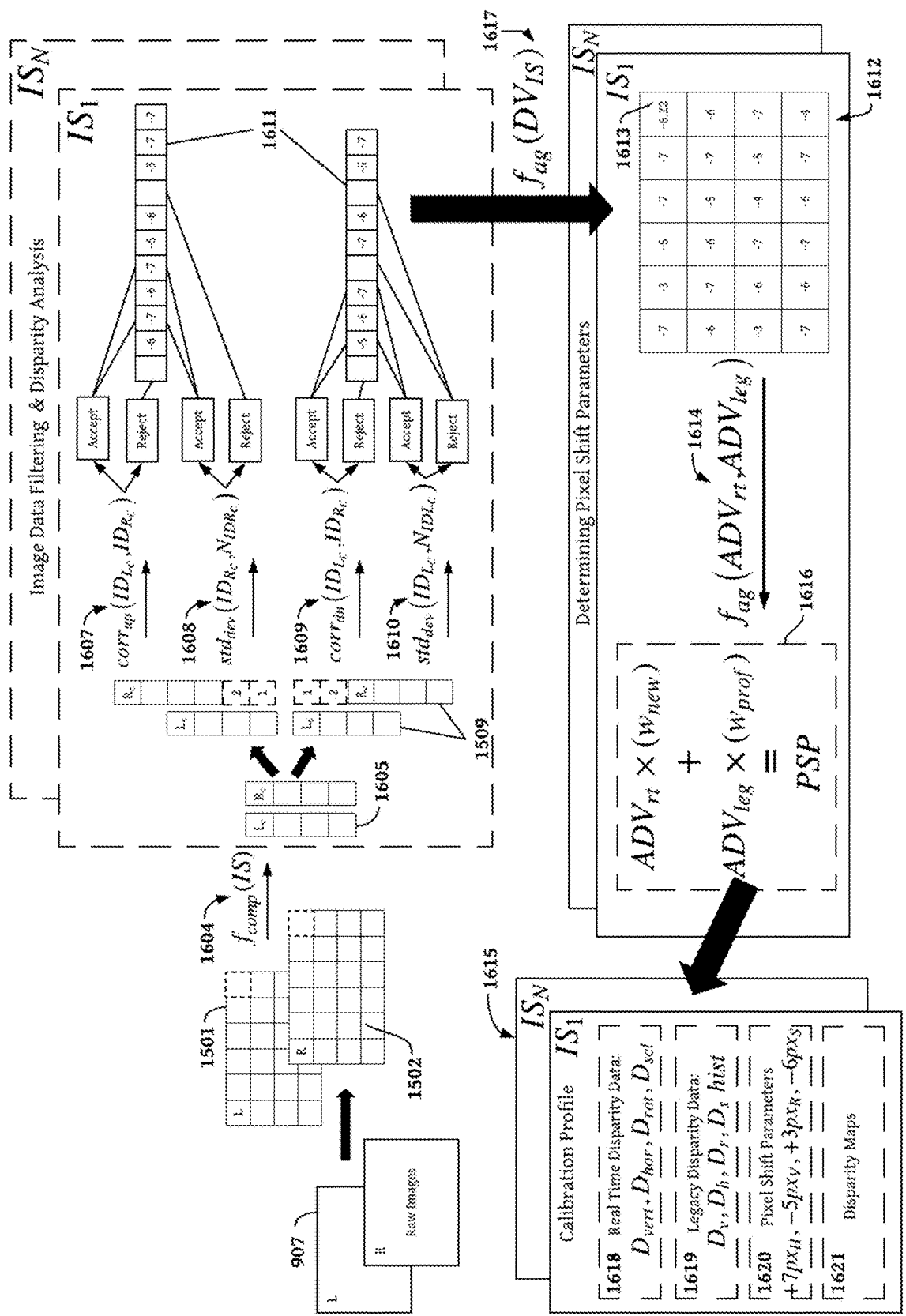
FIG. 16 illustrates a high level overview of operations performed during the image data filtering, disparity analysis, and determining pixel shift parameter steps of auto re-calibration.

FIGS. 15-16 show operations performed by the auto re-calibration subsystem in more detail. FIG. 15 illustrates example processes for compressing image data into compressed image sections performed by one or more compression functions 1503-1505. Processes for shifting one or more compressed image sections to create a plurality of shift positions performed by one or more pixel shift functions 1507, 1508, 1510, 1511, 1513, and 1514 are also shown in FIG. 15. One example filtering process and disparity analysis is shown in FIG. 16. The figure also displays an example operations performed to determine one or more pixel shift parameters.

Figure 18:
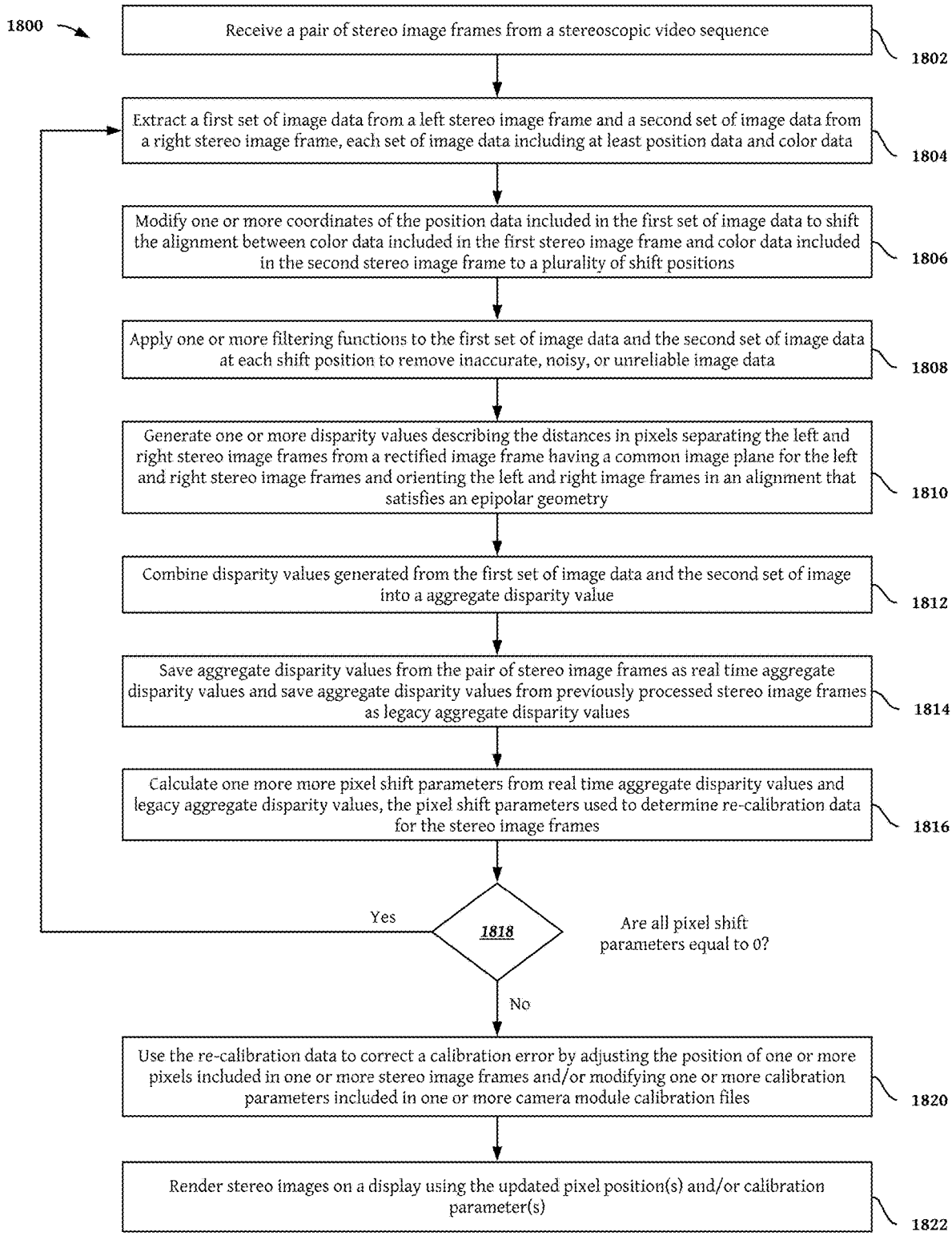
FIG. 18 shows a sample process of an auto re-calibration implemented on an auto re-calibration subsystem.

FIG. 18 illustrates one non-limiting example of an auto re-calibration method 1800 implemented on an auto re-calibration subsystem 1702. Prior to execution of a re-calibration process, camera modules included in a stereo camera system are first calibrated according to calibration metadata included in a calibration file. To begin re-calibration, a portion of the stereo image frames captured by calibrated camera modules are received by the auto re-calibration subsystem. The stereo image frames may refer to static images and/or video frames included in a captured video sequence. In one embodiment, the re-calibration subsystem receives a pair of stereo image frames extracted from a stereoscopic video sequence 1802. In some embodiments, the stereo image frames are divided into a plurality of image sections with each image section including a group of image pixels comprising the stereo image frame.

Image data including at least position data and color data is included in each stereo image frame 1804. To perform re-calibration, a first set of image data is extracted from a right stereo image frame and a second set of image data is extracted from a left stereo image frame 1804. In embodiments with divided stereo image frames, the auto re-calibration methods can be performed on each image section included in the image frame. Alternatively, as described in FIG. 18, the re-calibration methods can also be performed on entire image frames.

To compare a pair of stereo image frames, a first image frame is shifted relative a second image frame to create a plurality of shift positions having different alignments between color data included in the first stereo image frame and color data included in the second stereo image frame. In one example, one or more coordinates of the position data included in the first set of image data is modified to shift the alignment of color data included in the first stereo image frame and color data included in the second image section to a plurality of shift positions 1806. As described in FIG. 15, numerous shift functions may be used to create the shift positions. Each shift function operates on one or more coordinates of position data to shift color data in defined pixel increments. Depending on the position data coordinates modified by the shift function, image data included in the image frames is manipulated in a variety of ways including horizontal shifts, vertical shifts, rotational shifts, and scalar shifts.

The first and second sets of image data are then filtered to remove inaccurate, noisy, and/or unreliable image data. In one example, one or more filtering functions are applied to the first set of image data and the second set of image data at each shift position 1808. Filtering at each shift position is necessary because operations performed by shift functions on image data may change one or more components of the image data and/or the relationship between a first set of image data (e.g., image data included in a right stereo image frame) and a second set of image data (e.g., image data included in a left stereo image frame). The filtering functions may include correlation filtering functions, standard deviation filtering functions, depth filtering functions, and other filtering functions leveraging statistical or algorithmic comparisons between two or more sets of image data. Disparity analysis is performed on image data that passes the filtering process. Image data that fails the filtering process is excluded form further analysis.

Disparity analysis is the process of determining the distance and/or direction separating the right and left image planes from a rectified image plane. As shown in box 1810, one example disparity analysis generates one or more disparity values describing the distance in pixels separating the left stereo image frame and the right stereo image frame from a rectified image frame. Disparity analysis may be performed on image data at every shift position. Therefore, disparity values describe the distance and/or direction separating a stereo image frame from a rectified image frame at each shift position described by image data passing the filtering process described above. In this way, the shift positions may act as test re-calibration positions comparing the alignment of image data at several shift increments. Typically, the number of pixels of shift observed in the shift position having the least amount of distance from the rectified image frame an a given direction is proximate too the pixel shift parameter needed to correct the calibration error.

As described herein, the term "rectified image frame" refers to a rectified form of a left stereo image frame and/or a right stereo image frame wherein the rectified form of the left and right stereo image frames appear as though the frames were captured from the same image plane and are oriented in an alignment that satisfies an epipolar geometry. To satisfy an epipolar geometry, the right and left stereo image frames may be aligned in vertical, horizontal, rotational, and/or scalar directions. In most examples, the rotation matrix is responsible for mapping the image planes of the left and right frames to the common rectification image plane. One or more projection matrices are used to ensure that the left and right images are aligned and satisfy an epipolar geometry.

In many examples, more than one disparity value is generated for each pair of image frames. Therefore, disparity analysis may further include applying a disparity value aggregation function to combine disparity values generated for the first set of image data and the second set of image data into an aggregate disparity value 1812. The re-calibration process may be performed continuously on image frames as they are captured. In one example, aggregate disparity values are generated from the most recently processed pair of image frames are saved as real time aggregate disparity values 1814. Aggregate disparity values from previously processed are saved as legacy disparity values 1814. In one example, pixel shift parameters describing how to modify one or more image sections or image frames are calculated based on real time aggregate disparity values and legacy aggregate disparity values. Specifically, an aggregate disparity value aggregation function is applied to calculate one or more pixel shift parameters from real time aggregate disparity values and legacy aggregate disparity values 1816. The pixel shift parameters are used to determine re-calibration data for the image section and or image frame.

At decision point 1818, the re-calibration system will either repeat the above process of extracting image data, shifting the image data to shift positions, filtering the image data, and performing disparity analysis if the calculated pixel shift parameter is equal to zero indicating no calibration error. If the pixel shift parameter is not equal to zero, a calibration error is detected and the re-calibration data is used to correct the calibration error. The re-calibration data is used to correct the calibration error by adjusting the position of one or more pixels included in one or more stereo image frames and/or modifying one or more calibration parameters included in one or more camera module calibration files 1820. Once the calibration error is corrected, the rendering system renders image pixels from the stereo image frames on a display using the updated pixel position(s) and/or calibration parameter(s) 1822.

Image Data Compression and Shifting

As shown in FIG. 17, image sensors 1104 included in each camera module capture raw image frames 907 and write image data to device memory. Within the auto re-calibration subsystem 1702, the image data preprocessor 1703 ingests raw image data from image frames 907. Raw image data may include at least color data describing the colors and objects captured and pixel position data describing the orientation of the color data within the image frame. The image data preprocessor 1703 may optimize the re-calibration process for higher speed and/or increased processing capacity by using a downsampling function. In one example, the downsampling function reads and ingests image data for one of every three frames captured by the camera modules at a frame rate of 30 frames per second (fps). In this example, the frames may include 4 k images having a high definition resolution (e.g., 3840×2160 pixels or 4096×2160 pixels). Other non-limiting downsampling functions can read image data for more or fewer frames at a higher or lower frame rate (e.g., 10 fps, 50 fps, 100 fps, 300 fps, 500 fps, or 1000 fps). The downsampling functions may read full HD, 8K ultra HD, or other high definition images (e.g., 720p, 1080p, 1080i, or 4320p) having a range of resolutions (e.g., 1280×720 pixels, 1920×1080 pixels, or 7680×4320 pixels).

To enable upsampling of image data by other components of the auto re-calibration subsystem and/or to further optimize the re-calibration process for higher speed and/or increased processing capacity, the downsampling function may compress high definition images and/or frames (e.g., 4 k images having a resolution of 3840×1920 pixels) captured by a stereo camera device into lower resolution images and/or frames (e.g., 640×320 pixels resolution). Implementing a lossless compression algorithm in the downsampling function allows for subpixel accuracy comparisons to be made between the downsampled stereo images. In one non-limiting example, subpixel disparity measurements as precise as one sixth of a pixel may be achieved by upsampling disparity between compressed 640×380 pixels resolution images by a factor of six. The magnitude of subpixel precision and the upsampling factor may be varied according to the resolution of images captured by the stereoscopic device and the parameters of the lossless compression algorithm implemented by the downsampling function. For example, subpixel precision ranging from half (0.5) a pixel to one one hundredth (0.01) of a pixel is achievable for stereoscopic systems capturing high resolution images and/or frames. Downsampling and/or upsampling functions and other components of the auto re-calibration subsystem 1702 are compatible with standard definition images having lower resolutions and can be configured to read and process images formatted for 16K and future iterations of high display resolution.

The downsampling function may be configured to optimize calibration profile accuracy at a given frame rate and image resolution. For example, the downsampling function may have a higher sampling rate (e.g., 2 of 3 frames or 4 of 5 frames) for camera modules capturing lower resolution images (e.g., 1280×720 pixels or 640×480 pixels). Alternatively, for higher resolution images (e.g., 3840×2160 or 7680×4320 pixels), a lower sampling rate (e.g., 1 of 5 frames or 1 of 7 frames) may be used.

In one non-limiting example shown in FIG. 15, the image data preprocessor 1703 divides left and right raw stereo image frames into left ("L") and right ("R") sectioned images 1501 each having a plurality (e.g., 24 as shown, 32, 40, or 48) of image sections 1502 arranged in columns and rows (e.g., 6 by 4 as shown or 8 by 4) of equally sized image sections 1502. In examples having image frames with high definition resolutions (e.g., 4 k or 1080p), each image section 1502 may be 240 pixels wide by 270 pixels long. In other examples, the image data preprocessor 1703 may divide raw image frames into larger or smaller numbers of image sections 1502, with each image section 1502 having greater or fewer numbers of pixels in each dimension.

When processing high definition preview images or other lower resolution images (e.g., images having 640×320 resolution), the image sections 1502 may be 80 pixels by 80 pixels (as shown in FIG. 15). The image data preprocessor 1703 may generate sectioned images 1501 having image sections 1502 with customizable numbers of—and dimensions for—image sections 1502. Methods generating sectioned images 1501 from raw image frames deployed by the image data preprocessor 1703 may be kept constant or varied for each right and left image included in a stereo image pair.

Disparity analysis may be performed on image data included each image section 1502 to track disparity at multiple locations within the image frame. Alternatively, disparity analysis may be performed on image data included a subset of image sections 1502. Image data including image sections 1502 may be selected for disparity analysis using a manual or automatic process. Automatic processes may be implemented in a program or model incorporating one or more rules based algorithms or machine learning models. In one example program for selecting image sections 1502, an object tracking model identifies a particular object of interest contained in an image frame. A selection algorithm then selects image data included in the image sections 1502 containing the object of interest for disparity analysis. Increasing the number of positions having image data evaluated by disparity analysis allows for more precise tracking of abnormal disparity values and more localized modification of calibration parameters during re-calibration. On the other hand, reducing the number of image sections 1502 including image data selected for disparity analysis may optimize the performance of the image data preprocessor 1703, increase the speed of generating calibration profiles 1615, or otherwise optimize or improve the re-calibration process.

Other optimizations performed by the image data preprocessor 1703 promote more efficient processing of images. In one non-limiting example optimization, a compression function 1604 executed by the image data preprocessor 1703 reduces the amount of image data included in the image sections 1502 evaluated during re-calibration. As shown in FIG. 15, the compression function 1604 may be a horizontal compression function 1504, a vertical compression function 1503, or a rotational compression function 1505. The horizontal compression function 1504 averages image data horizontally over all laterally adjacent pixels in an image section 1502 into one value for each row of pixels output in one pixel at a left or ridge edge of the image section 1502. As shown in FIG. 15, the horizontal compression function 1504 may compress image data from an 80 pixels by 80 pixels image section 1502 into a 1 pixel by 80 pixels vertical image strip 1509. Alternatively, the horizontal compression function 1504 may distribute the average horizontal pixel data over a group of pixels close to an edge of the image section or located at another portion of the image frame (e.g., a middle portion).

Other compression functions including vertical, rotational, or diagonal compression functions may compress image data vertically, rotationally, or diagonally over the entire image section 1502. As shown in FIG. 15, a vertical compression function 1503 may average image data vertically over all vertically adjacent pixels in the entire image into one value for each column of pixels output in one pixel at an upper or lower edge of the image section 1502. In one non-limiting example, the vertical compression function 1503 compresses image data from an 80 pixels by 80 pixels image section 1502 into a 80 pixels by 1 pixel horizontal image strip 1506. Alternatively, the vertical compression function 1503 may distribute average vertical pixel data over a group of pixels close to an edge of the image section 1502 or located at another position within the image frame.

A rotational compression function 1505 may average image data diagonally or execute a sequence of horizontal averages and/or vertical averages generated by one or more horizontal 1504 and/or vertical compression functions 1503 to generate a group of pixels containing aggregate average pixel data values from the entire image section 1502. As shown in FIG. 15, one example, rotational compression function 1505 compresses image data from an 80 pixels by 80 pixels image section 1502 into a 20 pixels by 20 pixels rotational image subsection 1512.

Compression functions may be performed on all image sections 1502 included in a sectioned image 1501 to compress the entire image. Additionally, the same compression functions may be performed on all image sections included in a right and left stereo image pair. Compression functions may leverage one or more functions for compressing image data without losing distinct image data. Non-limiting example compression functions that may be used to compress image data by iterating over each image section 1502 included in the sectioned image 1501 in any direction include statistical functions (e.g., median, mode, average, and standard deviation), lossless image compression algorithms (e.g., run-length encoding, area image compression, differential pulse code modulation (DPCM), linear predictive coding (LPC), predictive coding, entropy encoding, adaptive dictionary algorithms, deflate, and chain codes), and lossy image compression algorithms (e.g., reducing the color space to common colors, chroma subsampling, transform coding, and fractal compression).

Image data included in compressed image sections 1605 ("Lc" and "Rc") generated by the image data preprocessor 1703 is written to memory readable by other components of the auto re-calibration subsystem 1702. Image data included in compressed image sections 1605 or uncompressed image frames is then filtered by the filtering module 1705 to increase accuracy of the image data evaluated with disparity analysis. To further improve the accuracy of the calibration profiles 1615, the image shift module 1704 may modify the pixel position data of each image section to shift the alignment of color data included in uncompressed or compressed image sections 1605. By shifting the alignment of color data included in each image section, the image shift module 1704 increases the number of comparisons between each pair of stereoscopic image sections 1502 included in a stereo image pair.

FIG. 15 describes example shift operations that may be performed by the image shift module 1704 to modify pixel position data. The shift operations applied to compressed image sections 1605 may be dependent on the compression function 1604 used to compress the image sections 1502 and the type of compressed image sections 1605 produced by the compression function 1604. Example pixel shift functions applied to pixel position data for vertical image strips 1509 generated using a horizontal compression function 1504, include image shift up 1510 and image shift down functions 1511. By gradually increasing the vertical parameter (i.e., y translation parameter) included in the pixel position data associated with color data for the right image section, the image shift up function 1510 shifts the right vertical image strip up relative to the left vertical image strip. In one example, the image shift up function 1510 shifts color data included in the right image section 50 pixels up relative to color data in the left image section at 10 five pixel increments. The image shift down function 1511 gradually decreases the vertical parameter included in the pixel position data associated with color data for the right image section to shift the right vertical image strip down relative to the left vertical image strip. In one example, the image shift down function 1511 shifts color data included in the right image section 50 pixels down relative to color data in the left image section in 10 five pixel increments. FIG. 15 displays the first two shift increments for both the image shift up function 1510 and the image shift down function 1511.

Shifting two 1 pixel by 80 pixels vertical image strips 50 pixels up and 50 pixels down at 5 pixel increments, generates a total of 21 shift positions (i.e., 10 shift up positions, 10 shift down positions, and 1 aligned position) for comparison by the filtering module 1705. The shift functions are executed on pixel position data included in every image section 1502 within each pair of right and left sectioned images 1501. In the example embodiment shown in FIG. 15, the image shift module 1704 executes one or more shift function(s) pixel position data included in 24 compressed image sections 1502. Each pair of compressed image sections is shifted a total of 21 times to provide a total of 504 shifts positions and 504 image data comparisons per pair of left and right sectioned images 1501. For examples having 32 image sections, executing an image shift function on pixel position data included in every image section generates a total of 672 shift positions and 672 image data comparisons per pair of left and right sectioned images 1501.

To optimize image comparisons for filtering and disparity analysis, compressed or uncompressed image sections may be shifted in any direction or rotated any number of degrees along any axis of rotation (e.g., pitch, roll, yaw) by the image shift module 1704. The magnitude and direction of the image shifts may be modified by changing one or more parameters of the image shift module 1704 to increase precision or accuracy of the image comparisons, optimize re-calibration processes for speed or power consumption, and exclude inaccurate or noisy image data from further analysis. As shown in FIG. 15, different image shift functions may be applied to pixel position data included in horizontal image strips 1506, vertical image strips 1509, and rotational image subsections 1512 generated by one or more compression function(s).

As shown in FIG. 15, in one example routine for manipulating horizontal image strips 1506, an image shift right function 1507 and an image shift left function 1508 are executed on pixel position data included in one or more right and left pairs of horizontal image strips 1506. The image shift right function 1507 increases the horizontal parameter (i.e., the x translation parameter) included in the pixel position data associated with color data for each right horizontal image strip to move color data included in the right horizontal image strips right from center relative to color data included in the left horizontal image strips. In one example, the image shift right function 1507 gradually moves color data included in each right image section 50 pixels right from center relative to color data included in each left image section in 10 five pixel increments. The image shift left function 1508 shifts the alignment of color data included in a right horizontal image strip left from center relative to color data included in a left horizontal image strip by decreasing the horizontal parameter (i.e., the x transformation parameter) included in pixel position data associated with color data for each right horizontal image strip. In one example, the image shift left function 1508 gradually moves color data included in each right image section 50 pixels left from center relative to color data included in each left image section in 10 five pixel increments. Applying the example image shift right function 1507 and image shift left function 1508 generates a total of 21 shift positions (i.e., 10 shift right positions, 10 shift left positions, and 1 aligned position) for comparing image data included in each pair of horizontal image strips 1506. Other types of image data associated with pixel position data (e.g., color disparity, object location, image texture, or contrast) may also be shifted using the image shift right function 1507 and the image shift left function 1508.

In one example routine for manipulating rotational image subsections 1512, one or more rotational shift functions 1513 are executed on pixel position data included in one or more pairs of right and left rotational image subsections 1512. A clockwise rotational shift function increases the rotation parameter (i.e., the yaw angle parameter) included in position data for the right rotational image subsection to shift color data included in the right rotational image section a number of degrees clockwise relative to color data included in the left rotational image subsection. In one example, the clockwise rotational shift function shifts the alignment of color data included in a right rotational image subsection 45 degrees clockwise from an aligned position having the right rotational image subsection centered over the left rotational image subsection in ten 4.5 degree increments. A counter clockwise rotational shift function decreases the rotation parameter (i.e., the yaw angle parameter) included in position data for the right rotational image subsection to shift color data included in the right rotational image subsection a number of degrees counter clockwise relative to color data included in a left rotational image subsection. In one example, the counter clockwise rotational shift function shifts the alignment of color data included in a right rotational image subsection 45 degrees counter clockwise from an aligned position having the right rotational image subsection centered over the left rotational image subsection.

Applying the example clockwise rotational shift function and counter clockwise rotational shift function generates a total of 21 shift positions (i.e., 10 clockwise shift positions, 10 counter clockwise shift positions, and 1 aligned position) for comparing image data included in each pair of rotational image subsections 1512. Other types of image data associated with pixel position data (e.g., color disparity, object location, image texture, or contrast) may also be shifted using the clockwise rotational shift function and the counter clockwise rotational shift function. Additionally, other example rotational shift functions 1513 may rotate a first rotational image subsection fewer or more than 45 degrees in a clockwise or counter clockwise direction. The rotational increments may be fewer or more than 4.5 degrees. Other rotation parameters included in pixel position data (e.g., the pitch angle parameter and/or the roll angle parameter) may also be modified to rotate the rotational image subsections 1512 on another rotation plane.

To optimize for accuracy of calibration profiles 1615, rotational shift functions 1513 having more planes of rotation, more degrees of rotation, and/or smaller increments of rotation may be used to increase the number of comparisons between image data included in rotational image subsections 1512. Conversely, to optimize for speed of execution, power consumption, and/or processing efficiency, rotational shift functions 1513 having fewer planes of rotation, fewer degrees of rotation, and/or larger increments of rotation may be used to decrease the number of comparisons between image data included in rotational image subsections 1512. One or more parameters of a rotational shift function (e.g., rotation plane, magnitude, direction, and/or increments of rotation) may be dynamically varied to optimize for processing speed, efficient power consumption, and calibration accuracy according to one or more image thresholds, stereoscopic device performance algorithms, and/or machine learning models.

Another routine for manipulating rotational image subsections 1512 includes executing one or more scale shift function(s) 1514 on one or more right and left pairs of rotational image subsections 1512. A scale shift function 1514 shifts the alignment of color data included in a pair of right and left rotational image subsections 1512 by scaling the vertical and horizontal parameters (i.e., the x and y translation parameters) included in pixel position data associated with color data included in one rotational image subsection (e.g., a left rotational image subsection) to one quarter (i.e., 25%) of the size of the vertical and horizontal parameters included in pixel position data associated with color data included in a second rotational image subsection (e.g., a right rotational image subsection). The same scale shift function 1514 or an additional scale shift function (not shown) may further shift the alignment of color data included pair of right and left rotational image subsections 1512 by performing the inverse operation (i.e., scaling one or more parameters included in pixel data associated with color data included in right rotational image subsection to one quarter the size of the left rotational image subsection).

In one example scale right shift function, the alignment of a right 20 pixels by 20 pixels rotational image subsection is shifted by scaling one or more parameters included in pixel position data for a right rotational image subsection to 25% of the size of the same one or more parameters included in pixel position data for a left rotational image subsection at ten 7.5% increments. In one example scale left shift function, the alignment of a left 20 pixels by 20 pixels rotation image subsection is shifted by scaling one or more parameters included in pixel position data for a left rotation image subsection to 25% of the size of the same one or more parameters included in pixel position data for a right rotational image subsection at ten 7.5% increments. Image data included in the rotational image subsections at a total of 21 shift positions is then compared using a filtering function. Applying the example scale left shift function and scale right shift function generates a total of 21 shift positions (i.e., 10 scale left shift positions, 10 scale right shift positions, and 1 aligned position) for comparing image data included in each pair of rotational image subsections 1512. Other types of image data associated with pixel position data (e.g., color disparity, object location, image texture, or contrast) may also be shifted using the scale left shift function and the scale right shift function.

Other example scale shift functions 1514 may scale a first rotational image subsection fewer or more than 25% relative to a second rotational image subsection. The scaling increments may also be fewer or more than 7.5% degrees. To optimize for accuracy of calibration profiles 1615, scale shift functions 1514 having larger scaling coefficients (e.g., a 80% scaling coefficient that scales on image section to 20% of the size of a second image section) and/or smaller scaling increments may be used to increase the number of comparisons between image data included in rotational image subsections 1512. Conversely, to optimize for speed of execution, power consumption, and/or processing efficiency, scale shift functions 1514 having smaller scaling coefficients (e.g., a 50% scaling coefficient that scales one image section to 50% of the size of second image section) and/or larger scaling increments may be used to decrease the number of comparisons between image data included rotational image subsections 1512. Additionally, the magnitude of scaling coefficients and/or scaling increments may be dynamically varied according to available processing and/or power resources as well as to optimize for calibration accuracy according to one or more image quality thresholds, stereoscopic device performance algorithms, and/or machine learning models.

Image Data Filtering

The filtering module 1705 improves accuracy of re-calibration by excluding noisy or inaccurate image data from disparity analysis. Post filtering, the disparity analysis produces disparity values used to calculate one or more calibration parameters for one or more stereo camera modules included in the stereo camera system. Small differences in one or more calibration parameters can significantly impact the rectification and projection of image frames captured by the stereo camera system. Therefore, the data filtering routines performed by the filtering module 1705 are necessary to avoid poor quality rectification and projection as a result of improper changes to one or more stereo calibration parameters.

The filtering module 1705 executes one or more filtering functions comparing image data included a pair of right and left stereo images. One or more filtering functions may be applied to compressed or uncompressed image data. In the example shown in FIG. 16, four filtering functions (two correlation filtering functions 1607, 1609 and two standard deviation filtering functions 1608, 1610) are applied to image data contained in each pair of compressed image sections 1605 included in the stereo images. The correlation up filtering function 1607 compares image data included in a right compressed image section (Rc) to image data included in a left compressed image section (Lc) at a plurality of up shift positions generated by the image shift up function 1510. The correlation down filtering function 1609 compares image data included in a right compressed image section (Rc) to image data included in a left compressed image section (Lc) at a plurality of down shift positions generated by the image shift down function 1511. Image data compared in this example includes grey scale color vectors generated by converting RGB color vectors for each image section into grey scale color vectors. Other example filtering routines may compare other types of image data including other color data (e.g., raw RGB or YUV color vectors), pixel position information, captured object location information, contrast, and image textures.

In the example shown in FIG. 16, the correlation up 1607 and correlation down 1609 filtering functions comprise a first filtering layer implemented in the filtering module 1705. The correlation filtering functions assess the similarity of image data included in right and left image sections at each shift position to ensure the stereo camera system was functioning properly when generating image data used for re-calibration. Absent problems during capture, right and left images generated by a stereo camera system should be largely the same with only small differences attributable to minor calibration errors and/or the different positions of each camera module. By calculating a correlation coefficient for captured image data contained in each pair of stereoscopic image sections, the correlation filtering functions ensure all data included in a subsequent disparity analysis meets some baseline similarity threshold. Pairs of image data having correlation coefficients below this similarity threshold are deemed as captured under adverse or irregular conditions. Therefore, the image data is excluded from subsequent processing to avoid introducing unreliable data into the disparity analysis.

The correlation coefficient (e.g., an r value) generated by the correlation filtering functions describes the relatedness between the two input variables (i.e., color vectors for right and left image sections). Generally, image data generating correlation coefficients close to 1 (e.g., r values between 0.8 and 1) is accepted as valid image data. Whereas, image data generating low correlation coefficients (e.g., r values that are less than 0.8) are rejected as noisy or inaccurate image data. The filtering threshold (i.e., the r value determining if image data is accepted or rejection), however, is variable depending on the specific correlation filtering function and the total number and arrangement of filtering functions executed by the filtering module 1705. Additionally, the filtering threshold may be increased or decreased to optimize the auto re-calibration subsystem for one or more filtering parameters including speed, computational performance, calibration accuracy, available memory, and power consumption.

In the example shown in FIG. 16, color vectors generating an r value of 0.95 or greater meet the filtering threshold and are accepted as valid image data. Color vectors producing an r value of lower than 0.95 fail the filtering threshold and are rejected from further analysis. Valid image data may be passed on one or more additional filtering functions to further refine the accuracy of the image data. Alternatively, disparity analysis as described below can be performed on image data passing the correlation filtering function threshold alone.

Additional filtering functions implemented in the filtering module 1705 include one or more standard deviation filtering function functions. When used in combination with one or more correlation or other filtering functions, the standard deviation filtering functions form a second filtering layer providing additional criteria for evaluating image data. Standard deviation is a measure that is used to quantify the amount of variation or dispersion of a set of data values. A low standard deviation (e.g., below 50) indicates that the data points are close to the mean (i.e., the expected value) of the set. A high standard deviation (e.g., greater than 100) indicates the data points are spread out over a wider range of values. One preferred standard deviation filtering function determines how widely image data (e.g., a color vector) included in an image section varies from an average of all image data included in a group of similar image sections. Example groupings of similar image sections include image sections in a disparity profile, image sections included in the same image frame, one or more image sections at a plurality of shift positions, and one or more image sections extracted from a group of recently captured images.

In the example shown in FIG. 16, one or more standard deviation filtering functions are executed on color data in combination with correlation filtering functions. Adding a second filtering layer incorporating one or more standard deviation functions excludes image data that passes the first filtering threshold but would disrupts the re-calibration process if incorporated into the calibration profile 1615. The additional standard deviation filtering layer rejects image sections including very close, flat, and/or featureless aspects of a scene (e.g., a close object, solid color wall, road, or sky). These image sections have very high correlation coefficients at every shift position because the color data included in the image sections is identical at each shift position. Therefore, the image data passes the first filtering threshold provided by the correlation filtering layer. Disparity analysis conducted on this image data, however, is misleading because inaccurate disparity values receive the same high correlation coefficient as accurate disparity values.

The a second filtering layer excludes image data from image sections including close and/or featureless aspects by comparing image data included in a right or left image section to a second filtering threshold. For filtering layers incorporating one or more standard deviation functions, the filtering threshold is the standard deviation of image data included in a right or left image section ($ID_{Lc}$, $ID_{Rc}$) relative to an average of the image data included all image sections within the right or left image frame ($N_{IDLc}$, $N_{IDRc}$). Image sections having a close, flat, and/or featureless aspect will have a very low standard deviation because the color data remains constant at every shift position for each image section containing the same featureless aspect. Therefore, rejecting image data having a low standard deviation (e.g., 25 or fewer) excludes image sections including close, flat, and/or featureless aspects.

As shown in FIG. 16, one non-limiting example auto re-calibration subsystem 1702 implements two standard deviation filtering functions. A right image standard deviation function 1608 calculates the standard deviation of image data included in a compressed right image section (IDRc) relative to an average of all image data included every compressed image section within the right image frame ($N_{IDRc}$). A left image standard deviation function 1610 measures the standard deviation of image data included in a compressed left image section ($ID_{Lc}$) relative to an average of all image data contained in every compressed image section within the left image frame ($N_{IDLc}$). Right image 1608 and left image 1610 standard deviation functions are executed on image data included in every image section with the right and left image frames. Image data having standard deviation values above a filtering threshold (e.g., standard deviation of 25) are accepted as valid image data and incorporated into disparity analysis. Image data with a standard deviation at or below the filtering threshold are rejected and not considered in subsequent disparity analysis.

In the example shown in FIG. 16, the filtering threshold for standard deviation filtering functions is 25. Other examples may have higher or lower filtering thresholds for standard deviation to optimize for speed of calibration profile assembly or accuracy of image data considered in disparity analysis. Additionally, the filtering threshold may be dynamically varied according to power, storage, memory, and processing resources available for allocation to the auto re-calibration subsystem 1702 in light of the power, memory, storage, and processing demands of other components of the stereo camera system. The standard deviation filtering functions may also be performed independently of—or in combination with—one or more correlation or other filtering functions.

A depth filtering function is a third filtering function that may be implemented in the filtering module 1705. The depth filtering function excludes image data from image sections incorporating objects positioned a certain distance away from the stereo camera device. In one example, the depth filtering function rejects image data included in image sections containing close objects because the extreme horizontal and/or vertical shifts applied to image sections including close objects elsewhere in projection process interfere with re-calibration. Only image sections including objects that are an infinite distance away from the stereo camera module can provide a true measure of disparity between right and left views caused by calibration errors.

Image sections containing nearer objects positioned in front of the zero disparity plane and captured in different pixels are generated using horizontal and/or vertical shifts that account for the different positions of the right and left camera modules. The closer an object is to a capturing stereo camera module, the greater the horizontal and/or vertical shifts that must be applied to render stereoscopic right and left views of a scene. For close objects, the magnitude of the shifts required to render the right and left views far exceeds the magnitude of any misalignment due to calibration error. As a result, it is difficult to identify and/or separate shifts due to calibration error from shifts needed to generate left and right views of a scene including close objections. Additionally, very close objects may be difficult to capture clearly infocus thereby increasing the likelihood performing disparity analysis on image data including close objects will interfere with re-calibration by providing inaccurate adjustments to one or more calibration parameters. Therefore, it is desirable to filter out image sections including close objects.

One non-limiting example depth filtering function determines a depth metric for each image section then filters image data in the image sections by comparing the depth metrics to a depth filtering threshold. The depth metric describes the distance between the stereo camera device and the objects included in an image section. Depth maps, point clouds, 3D scans, and distance measurements may all be used to generate depth metrics. One non-limiting example distance measurement is equivalent to 1/the horizontal shift (in pixels) applied to images captured by the stereo camera module. Depth filtering thresholds for evaluating depth metrics include 20 cm for camera modules having small zoom ranges and short focal lengths and 1 m for camera modules having moderate to large zoom ranges and average to long focal lengths.

The depth filtering function may be used in combination with—or independent of—one or more other filtering functions implemented in the filtering module 1705. When performed in concert with one or more correlation filtering functions and one or more standard deviation filtering functions, the depth filtering function forms a third filtering layer within the filtering module 1705. In filtering routines including three filtering layers, image data may be required to pass three filtering thresholds to be incorporated into a disparity analysis. Alternatively, image data may only need to pass a majority or at least one of the three filtering thresholds (e.g., 2 of 3 or 1 of 3). In embodiments where image data is required to meet or exceed a subset of the filtering thresholds, the required filtering thresholds may be the same or different (e.g., image sections must pass both the depth filtering function and the standard deviation filtering function; image sections must pass the correlation filtering function and at least one other filtering function; or image sections must pass and any two filtering functions).

One or more filtering algorithms my programmatically provide specific filtering rules to be executed by the filtering module. The filtering algorithms may also be programmed to dynamically vary the filtering rules based on one or more parameters of the image data (e.g., contrast; textures; disparity; and/or amount of horizontal shift, vertical shift, or rotational shift) or auto recalibration system (e.g., desired filtering accuracy, available power or computational resources, and/or frame downsampling rate). Additionally, one or more filtering algorithms my automatically detect the optimal filtering rules according to one or more image quality functions, stereoscopic device performance algorithms, and/or machine learning models.

The filtering module 1705 may execute one or more additional filtering functions to compare disparity, color, contrast, texture, and other types of image data. Example filtering functions include statistical functions, ratios between two or more calculated values, technical metrics, and other mathematical models. Statistics based filtering methods may incorporate functions for calculating the standard deviation, population variance, mean squared error (MSE), statistical correlation, average, and median. Signal to noise ratio and peak signal to noise ratio (PSNR) are two example metrics that may be generated by the filtering module 1705 to compare images. Models for comparing images or video streams generated by one or more embodiments of the filtering module 1705 include structural similarity (SSIM), the perceptual evaluation of video quality (PEVQ) index developed by the video quality experts group (VQEG), the objective perceptual video multimedia quality measurement of HDTV (VQuad-HD) model, the visual information fidelity (VIF) index, the motion turned video integrity evaluation (MOVIE) index, and the Tektronix PQA models.

Filtering functions may also incorporate full-reference, no-reference, or reduced-reference metrics for image comparisons (e.g., comparing a right image to a left image, a right or left image to another right or left image or group of right or left images generated by a right or left camera module, or a right or left image to a constructed right or left image generated by mathematically combining or arranging image data from multiple right or left images). Full-reference approaches incorporate an initial uncompressed or distortion free reference image as a baseline for comparing two images (e.g., right vs left). No-reference approaches do not consider distortions that may occur during acquisition, processing, compression, storage, transmission, and reproduction of an image and are ideal for comparing images without practically available reference images. Techniques leveraging partial reference image information, typically a set of extracted image features, are known as reduced-reference methods.

MSE and PSNR are the simplest and most widely used full-reference metrics for image comparison. PSNR expresses the ratio between the maximum possible strength of a signal and the strength of a noise signal that interferes with the true signal. For purposes of auto re-calibration for stereo camera systems, PSNR may compare the disparity signal (e.g., horizontal disparity, vertical disparity, and rotational disparity in terms roll, yaw, and pitch) to a disparity signal attributable to noise. Generally, MSE reflects the average of the squares of the two errors (i.e. the deviation of an observed value from the true value). For stereo images, MSE may be computed by averaging the squared disparity differences between left and right images. Alternatively, MSE may be computed by averaging the squared disparity differences between one right or left image and a selection of one or more right or left images. MSE may be calculated using disparity values measured in an entire image, a group of images, an image section, or a group of image sections.

SSIM is another full reference metric for measuring the similarity between two images that may be implemented in the filtering module 1705. Generally, SSIM separates the task of similarity measurement into three comparisons: luminance, contrast, and structure. It improves upon traditional MSE or PSNR techniques by considering image degradation as a perceived change in structural information rather than focusing solely on absolute error estimates (i.e., differences between an undistorted reference signal and an error signal). Structural information in an image includes the attributes that represent the structure of objects in a scene independent of the average luminance and contrast.

In one example method for determining the SSIM between two or more images, independent functions determine estimates for luminance and contrast. Normalized versions of the signals being compared (e.g., the reference and noise signals or the right and left image signals) are then generated so a structure comparison may be conducted on the normalized signals. In one example, signals are normalized by dividing each signal by its own standard deviation, so that the signals have the same unit standard deviation. The three components (i.e., luminance, contrast, and structure) are then combined to yield an overall similarity score. One important property of SSIM is that the three components are relatively independent so that a change in luminance and/or contrast will not affect the structure of the image.

Example filtering functions may incorporate MSE, PSNR, and SSIM as metrics for evaluating the similarity of two or more images. Indices or scores generated by one or more filtering functions incorporating MSE, PSNR, and/or SSIM metrics may be evaluated using a filtering threshold. In examples using PSNR and SSIM, image data generating indices exceeding the threshold may be accepted for disparity analysis and image data below the threshold may be excluded from disparity analysis. For examples incorporating MSE and other error metrics, error measures less than the filtering threshold may be accepted for disparity analysis and error measures exceeding the filtering threshold may be excluded from disparity analysis.

FIG. 16 illustrates one example filtering routine performed by the filtering module. The filtering route evaluates a pair of stereoscopic right and left image frames having 24 image sections and 21 shift positions using 4 filtering functions and a total of 2,016 filtering operations. To optimize image data filtering for accuracy, image data fed into one or more filtering functions may be upsampled to generate subpixel comparisons. In one example, right and left image data is upsampled by an upsampling factor (generally between 2 and 6) to generate more precise (i.e., subpixel) image data at each shift position. Upsampling image data by a factor of 6 at each shift position provides 126 (21×6) comparisons for image data included in each of the 24 image sections producing 3,024 image data comparisons for the entire image. The 3,024 comparisons are then filtered using 4 filtering functions yielding a filtering routing having 12,096 filtering operations.

In the example shown in FIG. 16, the four function filtering sequence is executed at each pixel shift position to provide two accuracy filters (correlation coefficient and standard) for image data included in each image section. Other filtering module 1705 embodiments may execute more than two filtering functions on disparity and other image data (e.g., pixel position data, object position data, color vectors, luminance, contrast, depth, and textures). Alternatively, a filtering module embodiment may execute a two function filtering sequence on a subset of the pixel shift positions. Additional filtering functions may also be applied to image data from one or more image sections 1502 or image data at one or more pixel shift positions, wherein the image data has been identified as a candidate for additional analysis based on receiving a score within a range proximate to the filtering threshold. Additional filtering functions also may be applied to image data based on the location of an object within an image, the location of the image data within the rendered and/or captured image frame, or another characteristic of the image data (e.g., color vector, texture, disparity, depth, contrast, and luminesce).

Disparity Analysis

As described herein, the term "disparity" refers to a difference in image data captured by the left and right camera modules in stereo camera system. In one example, disparity may be calculated by comparing image data (e.g., color data, pixel position information, captured object location, contrast, and image texture) in one image frame relative to a second image frame. Disparity is typically measured in pixels and disparity measurements may be associated with a direction, angle, or size (e.g., horizontal disparity, vertical disparity, rotational disparity, or scalar disparity). The disparity analysis described herein generates disparity values for each image section using filtered image data. The disparity values are then used to calculate one or more calibration parameters describing the position of a camera module. The calibration parameters and/or disparity values are then compiled into a calibration profile including disparity values for each image frame captured and analyzed by a camera module. The calibration parameters included in the calibration profile, thereby, form a record of the position of a camera module and how the position changes over time. Calibration parameters stored in the calibration profile are used to rectify and project captured images. In addition to generating calibration parameters, the disparity values stored in the calibration profile are used to identify calibration errors.

Post filtering, the re-calibration engine 1706 performs a disparity analysis on image data (e.g., color data, captured object location information, captured object depth information, pixel position information, and image texture information) that passes a filtering process described above. The disparity analysis determines if a calibration error is present in the image data and, if so, determines the re-calibration adjustments to apply to the calibration parameters for each image section to rectify and project right and left image frames. In the non-limiting example shown in FIG. 16, the disparity analysis is conducted on color vector image data and occurs in four or more steps. First, a unique disparity value is generated for each pair of accepted stereoscopic image data. Disparity values may be expressed in pixels and describe the distance needed to shift a pair of right and left image sections into a perfectly rectified position. Said another way, disparity values quantify the offset of two image sections due to calibration error (i.e., the distance in pixels separating two image sections from a perfectly rectified position).

Disparity values calculated from accepted image data are then assembled in an aggregate disparity array 1611. For each image section, disparity values are calculated from image data satisfying the filtering process used to exclude inaccurate or noisy data. Typically, one or more shift functions are applied to image data included in the image sections to increase the number of comparisons between the image data in each image section. Therefore, several disparity values may be calculated for each image section. For example, as shown in FIG. 16, image data for 9 of a possible 11 shift positions generated by the shift up function 1510 pass the filtering thresholds provided by the filtering module 1705. Therefore, 9 disparity values are determined for the shift up positions of this pair of image sections and appear in the upper aggregate disparity array. Image data for 7 of a possible 10 shift positions generated by the image shift down function 1511 pass the filtering thresholds. Therefore, 7 disparity values are determined for the shift down positions of this pair of image sections and appear in the lower aggregate disparity value array.

Third, a disparity value aggregation function 1617 is executed on the aggregate disparity array 1611 to generate an aggregate disparity value for each image section. In one example, the disparity value aggregation function 1617 relates disparity values to correlation coefficients by associating the disparity value at a shift position with the corresponding correlation coefficient calculated for the image data at the same shift position. For example, a disparity value of "+2" determined for shift position "3" (i.e., the third shift increment of the image shift up function 1510 having the right image section shifted up ten pixels relative to the left image section) is associated with the correlation coefficient (i.e., the r value) generated by the correlation filtering function(s) at shift position "3" (e.g., 0.913). The disparity value aggregation function 1617 then determines the aggregate disparity value for each image section by selecting the disparity value having the highest associated correlation coefficient.

Alternatively, the disparity value aggregation function 1617 may generate an aggregate disparity value by averaging, selecting the mean, selecting the mode, or performing another statistical or mathematical operation that combines and/or compares disparity values included in the aggregate disparity array 1611. The disparity value aggregation function 1617 may also incorporate one or more machine learning or artificial intelligence models to determine aggregate disparity values. The aggregation function 1617 may also be programmed to change dynamically according to one or more disparity aggregation parameters including the disparity accuracy threshold, available computational or power resources, the number of aggregate disparity values to determine, or the desired speed of computation for aggregate disparity values.

Fourth, aggregate disparity values are aggregated and/or mapped to their relevant image sections. In one example, aggregate disparity values are assembled in a disparity matrix that includes the aggregate disparity values for each image section having at least one stereoscopic pair of image data passing the applied filtering process. Optionally, aggregate disparity values present in the disparity matrix may be associated with positional data corresponding to the image data used to determine the disparity values combined to produce the aggregate disparity values. By associating each aggregate disparity value with its corresponding position information, the disparity matrix is transformed into a disparity map 1612 depicting each aggregate disparity value over the region of the image frame including the image section containing the image data compared during the disparity analysis to determine the aggregate disparity value. For example, if image section 1 in the top left corner of the image frame includes image data that was used to determine an aggregate disparity value of −5 then −5 is displayed in the top left corner of the disparity map. Therefore, the disparity map displays the re-calibration adjustment in pixels (i.e., the aggregate disparity value) that must be applied to each image section to bring the stereoscopic image frames into a rectified position having perfect alignment between each pixel included in the image frames.

Disparity maps 1612 may also be stored in the calibration profile. Calibration profiles 1615 may include a comprehensive library of calibration information including measured disparity for images captured throughout the life of the camera device. Calibration profiles 1615 may include calibration information for a single image section (e.g., IS1). Alternatively, calibration information for all image sections (i.e., ISN) contained in a sectioned image 1501 may be assembled in a single calibration profile 1615. The re-calibration engine 1706 may write calibration profiles 1615 to memory and update calibration profiles 1615 with disparity values calculated from information accepted image data.

Additionally, programmatic analysis on the patterns of magnitude, direction, position, and other parameters of the aggregate disparity values included in the disparity maps 1612 may also be performed by the re-calibration engine 1706 to determine the type of calibration error occurring in the stereo camera system. In one example, the re-calibration engine evaluates disparity maps 1612 for calibration error classification using a calibration error model implementing one or more calibration error classification algorithms. Non-limiting example calibration error algorithms include recognizing disparity maps containing a uniform vertical disparity having a similar magnitude and direction throughout all image sections as having a vertical calibration error and recognizing disparity maps containing a uniform horizontal disparity having a similar magnitude and direction throughout all image sections as having a horizontal calibration error.

Other more complex example calibration error classification algorithms including recognizing disparity maps containing opposite corners having disparities with opposing directions (e.g., a cluster of negative disparity values in a top left corner and a cluster of positive disparity values in a bottom right corner) with a section of zero disparity in the center region as having a first type of rotation calibration error; recognizing disparity maps having an increasing or decreasing gradient of negative or positive disparities at two or more edges of the disparity map (e.g., disparity values along a left edge that increase from −5 in the top corner to −1 in a middle or lower edge section and disparity values along a right edge that decrease from +5 in the top corner to +1 in a middle section as having a second type of rotation calibration error; recognizing disparity maps having a gradient of disparity values that increase or decrease in a diagonal, vertical, or horizontal direction across all image sections (e.g., disparity values that gradually decrease in a horizontal direction from +5 on the left side of the disparity map to 0 on the right side of the disparity map) as having a first type of scale calibration error; and recognizing disparity maps having positive or negative disparity values along one or more edges coupled with zero disparity sections in the middle and/or other irregular patterns of disparity values included in the disparity map as having a second type of scale calibration error.

The calibration error model may also programmatically identify the calibration parameters to adjust for each type of calibration error using one or more algorithms. Example algorithms for identifying the calibration parameters to adjust that may be implemented in the calibration error module include, adjusting the pitch angle, roll angle, and/or one or more other calibration parameters corrects vertical calibration errors; modifying the yaw angle and/or one or more other calibration parameters corrects horizontal calibration errors; rotation calibration errors are corrected by adjusting the roll angle and/or one or more other calibration parameters; and scale calibration errors are corrected by adjusting focal length and/or one or more other calibration parameters.

In the example shown in FIG. 16, the disparity analysis described above is performed for each pair image section 1502 included in the sectioned images 1501. Each of the 24 pairs of image sections 1502 included in the sectioned images 1501 may generate a maximum of 21 disparity values (i.e., one disparity value per shift position), thereby creating a maximum of 504 disparity values for each pair of sectioned images 1501. Disparity analysis may be performed on accepted image data included in image sections extracted from every captured image frame or a subset of captured image frames, thereby creating calibration profiles having well over 504 disparity values and/or 24 aggregate disparity values.

Due to a filtering process implemented in the filtering module 1705, aggregate disparity values 1613 for each image section may be generated from fewer than 21 disparity values. In extreme cases, image data at every shift position for one or more image sections rejected by a filtering process resulting in less than 24 aggregate disparity values and less than one aggregate disparity value for every one image section. If a filtering process rejects all image data for an image section, the disparity map will have some image sections left blank with no aggregate disparity value. The aggregate disparity value for the one or more blank image sections may be estimated according to aggregate disparity values included in at least one of adjacent image sections, surrounding image sections, other image sections included in the image frame, image sections included in previously captured image frames, one or more machine learning models, or artificial intelligence algorithms.

Modifying Calibration Parameters Using Disparity Values

Disparity values calculated from accepted image data are written to an aggregate disparity array 1611 or stored elsewhere in memory readable by other components of the auto re-calibration subsystem 1702. A disparity aggregation function 1617 is performed on the aggregate disparity array 1611 to generate an aggregate disparity value 1613 for each image section 1502. An aggregate disparity value 1613 may include a magnitude and direction. The magnitude measures the number of pixels of alignment offset between a pair of stereoscopic image sections. Therefore, shifting the position of the pair of stereoscopic image sections by the number of pixels specified by the aggregate disparity value 1613 brings the right and left image sections to a rectified position having each pixel included in the pair of image sections perfectly aligned. Adjusting each image section 1502 in this manner will rectify a pair of stereoscopic image frames by perfectly aligning each pixel in the pair of image frames. The direction component of the aggregate disparity value 1613 (e.g. horizontal, vertical, or rotational) describes the direction of the pixel shift needed to bring the pair stereo image sections into a rectified position. In one example, the directional component is expressed as a "+" or "−".

In the example shown in FIG. 16, the aggregate disparity value 1613 for the compressed right and left vertical image strips 1509 is −6.22. The magnitude (6.22) and direction ("−") indicate the right image section must move vertically down a total of 6.22 pixels relative to the left image section to reach a rectified position. The down direction can be inferred from the "−" based on the type of compressed image section (i.e., vertical compression strips) being compared and the type of shift function (i.e., the vertical shift function) performed to obtain the shift positions for disparity analysis. The "+" and "−" directions can have other meanings in other contexts. For example, directions associated with aggregate disparity values generated for horizontal image strips having shift positions created by a horizontal shift function are right ("+") and left ("−"). Directions associated with aggregate disparity values generated for rotational image subsections having shift positions created by a rotational shift function are clockwise ("+") and counter clockwise ("−"). Directions associated with aggregate disparity values generated for rotational image subsections having shift positions created by a scale shift function are expand (+) and contract (−).

Aggregate disparity values are used to calculate calibration parameters for each image section 1502. In one example, calibration parameters are determined from a combination of aggregate disparity values generated from newly processed and legacy image sections. Newly processed image sections include image data contained in the image sections most recently captured by the stereo camera system. Legacy image sections include image data contained in image sections previously captured by the stereo camera system. To determine one or more calibration parameters, aggregate disparity values from newly processed and legacy image sections are combined using an aggregate disparity value aggregation function 1614. In the example shown in FIG. 16, the weighting operation 1616 weighting operation 1616 specified by the aggregate disparity value aggregation function 1614 provides one implementation for combining the real time aggregate disparity values ("ADVrt") derived from the newly processed images sections with the legacy aggregate disparity values ("ADVleg") determined from the previously processed legacy image sections. The weighting operation 1616 applies a first weight to the real time aggregate disparity values ("Wnew") and a second weight to the legacy aggregate disparity values previously added to the calibration profile ("Wprof"). The one or more weighted real time aggregate disparity values are then combined with the one or more weighted legacy disparity values to generate a pixel shift parameter ("PSP").

The pixel shift parameter describes how to modify or generate one or more calibration parameters in the calibration file to correct calibration errors affecting rectification and projection of stereo frames generated by the stereo camera system. The first and second weights applied during the weighting operation 1616 determine how slowly or quickly real time disparity results generated from the auto re-calibration process will affect the calibration parameters. Higher weights for the real time aggregate disparity values and lower weights for the legacy aggregate disparity values produce faster changes to calibration parameters. Conversely, lower weights for real time aggregate disparity values and higher weights for the legacy aggregate disparity values put more emphasis on previous disparity measures and less emphasis on the most current disparity measures, thereby providing more gradual changes to calibration parameters.

In the example shown in FIG. 16, the weight ("Wnew") applied to real time aggregate disparity values ("ADVrt") is 0.1 and the weight ("Wprof") applied to legacy aggregate disparity values ("ADVleg") is 0.9. Therefore, real time aggregate disparity values determine 10% of the pixel shift parameter used to modify or generate calibration parameters and legacy disparity values determine the remaining 90% of the pixel shift parameter. The weights ("Wnew" and "Wprof") may be customized to optimize performance of the stereo camera system under certain conditions. For example, stereo camera systems capture scenes under new or unusual conditions may have a higher weight ("Wnew") applied to real time aggregate disparity values allowing for faster auto re-calibration. Conversely, stereo camera systems frequently used in a variety of conditions may have a higher weight ("Wprof") applied to legacy aggregate disparity values so that the camera performs well in a variety of settings and does not optimize too quickly for a specific set of capture conditions.

Each time a new video frame is processed by the auto re-calibration subsystem 1702, the real time disparity value from the previously processed image frame is incorporated into the legacy aggregate disparity value. Therefore, the legacy aggregate disparity value reflects the disparity between each pair of image sections included in a pair of stereoscopic image frames over the historical life of the stereo camera system. The relationship between the legacy aggregate disparity value and the real time aggregate disparity value indicates how the current position of each camera module compares to the historical position of each module. For example, camera modules that have changed position recently will generate image sections having legacy aggregate disparity values close to zero and real time aggregate disparity values having magnitudes that are much larger (e.g., +2, +5, −5, or higher). Camera modules that previously changed position and kept that position over time will generate image sections having legacy aggregate disparity values similar to real time aggregate disparity values (e.g., a legacy aggregate disparity value of +2.5 and a real time aggregate disparity value of +2.7).

In one example, the legacy disparity value is calculated by averaging all previously incorporated aggregate disparity values (i.e., all other previously generated real time disparity values). In other examples, a portion of the aggregate disparity values incorporated into the legacy disparity value may be weighted. For example, the 5 or 10 most recent or most common real time aggregate disparity values incorporated into the legacy disparity value may be weighted higher or lower relative to the older aggregate disparity values included in the legacy disparity values. Additionally, the total number of disparity values included in the legacy disparity value may be limited (e.g., disparity values for 300 or 10,000 processed image frames). A legacy disparity value may be calculated for every pair of image sections included in a pair of stereoscopic video frames as part of the execution of the aggregate disparity value aggregation function 1614. Alternatively, a separate legacy disparity value aggregation function implemented in the re-calibration engine 1706 may determine the legacy aggregate disparity value prior to execution of the aggregate disparity value aggregation function 1614 and/or the weighting operation 1616.

One or more pixel shift parameters are used by the auto re-calibration subsystem 1702 to generate and/or modify one or more calibration parameters. In one example, the re-calibration engine 1706 receives a calibration file 903 including calibration metadata, a camera field of view in degrees, and a display dimension in pixels. For each camera field of view (e.g., vertical field of view or horizontal filed of view) the re-calibration engine 1706 calculates a degree to pixel ratio by diving the number of pixels included in each display screen dimension (e.g., pixels in the screen x dimension and pixels in the screen y dimension) by its corresponding filed of view. For example, dividing the number of pixels in the display screen x dimension by the degrees of horizontal field of view generates the horizontal degree to pixel ratio and dividing the number of pixels in the display screen y dimension by the degrees of vertical field of view generates the vertical degree to pixel ratio. Pixel shift parameters are then multiplied by the corresponding pixel to degree ratio to generate an angular shift parameter. For example, a horizontal shift parameter in pixels is multiplied by the horizontal pixel to degree ratio to generate a yaw angle shift parameter. Alternatively, a vertical shift parameter in pixels is multiplied by the vertical pixel to degree ratio to generate a pitch angle shift parameter. Rotational and scalar shift parameters in pixels may multiplied by there corresponding rotational, scalar, vertical, and/horizontal pixel to degree ratios to generate a yaw, pitch, and/or roll angle shift parameter.

The angular shift parameter is then combined with the corresponding rotation angle extracted from the rotation matrix included in the calibration metadata contained in the calibration file to generate the optimal calibration parameter (e.g., rotational angle). To optimize the yaw angle calibration parameter, for example, the yaw angle shift parameter is combined with the yaw angle extracted from the rotation matrix included in the calibration file to generate an optimal yaw angle calibration parameter. The rendering engine 913 then rectifies the right and left image frames according to the new calibration metadata having the new yaw angle calibration parameter incorporated into the rotation matrix. New projection matrices are also generated using the new calibration parameters. To correct for calibration errors in real time during playback, the rendering engine uses the new projection matrices to project the contents of each image section including image pixels of the stereoscopic video sequence to display pixels of the stereoscopic display device.

Other components of the camera device providing playback of images and video sequences (e.g., the rendering engine 912) may read the data included in the calibration profiles 1615 (e.g., real time disparity data, 1617, legacy disparity data 1619, pixel shift parameters 1620, angle shift parameters, disparity maps 1621) and/or other metrics generated by the re-calibration engine 1706 to modify stereoscopic calibration parameters in order to improve image rectification and projection. Additionally, some or all of the data included in calibration profiles 1615 may be embedded into images, video frames, and streaming video sequences provided by the stereo camera system to assist with playback or downstream processing of stereo images by depth based applications and/or machine learning systems.

Rectification and Projection of Stereo Images Using Calibration Profiles

Data included in the one or more calibration profiles 1615 are used to generate re-calibration data 1615 including one or more calibration parameters 1709 or revised position data 1710. In the example shown in FIG. 17, the one or more calibration parameters 1709 or revised position data 1710 are sent to the image rectification system 123 to rectify and project images and video frames generated by the 3D stereo camera system. Calibration profiles may include one or more pixel shift parameters 1620 generated from real time disparity data 1618 and legacy disparity data 1619. The pixel shift parameters 1620 describe how to adjust the position one or more stereo image frames to correct calibration errors and thereby improve rectification and projection of the stereo image pair by perfectly aligning each pixel included in the left image frame with each pixel included in the right image frame. The pixel shift parameters 1620 describe the magnitude and direction (e.g., vertical, horizontal, scalar, or rotational) of adjustments in pixels that can be applied to image section position data to generate revised position data 1710 and/calibration metadata 300 to generate one or more calibration parameters 1709. In one example, pixel shift parameters 1620 are generated for an entire image frame so that the same pixel shift parameter 1620 is applied to position data and/or calibration metadata 300 for every image section. Alternatively, to allow for more precise adjustments, unique pixel shift parameters 1620 may be generated for each image section 1502 included in a sectioned image 1501.

To correct calibration errors, the pixel shift parameters 1620 may be applied before or after rectification. In one post rectification example, the rendering engine 913 reads one or more calibration profiles 1615 to extract one or more pixel shift parameters 1620. To generate revised position data 1710, the pixel shift parameters 1620 are applied to the position data portion of image data received by the rendering engine 913 from the image sensor 1104. The position data may include x and y pixel dimensions describing the location within the image frame to project the content (e.g., color data) portion of the image data. The revised position data 1710 includes position data for each image section that is modified according to the pixel shift parameters 1620. To render a rectified image frame having no calibration errors, the rendering engine 913 then passes revised image data for each image section including the revised position data 1710 and the original color data to a shader 915 for rendering. The shader 915 renders the revised image data image section by image section on the display 160 as one or more rectified images or video frames 1713 (e.g., a right rectified stereo image or video frame, a left rectified stereo image or video frames, or a 3D view of an image or video frame incorporating rectified right and left stereo images or video frames).

In other examples, the pixel shift parameters 1620 are applied to calibration metadata 300 before rectification. The re-calibration engine 1706 receives a calibration file 903 and extracts one or more static calibration parameters (e.g., a pitch, yaw, and/or roll angle included in the rotation matrix) from camera intrinsic calibration metadata 310 and/or stereoscopic calibration metadata 320 included in the calibration file 903. One or more pixel shift parameters are then converted to angular shift parameters by performing one or more mathematical operations and/or relations, for example, multiplying the pixel shift parameter by a degree to pixel ratio derived from one or more camera settings (e.g., camera field of view and image display dimensions) included in the calibration file 903. Angular shift parameters are then combined with the one or more static calibration parameters to generate one or more calibration parameters 1709. Calibration parameters 1709 produced by the re-calibration engine 1706 are used to generate updated calibration metadata including revised rectification and projection matrices. The new calibration metadata is then passed to the rendering engine 913 and a shader 915 uses the new calibration metadata, to render image pixels including image data generated by the stereo camera devices image section by image section as display pixels on the display device 160. Calibration errors will be corrected by the new calibration metadata so that the display pixels show rectified left and right views of the stereo video content captured by the stereo camera system.

Embedding Stereoscopic 3D Calibration Metadata

In some embodiments, the calibration metadata 300, calibration file 903, calibration profile 1615, and/or re-calibration data 1708 can be embedded as metadata into 3D images and/or video frames produced by the stereo camera system. For example, the stereo camera system captures the 3D video into a recorded 3D video file and embeds the calibration metadata 300 into the 3D video file as metadata. These metadata can include, e.g., camera intrinsic parameters, parameters of each of the left and right lenses, parameters of each of the left and right image sensors, information about the inertial measurement unit (IMU), information about the accelerator, information about the gyroscopic device, device location information, zoom position information, baseline position information, image data, for example, a 3D image or rectified right and left image pairs, etc.

In some embodiments, the calibration metadata 300, calibration file 903, calibration profile 1615, and/or re-calibration data 1708 can be saved in the metadata header of the 3D video file. Alternatively, the calibration metadata 300, calibration file 903, calibration profile 1615, and/or re-calibration data 1708 can be saved in a subtitle channel or a closed caption channel in the video file. For example, calibration metadata 300, calibration file 903, calibration profile 1615, and/or re-calibration data 1708 can be saved in a foreign language subtitle channel that does not correspond to any real-world language.

In some embodiments, the calibration metadata 300, calibration file 903, calibration profile 1615, and/or re-calibration data 1708 can be visually encoded into one or more frames of the 3D video file via, e.g., a video steganography process. In some embodiments, a graphic processing unit (GPU) can perform the video steganography process. With the steganography process, the calibration metadata 300, calibration file 903, calibration profile 1615, and/or re-calibration data 1708 are stored in each frame of the 3D stereoscopic video. Any video playback software or video editing software can extract the calibration metadata 300, calibration file 903, calibration profile 1615, and/or re-calibration data 1708 since the metadata embedded using steganography does not depend on the video format and always stays with the video frames.

It is desirable to embed the parameters about the camera, sensor, and processing directly into the video file recorded by the stereo camera system at the time of capture. Some of those parameters may be fixed for the duration of the video, such as image sensor and calibration parameters; while some parameters may change during the recording process, such as accelerometer, gyroscope, and GPS sensor readings.

In some embodiments, it is desirable that a player can read and process a video file that has been generated using the captured video of different stereo camera systems. For example, two users with different stereo camera systems may record scenes with their own devices, and then concatenate their respective videos into a single video file. In such a case, the stereoscopic video player will need to be able to associate different portions of the composite video file with different camera parameters, including different lens distortion parameters and image sensor parameters.

Accordingly, there is a need for a system or method that can embed the camera and sensor parameters into the video file captured by a stereoscopic 3D camera. Parameters will be either set once per the entirety of the file, or changed for each frame of the video. Additionally, there is a need for a system or method that can process such a stereoscopic 3D video file and decode the parameters, either fixed for the entirety of the file, or on a per frame basis. Such a system or method could then utilize the parameters during the playback of the video file.

Playback Using Stereoscopic 3D Calibration Metadata

During playback of the 3D video file, a playback device (e.g., a stereoscopic device disclosed herein or another device such as a computer, a smart phone, virtual reality headset, or smart television) can extract the calibration metadata 300, calibration file 903, calibration profile 1615, and/or re-calibration data 1708 from the 3D video file. For example, the metadata can be extracted from the metadata header of the video file, or decoded from one or more frames of the video though a video steganography technique as a stereoscopic video player running on the playback device processes the video.

A stereoscopic video playback device can run a playback process to render a stereoscopic 3D video, on a computer, a virtual reality ("VR") headset, or a mobile phone having a stereoscopic or holographic display. In some embodiments, the functionalities and components of the stereoscopic video player can be included in the 3D stereo camera system 100 as well. For example, the system 100 can include a display screen 160 for playing back the 3D videos, as shown in FIG. 1.

Each of the stereoscopic frames is processed by the player, which may additionally require the parameters associated with the camera that captured the frames. For example, the player may require knowing details about the camera's image sensors and calibration metadata to properly render the stereoscopic frames. If the camera processed the video frames prior to the frames being encoded into the video file, the player may also need to know the parameters of the image processing algorithms that processed the frames.

Time stamp information may also be embedded into the image frame or encoded into the image file. Upon playback, the player may read the time stamp information to sequence the frames of a video stream and/or and associate one or more frames with one or more sets of calibration metadata 300, calibration files 903, calibration profiles 1615, and/or re-calibration data 1708. By reading the time stamp information and associating the frames with their corresponding time stamp information, the player can render the frame using the calibration metadata 300, calibration file 903, calibration profile 1615, and/or re-calibration data 1708 that corresponds to the frame even if the calibration metadata 300, calibration file 903, calibration profile 1615, and/or re-calibration data 1708 changes between frames in an image stream.

Figure 4:
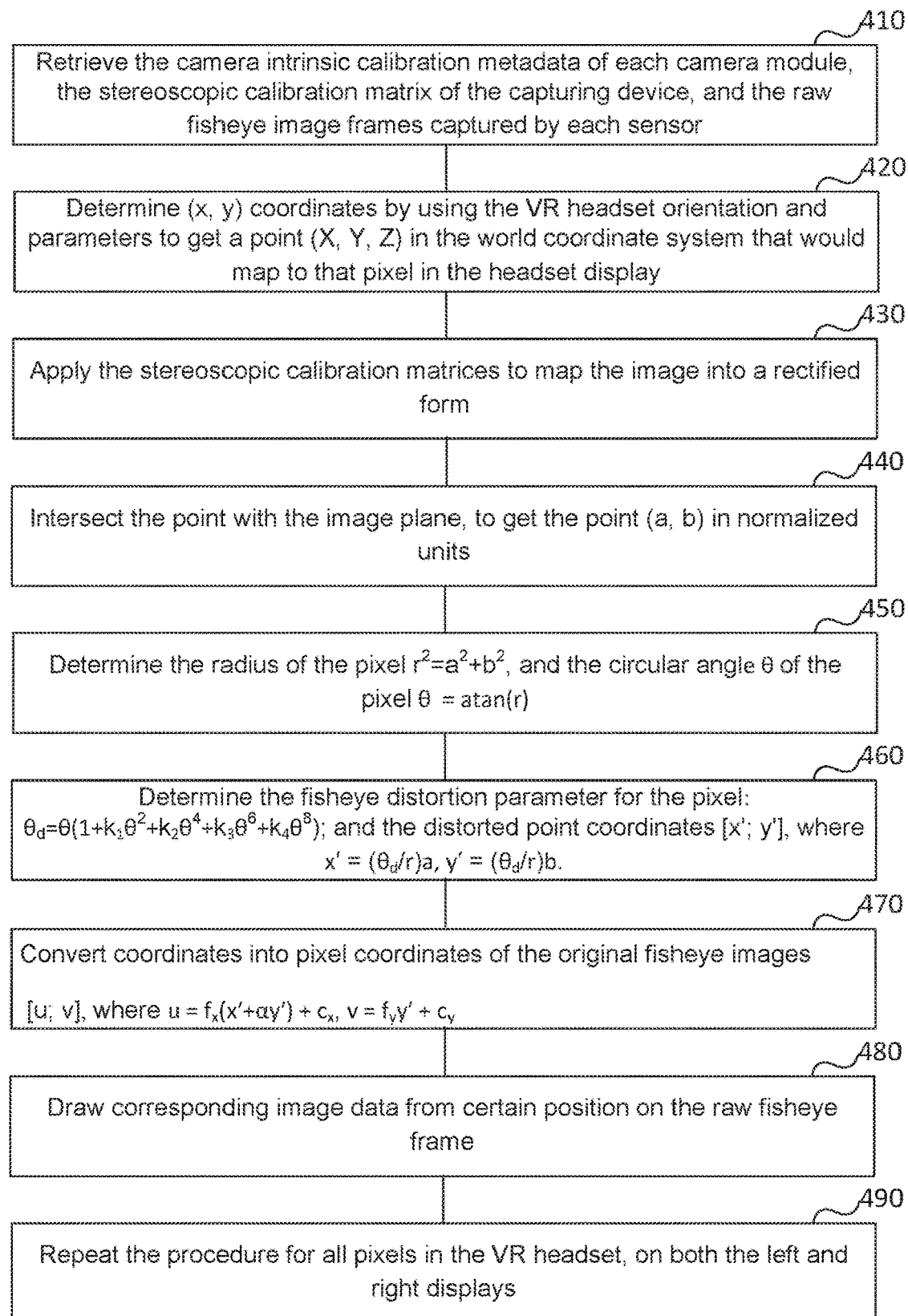
FIG. 4 shows a sample process of playing back a wide angle stereoscopic video using embedded calibration metadata.

FIG. 4 shows a sample process of playing back a stereoscopic video using embedded calibration metadata. At block 410, to render a stereoscopic 3D image (or a stereoscopic 3D video frame) onto a computer, smart phone, VR headset, or other playback device, the playback process retrieves the camera intrinsic calibration metadata of each camera module, the rectification and projection matrices of the capturing device (as stereoscopic calibration metadata), and the raw image frames captured by each sensor. In addition, the playback process may retrieve some parameters about the, computer, smart phone, headset or other playback device, such as its current orientation (e.g., represented by an orientation matrix), its field of view, and the offset between the two eye locations of the headset.

Rendering the frame is generally done pixel-by-pixel for each display pixel on the computer, smart phone, VR headset, or other playback device. To render each pixel of a frame displayed on the computer, smart phone, VR headset, or other playback device (also referred to as display pixel), the playback process identifies one or more corresponding pixels from the captured image frames (also referred to as image pixels or frame pixels). The playback process repeats the pixel-by-pixel rendering for both left and right channels until the complete frame is rendered.

For each pixel, the playback process can use the current orientation of computer, smart phone, VR headset, or other playback device to determine the latitude and longitude of that pixel relative to center of the computer, smart phone, VR headset, or other playback device (also referred to as a head center location of the computer, smart phone, VR headset, or other playback device). The orientation can be described using, e.g., an orientation matrix or any equivalent description about the direction.

In some alternative embodiments, the playback process can use a pinhole camera model to intersect the pixel with the image plane, to get the pinhole camera model projected coordinates. Other camera models (e.g., Bouguet's model that accounts for circular distortion caused by the lens system) may also be used to obtain projected coordinates. The playback process can then use the position coordinates of that pixel to map it into the coordinates of the raw image. The pixels of the left display of the computer, smart phone, VR headset, or other playback device are mapped to the left camera module's image (left channel), and the pixels of the right display of the computer, smart phone, VR headset, or other playback device are mapped to the right module's captured image (right channel). For example, assuming (a, b) are the (x, y) coordinates of an original pixel, which are mapped onto the image plane, such that (0, 0) is the center of the image. At block 420, the playback process can determine (x, y) coordinates by using the orientation of the computer, smart phone, VR headset, or other playback device and parameters to get a point (X, Y, Z) in the world coordinate system that would map to that pixel in the headset display.

At block 430, the playback process can then apply the rectification matrices to this point, to map the image into a rectified form. In some embodiments, two rectification matrices describe the stereo camera system rectification: a rotation matrix (R) and a projection transform matrix (T). After the rectification using the rectification matrices, the rectified left and right channel frames are in the forms as though the frames were captured from the same image plane. The rotation matrix R is responsible for mapping the image planes of the left and right frames to be on the same plane. The projection matrix P is used to ensure that the left and right images are vertically aligned, and satisfy an epipolar geometry. In some embodiments, the left and right frames can be assigned their own rotation and projection matrices, R1, P1, and R2, P2, respectively, such that when applied the frames will be rectified to a common image plane that is halfway between the left and right planes. Coordinates from the unrectified left frame, for example, can be mapped to the rectified plane by pre-multiplying the coordinate by R*P. Similarly, the inverse of R*P can be used to map points from the rectified frame to an unrectified frame.

At block 440, the playback process can then intersect the point with the image plane, to get the point (a, b) in normalized units. At block 450, the playback process determines the radius of the pixel which can be defined by the equation: $r^2 = a^2 + b^2$; and the circular angle $\theta$ of the pixel which can be defined as: $\theta = a\tan(r)$.

At block 460, for camera systems having a wide angle fisheye lens, the playback process determines the fisheye distortion parameter for the pixel: $\theta_d = \theta(1 + k_1\theta^2 + k_2\theta^4 + k_3\theta^6 + k_4\theta^8)$; and the distorted point coordinates [x'; y'], where $x' = (\theta_d/r)a$, $y' = (\theta_d/r)b$.

At block 470, the playback process then can convert those coordinates into pixel coordinates of the original fisheye images. The final pixel coordinates are vector [u; v], where:

$$u = f_x(x' + \alpha y') + c_x$$

$$v = f_y y' + c_y$$

At block 480, with those final pixel coordinates, the playback process can draw corresponding image data from certain position on the raw fisheye frame. The [u, v] coordinates need not be integers. The playback process can use interpolation in the source fisheye image if the [u, v] coordinates are not integers. With those coordinates, the playback process pulls the [u, v] pixel from the fisheye image, and displays that pixel value on the computer, smart phone, VR headset, or other playback device at the original pixel point that is being rendered. At block 490, the playback process repeats this procedure for all pixels in the computer, smart phone, VR headset, or other playback device, on both the left and right displays. In addition, the playback process can update the pixels at the refresh rate of the headset. In some embodiments, the playback process can be performed efficiently by a graphics processing unit (GPU), though it could also be done on a central processing unit (CPU).

Stereoscopic 3D 360-Degree Stitching

In some embodiments, multiple cameras or stereoscopic devices can be combined together to capture the 3D image or 3D video in a super wide field of view (e.g., 360 degrees) simultaneously. Each stereoscopic device can capture the 3D image or 3D video at a wide field of view (e.g., 180 degrees) for both left and right channels.

Those simultaneously captured 3D videos can be combined together to create a virtual reality experience in 360 degrees. Combining images and/or frames captured from multiple viewing angles can also improve the accuracy and perceptibility of depth in image and/or video sequences viewed from different directions. In camera systems having a single stereoscopic device, depth is usually only visible when viewing a 3D image or video on a surface that is directly in front of (i.e., parallel to) the user's plane of view. If a user's perspective shifts in either direction so that she views the screen displaying the 3D image or video from the side at an angle then the depth of the 3D image or video is lost. Additionally, if the orientation of the viewer extends beyond the field of view of the camera device, the stereo camera system may not be able to render displays of—or accurate depth for—scene aspects outside the field of view. Using multi-camera systems to capture scenes from many different angles can provide depth for 3D images and videos at any viewing direction for 360 degrees of field of view.

The process of combining multiple images of a scene into one cohesive view or a series of cohesively sequenced images is called stitching. To maintain the stereoscopic effect, the left eye images captured by different devices (for a particular frame) can be stitched together, and the right eye images can be stitched together. The two stitched images can be used to regenerate the stereoscopic effect in 360 degrees and provide depth at multiple viewing angles.

Different calibration metadata 300, calibration files 903, calibration profiles 1615, and/or re-calibration data 1708 is required to rectify and warp images taken at each angle. Therefore, multiple sets of calibration metadata 300, calibration files 903, calibration profiles 1615, and/or re-calibration data 1708 may be embedded into the stitched 3D videos. Timing information describing the precise moment each camera begins and completes capturing the image or frame may also be embedded into the video and/or image metadata to synchronize image rectification and other post capture processing across camera modules and other sensors. Each set of 3D calibration metadata corresponds to a channel of a 3D video captured by a lens and an image sensor pair within a stereoscopic device or multi-camera system.

Figure 5:
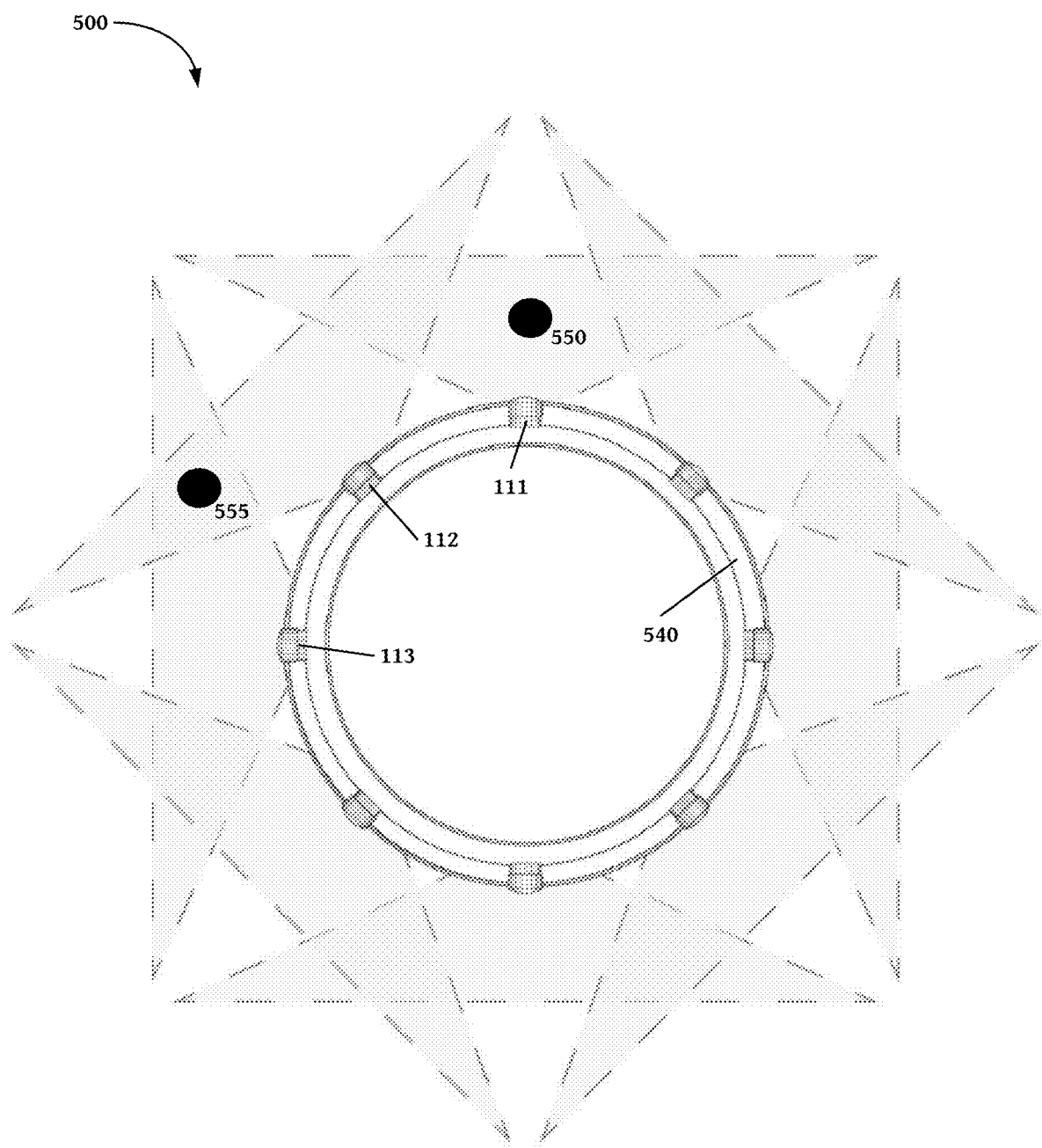
FIG. 5 shows one example of a multi-camera device for capturing 3D videos from different directions simultaneously.
Figure 6:
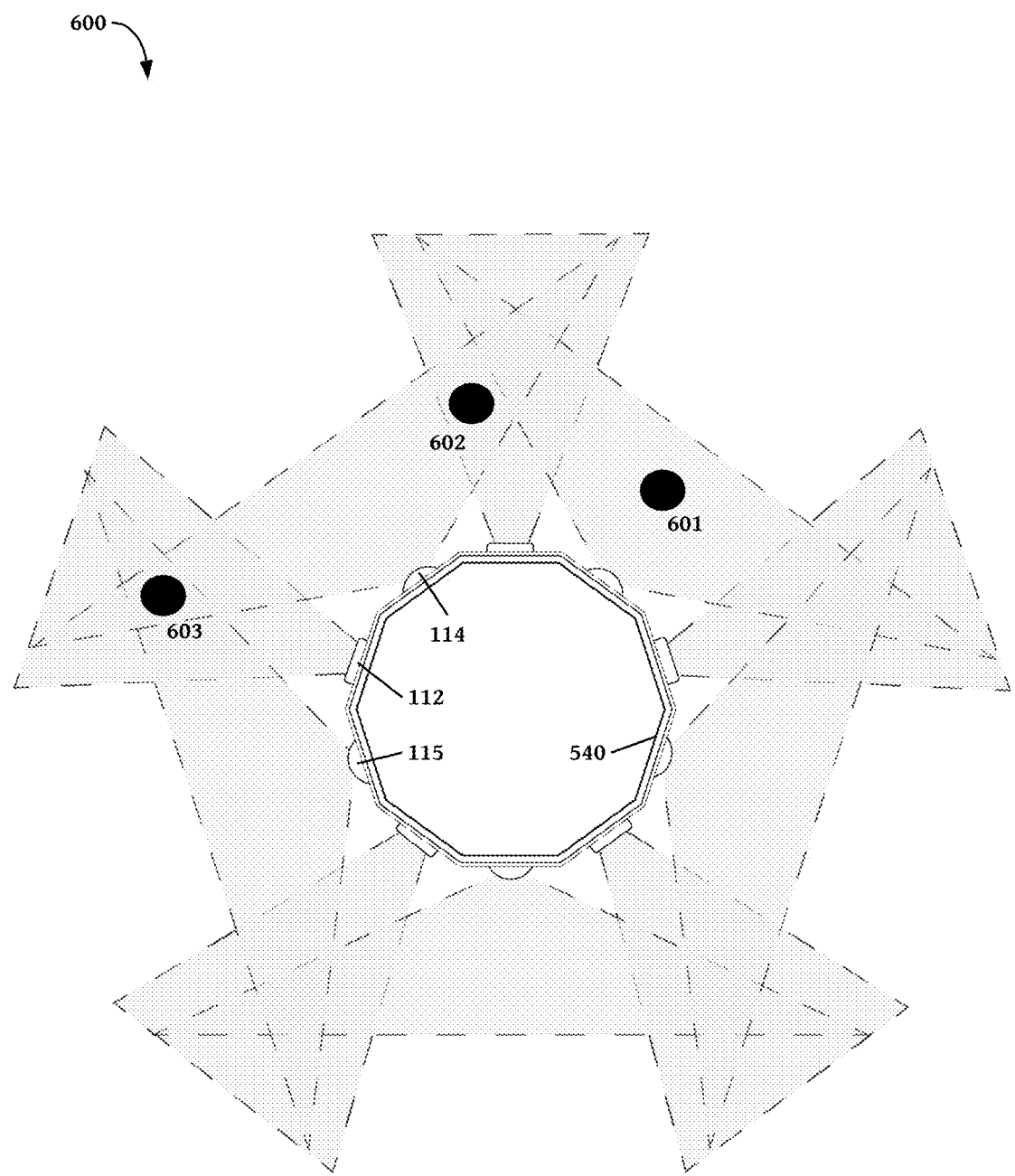
FIG. 6 shows one example of a multi-camera device for capturing scenes in 3D using three intersecting image planes.

FIGS. 5-6 show example stereo camera systems having more than two cameras for capturing 3D videos from different directions simultaneously. The 3D camera device shown in FIG. 5 has eight camera modules having standard field of view lenses. Each of the camera modules has a field of view of, e.g., 60 to 110 degrees. By combining the 8 stereoscopic image frames captured by the eight camera modules, scene aspects including depth can be captured with a 360 degree field of view. The 3D camera device shown in FIG. 6 includes ten camera modules. Five of the camera modules are standard field of view camera modules 112 having standard angle lenses with a field of view between 60 and 110 degrees. The remaining five camera modules are wide field of view camera modules 111 having wide angle lenses having a field of view between 110 and 180 degrees.

During video capturing, the eight camera modules including in the stereo camera system shown in FIG. 5 can be mounted on a 360 rig mount 540 such the eight camera modules are facing eight different directions. The 3D images or 3D videos captured by the lenses and image sensors of the camera modules can be stitched together to generate a 360 degree field of view with depth. When a user moves to any position or orientation (e.g., turns head to the right or walks to the left), the device plays back, in real time, a cropped portion of the 360-degree stitched 3D videos based on the user's position and human vision field of view at the current position. Therefore, the user can experience a sense of presence in a 360-degree virtual environment during playback of the 3D image or 3D video captured by the stereo camera systems shown in FIGS. 5-6.

During the playback, depending on the user's position, the playback device may combine image pixels from multiple image channels captured one or more stereo camera modules to generate 3D videos in real time. To rectify the image channels on the same image plane, the playback device switches between different sets of calibration metadata 300, calibration files 903, calibration profiles 1615, and/or re-calibration data 1708, in real time depending on the orientation of the viewer and/or the display device and the image channels used generate the 3D videos during playback. In some embodiments, camera modules are calibrated and or re-calibrated in real time on a frame-by-frame basis using calibration metadata 300, calibration files 903, calibration profiles 1615, and/or re-calibration data 1708. Therefore, the correct calibration metadata 300, calibration files 903, calibration profiles 1615, and/or re-calibration data 1708 to be extracted and processed in a real time to enable real time switching between the sets of calibration metadata 300, calibration files 903, calibration profiles 1615, and/or re-calibration data 1708.

For example, at a first time point during the playback of the combined 3D videos, the viewer is oriented in a direction corresponding to the point 550 shown in FIG. 5. The playback device determines that at the first time point, only image data from the left and right image channels captured by the first standard field of view camera module 111 are needed in order to project the binocular stereoscopic effect on the display screen and play back 3D videos to the viewer user. Therefore, to playback 3D video for this viewer orientation, the device needs calibration metadata 300, calibration files 903, calibration profiles 1615, and/or re-calibration data 1708 for the first standard field of view camera module 111.

At a second time point during the playback of the combined 3D videos, the viewer is oriented in a direction corresponding to the point 555 as illustrated in FIG. 5. To playback 3D videos at the second time point, the playback device determines it needs image data from the right channel of the 3D video captured by the third standard field of view camera module 113 and the left channel of the 3D video captured by the second standard field of view camera module 112. The playback device leverages calibration metadata 300, calibration files 903, calibration profiles 1615, and/or re-calibration data 1708 for the second standard field of view camera module 112 and the third standard field of view camera module 113 to achieve the binocular stereoscopic effect and playback the 3D video.

As the viewer switches her orientation, the playback device may switch the image channel(s) providing image data and the set of calibration metadata 300, calibration files 903, calibration profiles 1615, and/or re-calibration data 1708 used to rectify and project the images and/or video frames included in the image data. For the above example, to switch between point 550 to point 555, the playback device switches the image channels providing image data from the left and right image channels captured by the first standard field of view camera module 111 to the right image channel of the third standard field of view camera module 113 and the left channel of the 3D video captured by the second standard field of view camera module 112. To rectify and project images and video frames, the playback device switches from processing image data using the calibration metadata 300, calibration files 903, calibration profiles 1615, and/or re-calibration data 1708 generated by the first standard field of view camera module 111 to processing image data with the calibration metadata 300, calibration files 903, calibration profiles 1615, and/or re-calibration data 1708 generated by the second standard field of view camera module 112 and the third standard field of view camera module 113. The playback device renders the 3D videos for multiple points in real time depending on the orientation of the viewer. Therefore, the playback device also switches between two or more images channels and sets of the calibration metadata 300, calibration files 903, calibration profiles 1615, and/or re-calibration data 1708 in real time.

Images captured by different types of camera lenses and three or more camera modules may also be used to render 3D videos. As shown in FIG. 6, at a third time point during playback of the combined 3D videos, the user is pointing toward a direction corresponding to the point 603. The playback device determines at the third time point it needs image data from the left channel of a first wide field of view camera module 114, image data from the right channel of a second wide field of view camera module 115, and image data from the right and left channels of a second standard field of view camera module 112. To playback 3D videos generated by combining the four above image channels the playback device processes each image channel using the calibration metadata 300, calibration files 903, calibration profiles 1615, and/or re-calibration data 1708 of the corresponding camera module generating the image data. Images and video frames from each of the four image frames are rectified into the same image plane using the correct set of calibration metadata 300, calibration files 903, calibration profiles 1615, and/or re-calibration data 1708 and stitched and/or layered to generate the 3D video. lens and the right channel from a standard angle lens in order to play back the current 3D videos for both eyes of the user. As the orientation of the viewer switches from the third time point 603 to the fourth time point 602 and/or fifth time point 601 the playback device with switch image channels and sets of calibration metadata 300, calibration files 903, calibration profiles 1615, and/or re-calibration data 1708 as needed to generated the 3D videos.

The 3D effect a first time point (e.g., the first time point 555) may be less than the 3D effect a second time point 550, because of the different scene perspectives and fields of view for each camera module. Generally, however, human eyes do not notice the diminishing 3D effect because human eyes themselves have less 3D perception for their peripheral visions. Therefore, humans are used to the areas seen in their peripheral visions generally having less stereoscopic 3D effects. Combining images captured by more than one camera module by layering and/or stitching image data from multiple camera modules, may however, generate stereoscopic images and 3D videos having an enhanced depth effect at many different perspectives. Each camera module captures a different perspective of the scene. Therefore, to improve the depth effect at a viewer's current position, the image channels and corresponding calibration metadata 300, calibration files 903, calibration profiles 1615, and/or re-calibration data 1708 of the camera modules best capturing the scene aspect projected to the viewer at a given time point are used to render the 3D images and video frames. The more camera modules set up to capture a scene at different perspectives, the greater the likelihood that at least one camera module will have a perspective corresponding to the perspective of the viewer at her current orientation.

Although FIG. 5 shows eight camera modules and FIG. 6 shows ten camera modules, the image channel and calibration metadata 300, calibration files 903, calibration profiles 1615, and/or re-calibration data 1708 switching technology can be applied to an arbitrary number of camera modules or stereoscopic devices. For example, two stereoscopic devices with 180 degrees can be used to recreate a 360-degree virtual reality experience, using the technology disclosed herein. Alternatively, 16 cameras with normal lenses having a standard field of view between 60 and 110 degrees can be used to recreate a 360-degree virtual reality experience that provide a realistic depth perspective from a variety of viewing angles.

Although FIG. 5 shows multiple camera modules for recording a combined 3D video providing a field of view of 360 degrees, in some embodiments, the 3D effect of a field of view of 360 degrees can be achieved by a panoramic scan using a single camera module or stereoscopic device. For example, a user can use the stereoscopic device to capture a continuous sequence of stereoscopic 3D images by a panoramic scanning motion. By stitching the continuous sequences of stereoscopic 3D images together, a playback device can recreate a 3D image with a field of view of 360 degrees.

In order to stitch the images or video frames captured by different camera modules (including lenses and image sensors) of different capturing devices (e.g., 3D camera modules), the 360 stitching process needs to read and otherwise interface with the calibration metadata of different camera modules and cameras. Each camera module has a unique set of camera intrinsic calibration metadata. In addition, each stereoscopic pair of camera modules in a stereo camera system has its own calibration metadata 300, calibration files 903, calibration profiles 1615, and/or re-calibration data 1708. The 360 stitching process uses those calibration metadata 300, calibration files 903, calibration profiles 1615, and/or re-calibration data 1708 to avoid distortions, misalignment, and warping that are caused by the hardware variances of the lenses and capturing camera modules.

In one example, the 360 stitching process can first re-project each 60 to 110 degrees stereo pair generated by a standard filed of view camera module into a particular form, such as an equirectangular projection format. An equirectangular projection maps a sphere onto a rectangular image, such that the y coordinate is the latitude, and the x coordinate is the longitude, multiplied by a constant.

A 60-degree FOV image will only cover a portion of the recording sphere (one sixth of it). When the image is converted to an equirectangular format, the equirectangular form of the 60-degree FOV image fills a portion of the recording sphere. Once all of the images from each sensor for a particular eye channel (left or right) have been converted to an equirectangular format (or other projection format, as desired), those images in the equirectangular format can be stitched together using image or video stitching algorithms as a 360-degree recording sphere image for left or right eye channel.

The procedure described in the previous playback section can be used for reprojection. For each pixel in the destination projection, the process can determine the latitude and longitude coordinates of the pixel based on the (x, y) coordinates of the image. The process can then apply the stereoscopic calibration and then camera intrinsic calibration, to map the point of the pixel onto the source standard or wide angle image. Thus, the process can reproject the original standard or wide angle image into a different format, such as an equirectangular projection. This process applies the calibration metadata 300, calibration files 903, calibration profiles 1615, and/or re-calibration data 1708, and converts the images into a standard projection. After the process, the calibration metadata 300, calibration files 903, calibration profiles 1615, and/or re-calibration data 1708 is no longer needed for stitching. The 360 stitching can then be done on those standard projected images. Even though each original camera module had its own unique calibration settings, by reprojecting using the calibration metadata and then stitching, the images can now be stitched together without further calibration.

3D Camera Device Implementations

Figure 11:
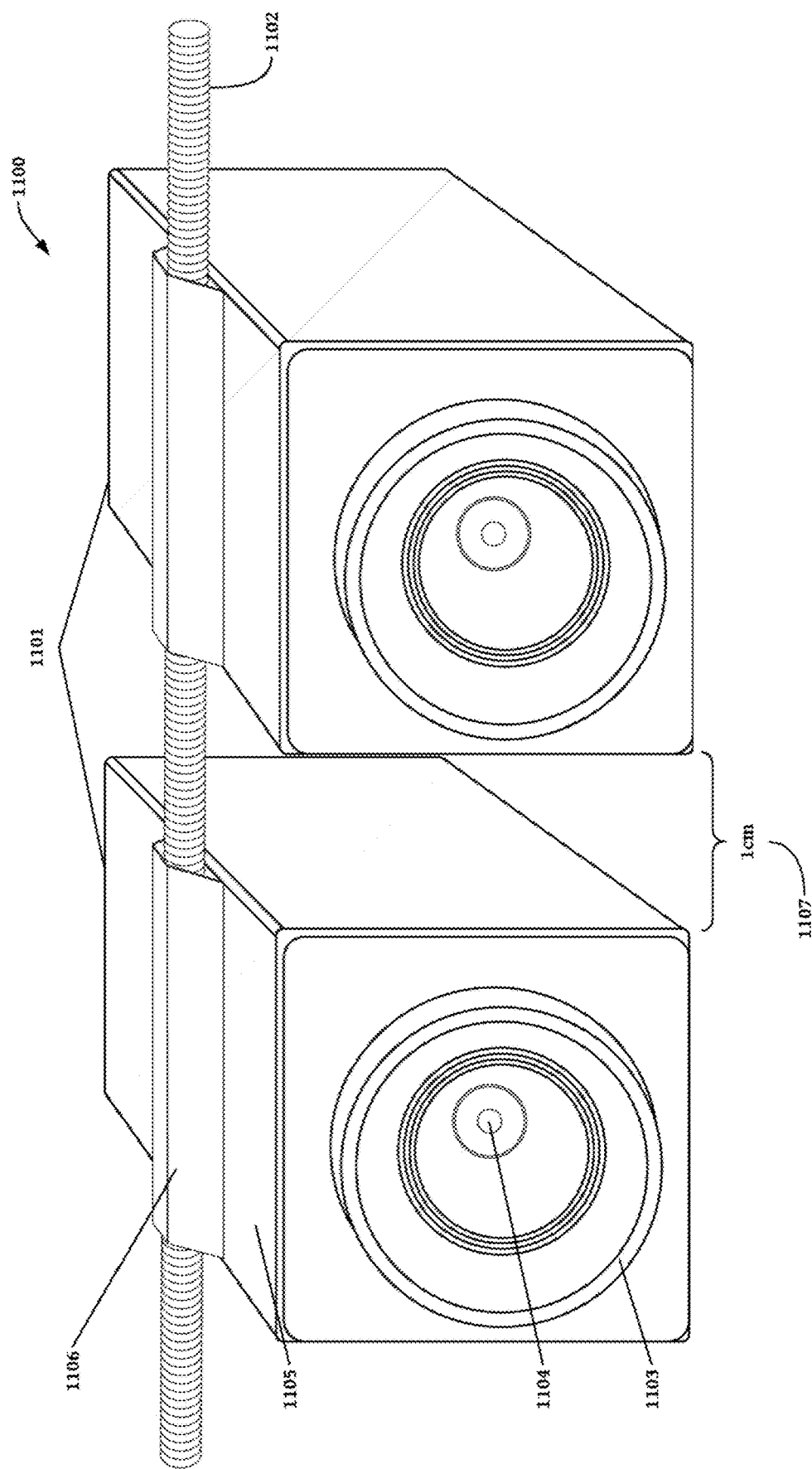
FIGS. 11 and 12 show an example stereo camera embodiment having adjustable baseline camera settings.
Figure 12:
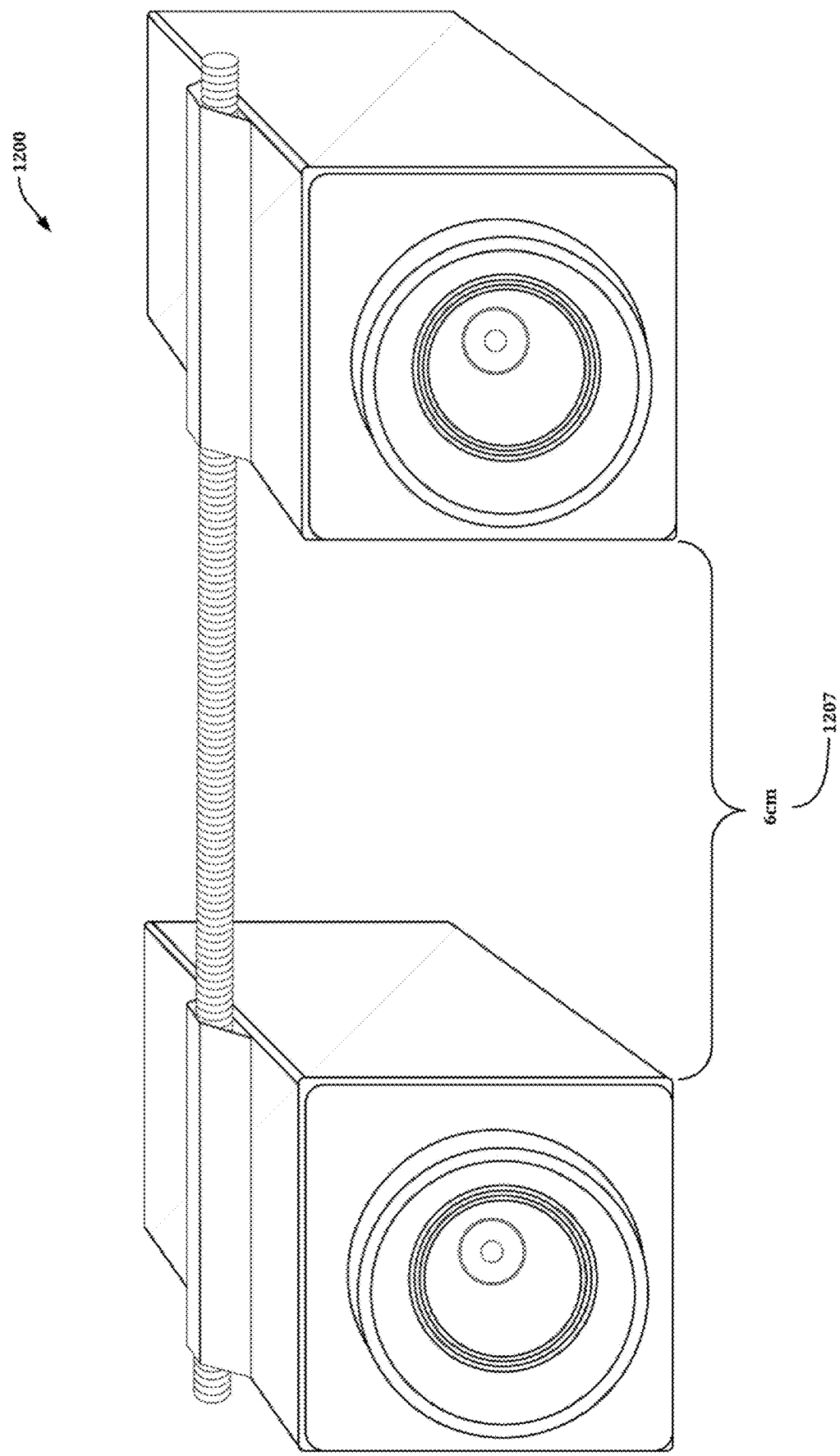

The stereo image rectification and 3D rendering system may be used with camera systems having two or more cameras. One example multi-camera system having multiple camera settings (e.g., focus, zoom, baseline, aperture, aspect ratio, relative camera rotation, white balance, shutter, iris, stabilizer, and gain) is shown in FIGS. 11-12. The stereo image rectification and 3D rendering system may be used in multi-camera systems to rectify stereo images and render 3D images and video sequences. To adjust the baseline in a camera system, the interocular distance between the two image sensors must be changed.

FIG. 11 shows a stereo camera system 1100 having two camera modules 1101 connected by a threaded track 1102. Each camera module 1101 includes a lens 1103 positioned in front of an image sensor 1104 contained in a camera module housing 1105. A track attachment member 1106 extends out from the top surface of the camera module housing 1105 and receives the threaded track 1102 through an open portion cut into the center of the track attachment member 1106. The inner surface of the track attachment member 1106 may include threads that fit inside the threads on the threaded track 1102. Alternatively, the track attachment member 1106 may slide horizontally over the surface of the threaded track 1102 when the camera modules move horizontally along the threaded track 1102.

Optionally, an electric motor may be contained inside the camera module housing 1105 to provide power for moving the camera modules 1101. The electric motor may be programmed to move the camera modules in precise increments (e.g., 0.1 cm or 1 mm). The total distance and direction moved by the camera modules 1101 may be recorded and then stored in memory so that the distance may be displayed in a graphical user interface (GUI) for controlling the stereo camera system 1100. Alternatively, a force from a source external to the camera modules 1101 (e.g., an external motor or a mechanical lever) may be applied to wind the threaded track 1102 or otherwise move the camera modules 1101.

Independent of the mechanism for moving the camera modules 1101 on the threaded track 1102, the recorded distance moved by the camera modules may be used to derive a interocular distance measurement 1107 that describes the baseline setting of the stereo camera system 1100. In one implementation, a processor (e.g., CPU, GPU, NPU, DSP) contained in the camera module housing 1105 calculates the interocular distance measurement 1107 by first determining a starting position (e.g., in cm) for the camera modules 1101 then using the recorded distance (e.g., in cm) and direction (e.g., away from center or toward center) moved by the camera modules 1101 to calculate the change in position. The interocular distance measurement 1107 is then determined by adding the change in position to the starting position if the direction is away from the center and subtracting the change in position from the starting position if the direction is toward the center of the of the threaded track 1102.

FIG. 11 shows the stereo camera system having a near orientation with a narrow interocular distance measurement 1107 and a low baseline setting (e.g., 1 cm). In this orientation, the distance between objects in the background and objects in the foreground is limited, therefore, the 3D effect is reduced. FIG. 12 displays the stereo camera system 1200 having a far orientation with a wide interocular distance measurement 1207 and a high baseline setting (e.g., 6 cm). The 3D effect is increased in this orientation because the higher baseline setting adds more depth to the image, thereby making the objects in the background appear further away from objects in the foreground.

A multi-camera system for implementing the stereo image rectification and 3D rendering system is shown FIG. 13-14. A perspective view of an eight camera system is shown in FIG. 13 and FIG. 14 illustrates an overhead view of the eight camera system. To capture moving objects within a scene, the multi-camera system may be attached to a moveable stand (e.g., a tripod, rolling cart, push cart dolly, or tracked jib). In one implementation, the moveable stand includes an electric motor that moves the mounted multi-camera system to a different location. Optionally, the multi-camera system may include a GUI for controlling the camera modules 1301 and/or the moveable stand.

The multi-camera system includes eight camera modules 1301 arranged in a circular orientation around a central power supply 1302. Each camera module 1301 has a lens assembly 1303, an image sensor 1304, a component housing 1305, and connection cords 1306. In one implementation, the camera modules are arranged in a tray 1307. Optionally, the tray 1307 may have a lid (not shown) for enclosing the component housing 1305 and connection cords 1306 for each camera module 1301. The tray 1307 and/or the lid may have recessed areas molded to the shape of the component housing 1305, connection cords 1306, and/or central power supply 1302. The tray 1307 and lid may also have symmetrical semicircular openings that fit around the lens assembly 1303. By allowing the camera system components (e.g., 1303, 1304, 1305, 1306, and 1307) to be built into the tray 1307 and/or lid, the recessed areas and semicircular openings help secure the camera system components inside the tray 1307 and prevent the components from moving or becoming damaged when the camera assembly moves.

Multi-camera systems implementing the stereo image rectification and 3D rendering system may provide adjustable baseline, zoom, and focus when capturing 360 degree views of a scene. In one implementation, the multi-camera system is placed at the center of a scene. Each camera module 1301 captures the portion of the scene within its field of view (e.g., 80-120 horizontal degrees). Image frames from each of the eight camera modules 1301 can then be rectified using the stereo image rectification and 3D rendering system described in FIG. 9. Post rectification, a 3D display may be rendered using the rectified images. The 3D display may be formatted for view on VR or AR device (e.g., a HMD having a rectilinear display).

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

Sample Hardware Architecture

Figure 2:
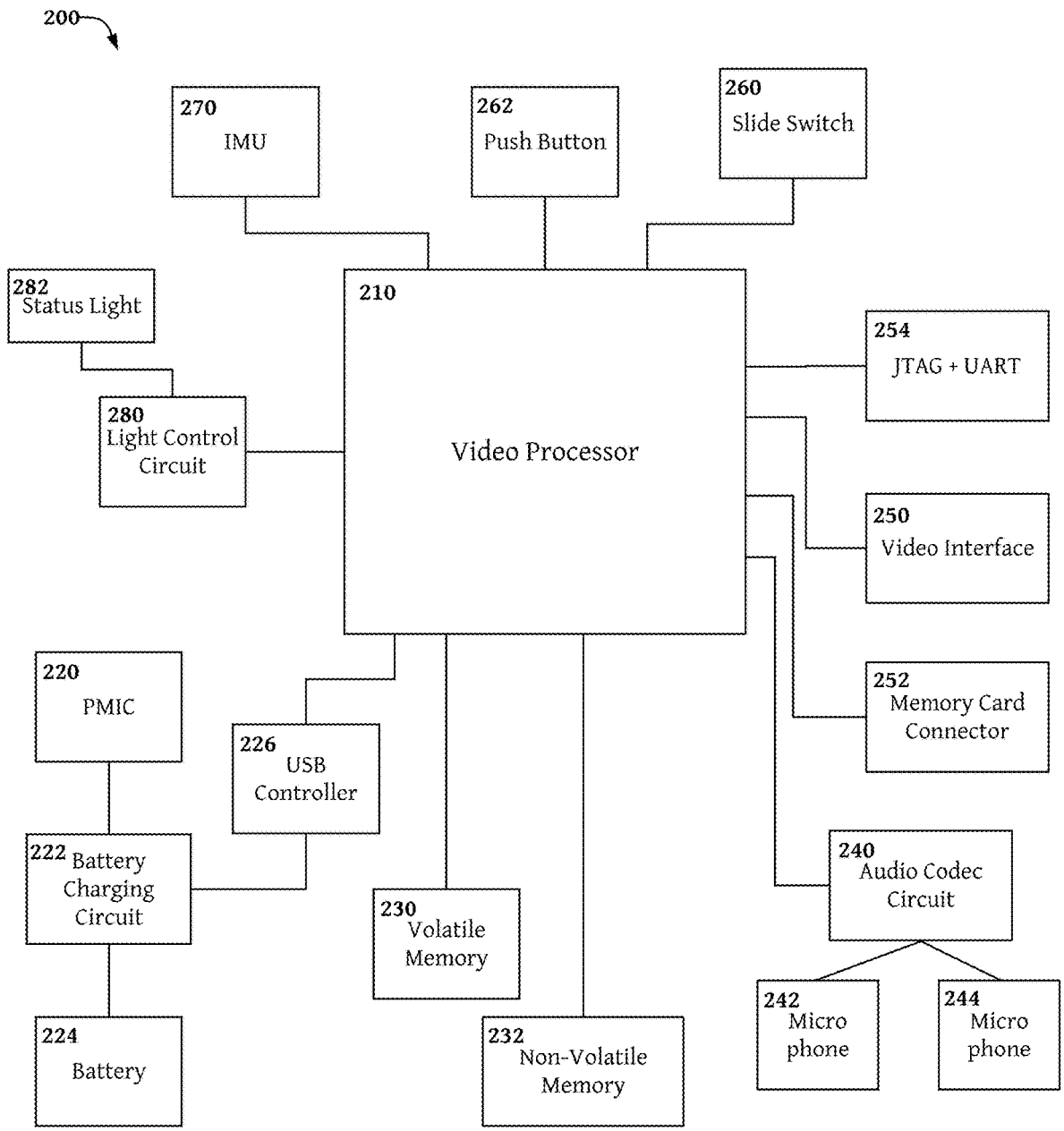
FIG. 2 is a block diagram showing various components of a video processor SOC in an example hardware implementation of a stereo camera system.

FIG. 2 is a block diagram showing various components of a sample video processor system on a module (SOM) 200. In one example, these components may be wired to an electrical source and mounted on a carrier board installed inside a 3D camera device housing. The SOM 200 includes a video processor 210 for processing various data collected by different components. The video processor 210 receives captured image data from camera modules 111-115.

A power management integrated circuit (PMIC) 220 is responsible for controlling a battery charging circuit 222 to charge a battery 224. The battery 224 supplies electrical energy for running the 3D camera device 200. The video processor 210 can be connected to an external device via a USB controller 226. In some embodiments, the battery charging circuit 222 receives external electrical energy via the USB controller 226 for charging the battery 224.

The 3D camera device 200 includes a volatile memory 230 (e.g. double data rate memory or 4R memory) and a non-volatile memory 232 (e.g., embedded MMC or eMMC, solid-state drive or SSD, etc.). The video processor 210 can also control an audio codec circuit 240, which collects audio signals from microphone 242 and microphone 244 for stereo sound recording.

The SOM 200 can include additional components to communicate with external devices. For example, the video processor 210 can be connected to a video interface 250 (e.g., high-definition multimedia interface or HDMI) for sending video signals to an external device. The device 200 can further include an interface 254 conforming to Joint Test Action Group (JTAG) standard and Universal Asynchronous Receiver/Transmitter (UART) standard.

The SOM 200 can include a memory card connector 252 to accommodate a memory card for providing additional storage space. The device 200 can further include a slide switch 260 and a push button 262 for operating the device 200. For example, a user may turn on or off the device 200 by pressing the push button 262. The user may switch between different modes (e.g., image capturing, video capturing, 3D capturing) using the slide switch 260.

The device 200 can include an inertial measurement unit (IMU) 270 for detecting orientation and/or motion of the device 200. The video processor 210 can further control a light control circuit 280 for controlling the status lights 282. The status lights 282 can include, e.g., multiple light-emitting diodes (LEDs) in different colors for showing various status of the device 200.

We claim:

1. A method of re-calibrating a stereo camera comprising:
receiving, by a processor, a first set of image data extracted from a right stereo image frame and a second set of image data extracted from a left stereo image frame, the first set of image data and the second set of image data including at least position data and color data, the right stereo image frame and the left stereo image frame extracted from a stereoscopic video sequence;

transforming the first set of image data and the second set of image data into re-calibration data describing how to correct one or more stereo calibration errors, the first and second sets of image data transformed into re-calibration data using a process comprising:

shifting the first set of image data to a plurality of shift positions, each shift position having a different alignment of color data included in the first set of image data relative to color data included in the second set of image data;

filtering the first set of image data and the second set of image data at each shift position to remove inaccurate, unreliable, or noisy image data;

comparing the first set of image data and the second set of image data to generate one or more disparity values describing a distance in pixels separating the left stereo image frame and the right stereo image frame from a rectified image frame, the rectified image frame having a common image plane for the left stereo image frame and the right stereo image frame and orienting the left and right image frames in an alignment that satisfies an epipolar geometry; and calculating one or more pixel shift parameters from the one or more disparity values and determining re-calibration data from the one or more pixel shift parameters; and rendering, by a processor on a stereoscopic display device, the stereoscopic video sequence by projecting contents of image pixels included in right stereo image frame and left stereo image frame to display pixels on the stereoscopic display device using the re-calibration data.

2. The method of claim 1, further comprising calculating a disparity value for each shift position, wherein the first set of image data and the second set of image data at a shift position are accepted by a filtering step; and assembling disparity values for each shift position into a calibration profile and applying a disparity value aggregation function to combine disparity values for the first set of image data and the second set of image data into an aggregate disparity value.

3. The method of claim 2, further comprising updating the calibration profile in real time with disparity values obtained from one or more additional pairs stereo image frames included in the stereoscopic video sequence.

4. The method of claim 3, further comprising storing, in the calibration file, disparity values obtained from the first set of image data and the second set of image data as legacy disparity values and disparity values obtained from the one or more additional pairs of stereoscopic frames as real time disparity values; and determining a pixel shift parameter by applying a first weight to the legacy disparity values to obtain a weighted legacy disparity value, applying a second weight to the real time disparity values to obtain a weighted real time disparity value, and combining the weighted legacy disparity value and the weighted real time shift value.

5. The method of claim 1, wherein the contents of the image pixels are projected to the display pixels using the method comprising:

distributing the pixel shift parameter to a shader having position data for every pixel included in the right stereo image frames and the left stereo image frames image frame; and adjusting position data for each pixel by a number of pixels specified by the pixel shift parameter.

6. The method of claim 1, further comprising receiving, by a processor, a calibration file including calibration metadata, a camera field of view in degrees, and a display dimension in pixels for the display device;

for each camera field of view, transforming a pixel shift parameter into an angle shift parameter using the method comprising:

dividing the camera field of view by the display dimension corresponding to the camera field of view to generate a degree to pixel ratio, the display dimension describing a number of pixels in one dimension of a display screen;

multiplying the pixel shift parameter by the degree to pixel ratio to generate an angle shift parameter; and generating a calibration parameter included in re-calibration data by combining a stereoscopic calibration parameter extracted from the calibration file with the angle shift parameter.

7. The method of claim 6, wherein the stereoscopic calibration parameter is an Euler angle derived from a rotation matrix.

8. The method of claim 1, wherein filtering the first set of image data and the second set of image data is performed using the method comprising:

applying a first filtering function to the first set of image data and the second set of image data, wherein the first filtering function is a correlation filtering function;

determining a correlation coefficient for the first set of image data and the second set of image data;

accepting the first set of image data and the second set of image data for disparity analysis if the correlation coefficient passes a first filtering threshold; and rejecting the first set of image data and the second set of image data from further analysis if the correlation coefficient fails the first filtering threshold.

9. The method of claim 8, further comprising:

applying a second filtering function to the first set of image data and the second set of image data at each shift position to remove image data included in an image frame containing featureless objects, wherein the second filtering function is a standard deviation filtering function determining a first standard deviation between the first set of image data and an average of image data included in a group of previously processed right stereo image frames included in the stereoscopic video sequence;

accepting the first set of image data for disparity analysis if the first standard deviation passes a second filtering threshold;

rejecting the first set of image data from further analysis if the first standard deviation fails the second filtering threshold;

determining a second standard deviation between the second set of image data and an average of image data included in a group of previously processed left stereo image frames included in the stereoscopic video sequence;

accepting the second set of image data for disparity analysis if the second standard deviation passes the second filtering threshold; and rejecting the second set of image data from further analysis if the second standard deviation passes the second filtering threshold.

10. The method of claim 8, further comprising:
applying a third filtering function to the first set of image data and the second set of image data at each shift position to remove image data included in an image frame containing close objects,
wherein the third filtering function is a depth filtering function determining a depth metric for objects captured in the first set of image data and objects captured in the second set of image data;
accepting the first set of image data and the second set of image data for disparity analysis if the depth metric passes a third filtering threshold; and
rejecting the first set of image data and the second set of image from further analysis if the depth metric fails the third filtering threshold.

11. The method of claim 1, wherein the disparity value includes a direction component selected from a group comprising: vertical, horizontal, rotational, and scalar, the direction component describing the direction to apply the one or more pixel shift parameters to correct a calibration error.

12. A method of re-calibrating a stereo camera comprising:
receiving, by a processor, a pair of stereo image frames extracted from a stereoscopic video sequence, each frame included in the pair of stereo image frames divided into a plurality of image sections dimensioned in pixels;
for each image section, transforming image data included in a first image section and image data included in a second image section into compressed image data, comparing compressed image data from the first image section to compressed image data from the second image section at multiple shift positions to obtain a disparity value in pixels at each shift position;
for each disparity value, filtering the disparity value using a correlation filtering function determining a correlation coefficient for compressed image data included in the first image section and compressed image data included in the second image section, if the correlation coefficient passes a first filtering threshold, accepting the disparity value into a calibration profile, if the correlation coefficient fails the first filtering threshold, rejecting the disparity value from further analysis; and
rendering, by a processor on a stereoscopic display device, the stereoscopic video sequence by adjusting a position of one or more image sections according to one or more disparity values included in a calibration profile and projecting contents of each image section corresponding to image pixels of the stereoscopic video sequence to display pixels of the stereoscopic display device.

13. The method of claim 12, further comprising the compressed image data contained in a compressed image section having one dimension measuring one pixel and a second dimension measuring two or more pixels.

14. The method of claim 13, further comprising generating the multiple shift positions by applying a shift function to offset compressed image data included in the first compressed image section relative to compressed image data included in the second compressed image section at defined pixel increments.

15. The method of claim 14, further comprising receiving, by a processor, a calibration file including stereoscopic calibration parameters and camera intrinsic calibration parameters, the stereoscopic calibration parameters including a rotation matrix;
calculating a pixel shift parameter from one or more disparity values included in the calibration profile;
extracting, from the rotation matrix, one or more Euler angles describing rotation of the stereoscopic 3D camera in one or more dimensions;
modifying one or more Euler angles according to a pixel shift parameter and generating a new rotation matrix using one or more revised Euler angles; and
projecting contents included in the image sections on a display screen using the new rotation matrix.

16. A method of re-calibrating a stereoscopic 3D camera comprising:
receiving, by a processor, a pair of stereoscopic video frames extracted from a stereoscopic video sequence, each frame in the pair of stereoscopic frames divided into a plurality of image sections dimensioned in pixels;
for each image section, performing a disparity analysis comprising:
comparing image data included in a first image section to image data included in a second image section at multiple shift positions to obtain a disparity value in pixels at each shift position;
applying an aggregation function to the disparity value at each shift position to generate an aggregate disparity value;
mapping the aggregate disparity value to a stereoscopic video frame by associating the aggregate disparity value with position data for the image section, the position data describing the location of the image section within the stereoscopic video frame; and
adding the aggregate disparity value to a calibration profile; and
rendering, by a processor on a stereoscopic display device, a stereoscopic video sequence by adjusting in real time one or more positions of one or more image sections based on one or more aggregate disparity values and projecting contents of the image sections corresponding to image pixels of the sequence of stereoscopic video frames to display pixels of the stereoscopic display device.

17. The method of claim 16, further comprising diagnosing a rotational calibration error by identifying image frames having a first group of aggregate disparity values associated with image sections on a right side of the image frame, a second group of aggregate disparity values associated with image sections on a left side of the image frame, and a third group of aggregate disparity values associated with image sections in a middle portion of the image frame,
wherein a first group pixel shift parameters described by the first group of aggregate disparity values specifies an opposite shift direction relative to a second group of pixel shift parameters described by the second group of aggregate disparity values and the third group of aggregate disparity values describes a third group of pixel shift parameters that is equal to zero.

18. The method of claim 17, further comprising correcting the rotational calibration error by performing the process comprising:
receiving a calibration file including camera intrinsic calibration parameters and stereoscopic calibration parameters;
extracting two or more rotational stereoscopic calibration parameters from a rotation matrix;

adjusting the two or more rotational stereoscopic calibration parameters according to the first group of aggregate disparity values and the second group of aggregate disparity values;

generating a new rotation matrix incorporating adjustments made to two or more rotational stereoscopic calibration parameters; and storing the new rotation matrix in the calibration file; and projecting contents of image sections corresponding to image pixels of the sequence of stereoscopic video frames to display pixels of the stereoscopic display device using the stereoscopic calibration parameters included in the calibration file.

19. The method of claim 16, further comprising diagnosing a scale calibration error by identifying image frames having a first group of aggregate disparity values specifying pixel shifts for image sections asymmetrically located within a video frame and a second group of aggregate disparity values specifying pixel shifts for all other image sections in the video frame.

20. The method of claim 19, further comprising correcting a scale calibration error by performing the process comprising:

receiving a calibration file including camera intrinsic calibration parameters and stereoscopic calibration parameters;

extracting two or more rotational stereoscopic calibration parameters from a rotation matrix;

adjusting the two or more rotational stereoscopic calibration parameters according to the first group of aggregate disparity values;

adjusting one or more camera intrinsic calibration parameters according to the first group of aggregate disparity values;

generating a new rotation matrix incorporating adjustments made to the two or more rotational stereoscopic calibration parameters and the one or more camera intrinsic calibration parameters;

storing the new rotation matrix and the new one or more camera intrinsic calibration parameters in the calibration file; and projecting contents of the image sections corresponding to image pixels of the sequence of stereoscopic video frames to display pixels of the stereoscopic display device using one or more new stereoscopic calibration parameters and one or more new camera intrinsic calibration parameters.

* * * * *